US010057662B2

(12) United States Patent
Talukder

(10) Patent No.: US 10,057,662 B2
(45) Date of Patent: Aug. 21, 2018

(54) FLOW CONTROLLED BASED SYNCHRONIZED PLAYBACK OF RECORDED MEDIA

(71) Applicant: Shah Talukder, Los Gatos, CA (US)

(72) Inventor: Shah Talukder, Los Gatos, CA (US)

(*) Notice: Subject to any disclaimer, the term of this patent is extended or adjusted under 35 U.S.C. 154(b) by 0 days.

(21) Appl. No.: 15/415,169

(22) Filed: Jan. 25, 2017

(65) Prior Publication Data
US 2017/0134831 A1 May 11, 2017

Related U.S. Application Data

(63) Continuation-in-part of application No. 15/242,636, filed on Aug. 22, 2016, now Pat. No. 9,591,262,
(Continued)

(51) Int. Cl.
H04N 7/15 (2006.01)
H04N 21/8547 (2011.01)
(Continued)

(52) U.S. Cl.
CPC ......... *H04N 21/8547* (2013.01); *G11B 27/00* (2013.01); *H04L 12/1813* (2013.01); *H04L 12/1818* (2013.01); *H04L 65/1063* (2013.01); *H04L 65/1069* (2013.01); *H04L 65/1089* (2013.01); *H04L 65/1093* (2013.01); *H04L 65/403* (2013.01); *H04L 65/4015* (2013.01); *H04L 65/4076* (2013.01); *H04N 7/15* (2013.01); *H04N 21/2387* (2013.01); *H04N 21/242* (2013.01); *H04N 21/47217* (2013.01);
(Continued)

(58) Field of Classification Search
CPC combination set(s) only.
See application file for complete search history.

(56) References Cited

U.S. PATENT DOCUMENTS

2007/0005794 A1* 1/2007 Graham .................. H04L 65/80 709/231
2010/0131978 A1* 5/2010 Friedlander ......... H04L 12/2812 725/37

(Continued)

Primary Examiner — Joseph J Nguyen
(74) Attorney, Agent, or Firm — North Shore Patents, P.C.; Michele Liu Baillie

(57) ABSTRACT

A flow control based synchronization of media playback of the same media content is provided on all client devices participating in the same broadcast. Each downstream client device participating in the broadcast will independently display the same location in the media at the same time. The broadcaster device requests each downstream participant device in the broadcast to independently downstream the same recorded media, and the central controller will synchronize the media playback so that all downstream devices playback the media at the same location or frame as specified by the broadcaster. For the 3$^{rd}$ party source, a 3$^{rd}$ Party Media Manager control's the play of a playback media. The playback of the playback media at each of the downstream devices is further synchronized with the stream from the broadcaster device using a synchronization marker integrated into the broadcaster device stream.

18 Claims, 45 Drawing Sheets

Related U.S. Application Data which is a continuation of application No. 14/686,754, filed on Apr. 14, 2015, now Pat. No. 9,479,733, which is a continuation of application No. 14/470,369, filed on Aug. 27, 2014, now Pat. No. 9,030,523, which is a continuation of application No. 13/449,356, filed on Apr. 18, 2012, now Pat. No. 8,848,025.

(60) Provisional application No. 61/478,046, filed on Apr. 21, 2011.

(51) Int. Cl.

| | | |
|---|---|---|
| *H04N 21/242* | (2011.01) | |
| *H04N 21/2387* | (2011.01) | |
| *H04N 21/472* | (2011.01) | |
| *H04L 29/06* | (2006.01) | |
| *H04L 12/18* | (2006.01) | |
| *G11B 27/00* | (2006.01) | |
| *H04L 12/58* | (2006.01) | |

(52) U.S. Cl.
CPC ........ *H04L 12/1831* (2013.01); *H04L 51/063* (2013.01); *H04N 7/152* (2013.01)

(56) References Cited

U.S. PATENT DOCUMENTS

| | | | |
|---|---|---|---|
| 2010/0198992 A1* | 8/2010 | Morrison | G10H 1/0058 709/248 |
| 2012/0017149 A1* | 1/2012 | Lai | H04N 7/15 715/716 |
| 2012/0208153 A1* | 8/2012 | Bolla | G09B 5/08 434/219 |

* cited by examiner

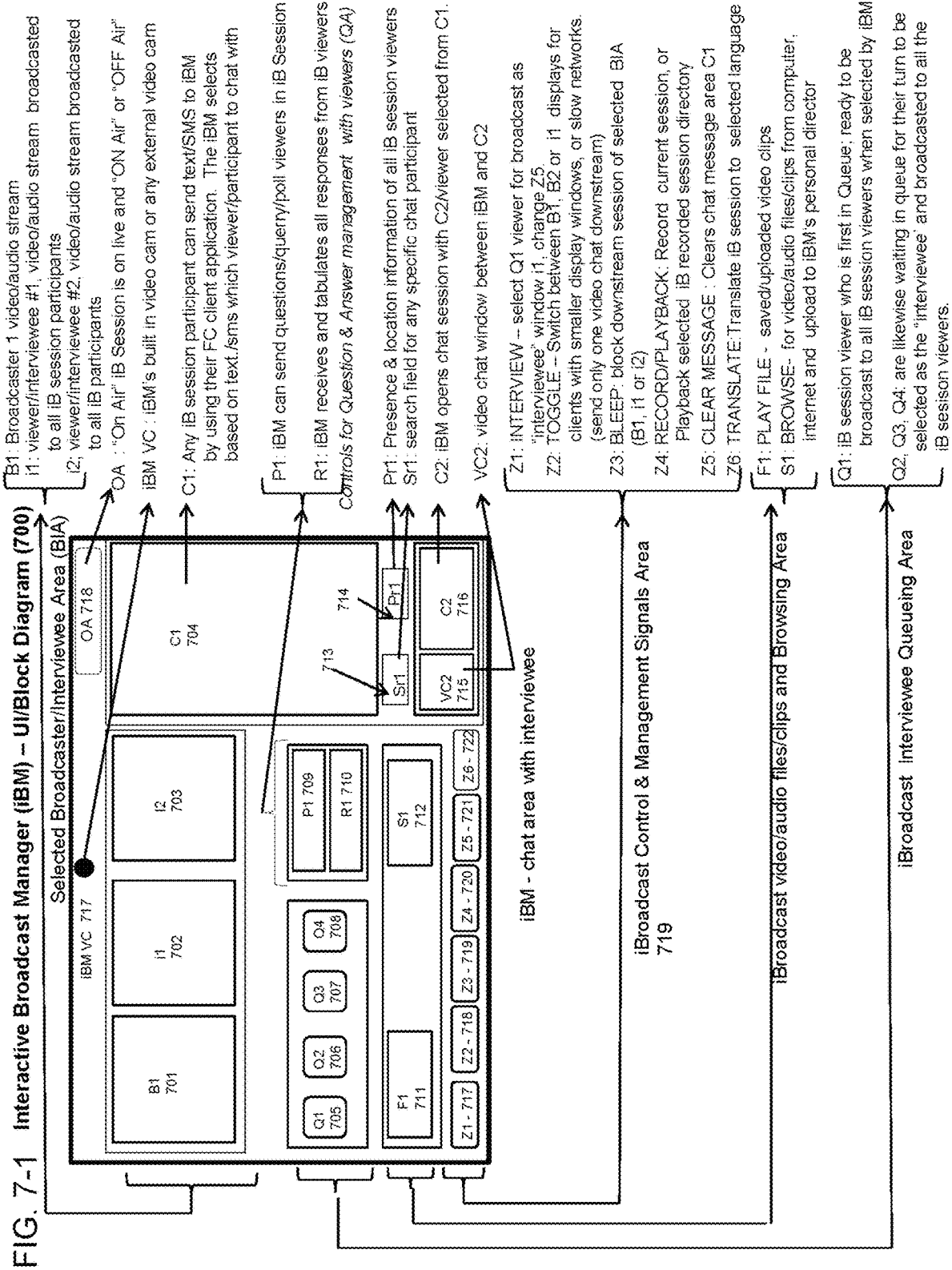
FIG. 7-1 Interactive Broadcast Manager (iBM) – UI/Block Diagram (700)

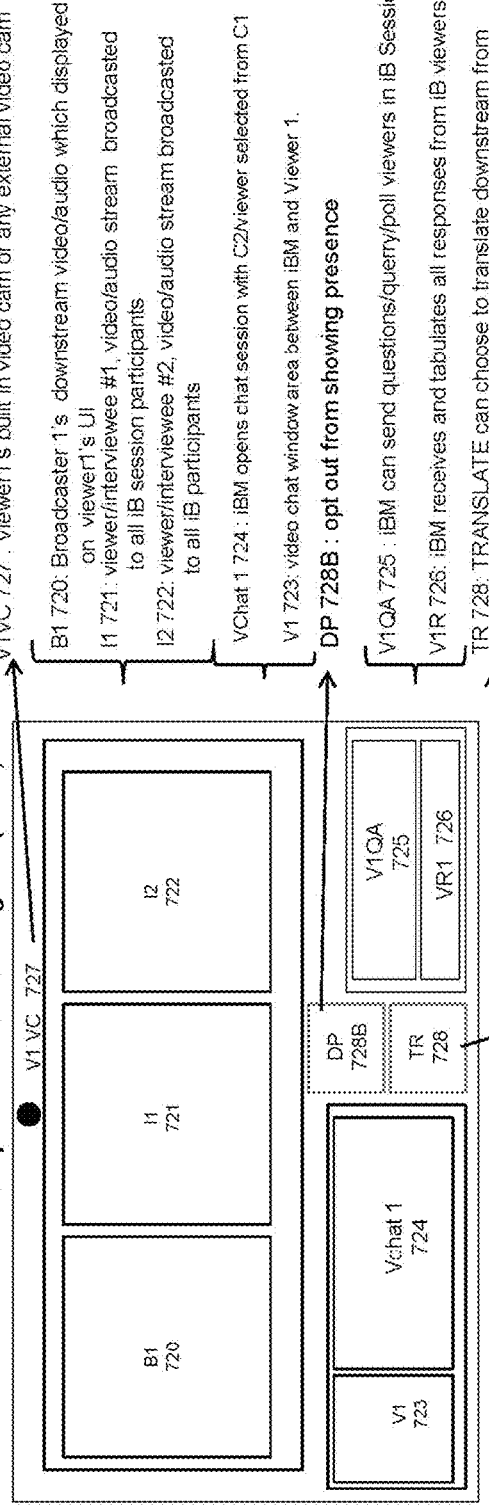

FIG. 7-2    iB Viewer/Participant UI – Block Diagram (729A)

V1VC 727 : Viewer1's built in video cam or any external video cam.
B1 720: Broadcaster 1's downstream video/audio which displayed on viewer1's UI
I1 721: viewer/interviewee #1, video/audio stream broadcasted to all iB session participants
I2 722: viewer/interviewee #2, video/audio stream broadcasted to all iB participants
VChat 1 724 : iBM opens chat session with C2/viewer selected from C1
V1 723: video chat window area between iBM and Viewer 1.
DP 728B : opt out from showing presence
V1QA 725 : iBM can send questions/query/poll viewers in iB Session
V1R 726: iBM receives and tabulates all responses from iB viewers.
TR 728 : TRANSLATE can choose to translate downstream from a set of language choices

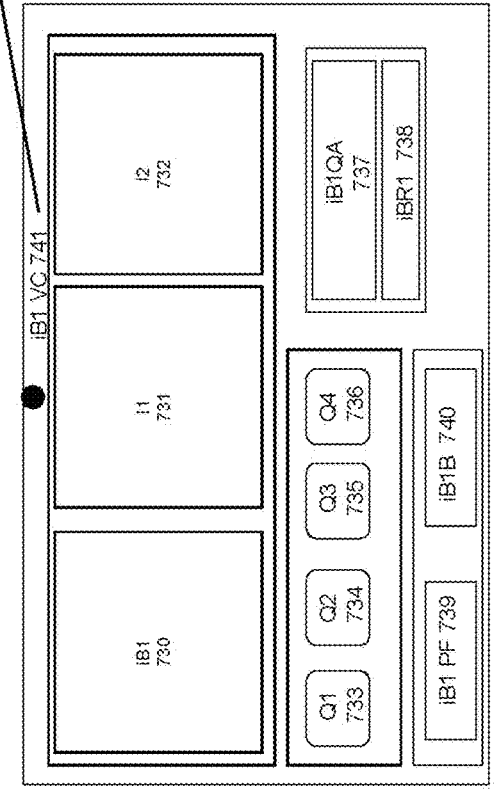

FIG. 7-3    iB Broadcaster UI – Block Diagram (730A)

iB1 VC 741: Built in video cam or any external video cam.
iB1 730: Broadcaster iB1's video/audio stream.
I1 731: viewer/interviewee #1, video/audio stream on iB's UI display area.
I2 732: viewer/interviewee #2, video/audio stream on iB's UI display area.
iB1QA 737 : iBM can send questions/query/poll viewers in iB Session
iBR1 738: iBM receives and tabulates all responses from iB viewers
iB1PF 739: play/downstream video/audio clips from saved/uploaded or from url.
iB1B 740 : Browse the net, local computer etc. for video/audio files/clips and upload to iBM's personal director
Q1 733: iB session viewer who is first in Queue; ready to be broadcast to all iB session viewers when selected by iB or iBM
Q2, Q3, Q4 (734, 735, 736): selected Viewers in queue waiting in queue to be selected as the 'interviewee' and broadcasted to all the iB session viewers.

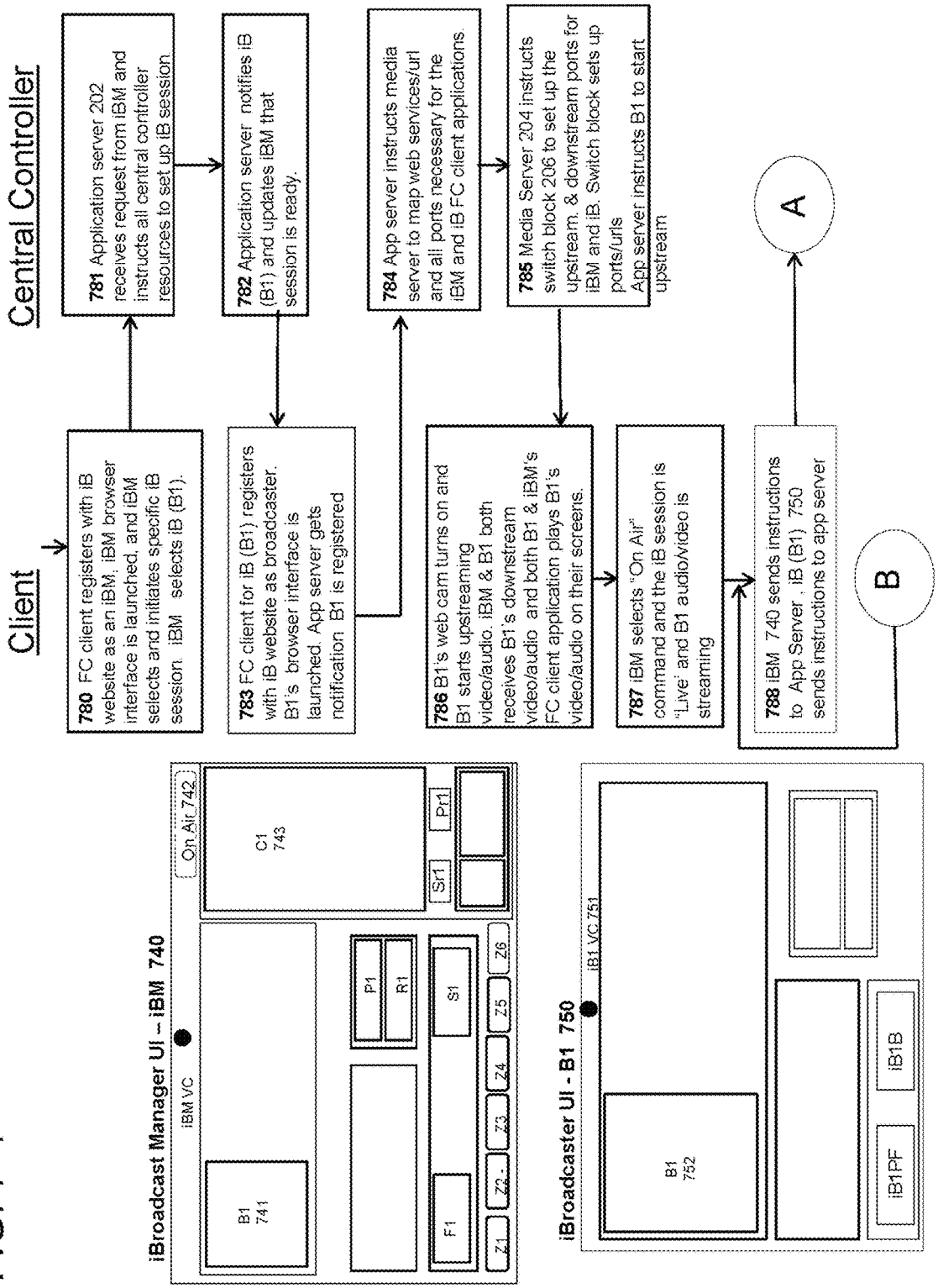

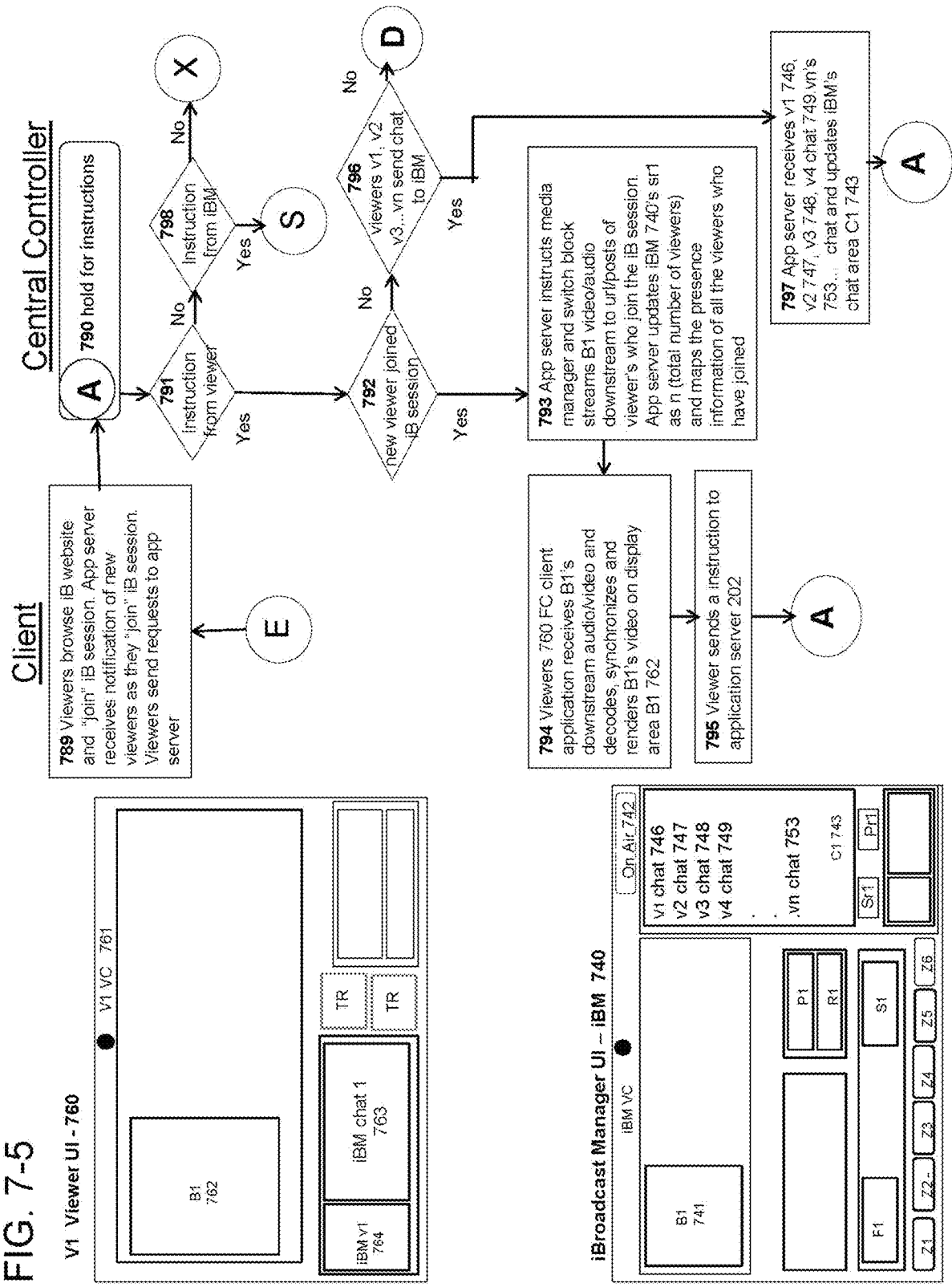

FC Client Application Upstream Audio/Video Encoder & Synchronization Manager (800)

FC Client Application Downstream - Audio/Video Decoder & Synchronization Manager (820)

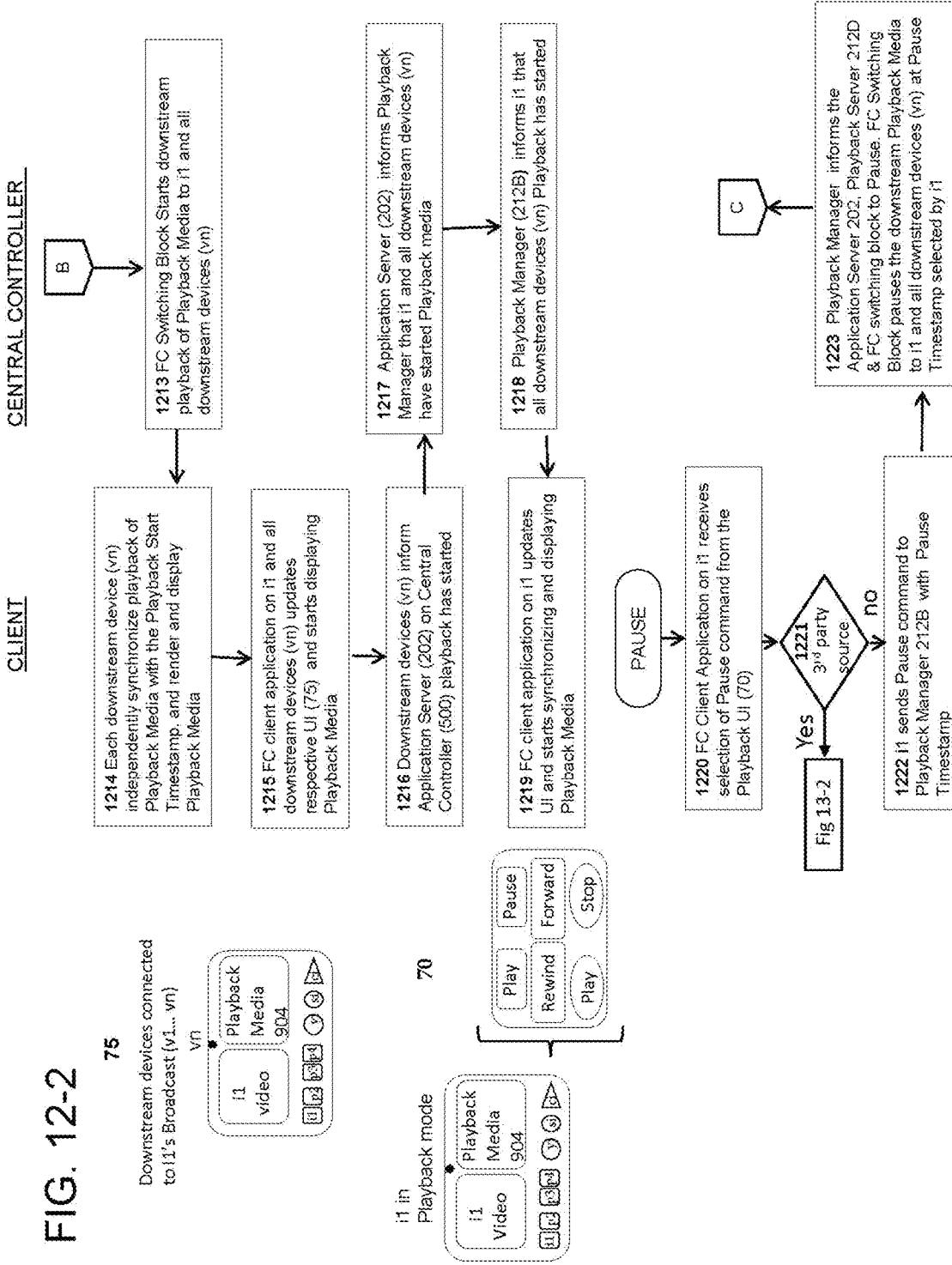

FLOW CONTROLLED BASED SYNCHRONIZED PLAYBACK OF RECORDED MEDIA

BACKGROUND OF THE INVENTION

Social Media Intersecting with Video Communications:

High end traditional video conferencing is a $1.5B/year market. Internet VoIP providers have been providing free voice and video chat services, however, they are also entering the video conferencing market. With the advent of higher speed cellular (4G, and other wired and wireless technologies) networks and the proliferation of smart phones, tablets and mobile devices, the video conferencing market is moving rapidly to the consumer segments of the market with rapid adoption of video centric services by consumers. This will have several major market shifts. It will (i) dramatically increase number of video conference (video chat) users, (ii) drastically reduce the cost of the solutions, (iii) accelerate bandwidth use for both cellular networks, internet and last mile networks, (iv) rapidly increase the new forms and number of video conferencing applications, and (v) increase other modalities of video streaming applications and services. These and other shifts will increase the overall video conferencing and video communications markets globally which is forecasted to be larger than $30B in the next few years.

The global reach of the Internet and its associated web services, significant increase in DSL, Cable and other Service Provider network bandwidth, proliferation of advanced mobile device, and the millions of Internet users have created both a significant opportunity and a technical problem for video based communication. The users are now demanding instant access of services from anywhere, anytime, and on any device and as ubiquitous as text or voice based services. However, this creates a significant bandwidth and quality of service (QoS) problem for video related networks and service. Cellular service providers are placing restrictions on bandwidth use through pricing plans that limit bandwidth utilization. Users are using, and will increasingly use, mobile devices to upload and download rich video based web services. This will cause significant network congestion, reduce user access to video based services, and slow down adoption of video related services.

Social Media Intersecting with Broadcasting:

As in the case of traditional video conferencing, the emergence of internet and social media and customer demand for interactivity and immediate access to customizable content will dramatically impact the broadcast industry. The Television, Radio, Cable Satellite industries are already seeing the impact of internet and changing customer needs/demands. New internet based radio and TV stations have already started to proliferate the traditional broadcast industry. Internet base music and TV/video broadcast service have already started to penetrate the broadcast industry. Customers are getting and demanding instant access to video/music customized to their specific needs and over their choices of any device whether it be TV, Computer, Smartphones, Tablets or other computational devices. In addition, the global reach of the internet is breaking geographic and network boundaries. Unlike TV or Radio signals the internet is by in large accessible globally, therefore broadcast services which were once thought to have network or geographic restrictions are rapidly shrinking and customers are demanding their broadcast services form anywhere, on any device, at any time and any content.

These customer demand fueled by the possibilities of the internet have opened up previously unimaginable opportunities. These new class of services will have inherent technical barriers. The internet is not a predictable network as are the Broadcast TV, Cable or Radio networks. Just as internet voice over IP (VoIP) faced significant technical hurdles with Quality of Service (QoS) etc. when we did voice over the internet and tried to provide the same or better quality of service as switched voice. The internet based broadcast services will face similar if not larger QoS hurdles. For instance, the delay, latency, synchronization of audio/video are a just a few which the industry will face. In addition to business challenges of content ownership, content rights and distribution etc.

These new internet broadcast services demanded by the customers will need to be real-time and highly interactive, highly personizable, highly mobile, very easy to manage and use and with low organizational controls—in effect the same customer needs and behavior seen in the Social Media world will be transposed on to the Broadcast industry.

Playback of Recorded Media.

Playback of recorded media has been around for decades. However with the advent of the Internet coupled with the proliferation of mobile technologies and higher bandwidth networks, consumers are accessing rich media in various formats and from a multitude of sources. This media consumption trajectory will continue to grow exponentially as more file streaming sources like public libraries and universities, and companies like Netflix™, Hulu™, Youtube™, Spotify™, Facebook™, and Periscope™, and others who provide consumers a vast array of choices to file stream recorded media to their devices. The consumer can independently and on demand watch, pause, rewind and forward the content as they choose. The same recorded content can be streamed to any number of devices with each recipient seeing the same content from different locations, on different devices and at different times, based on when they start the playback, network speeds, receiving device performance, and when each device independently chooses to control the media player to pause, rewind, forward or play the media. The Internet is inherently unpredictable, and there is no guarantee that streaming data will reach different devices/destinations at the same time, even if it leaves the source at the same time. Likewise, receiving devices on mobile networks have similar unpredictability issues based on service providers network, geographic location, fee based service and bandwidth throttling, etc. In addition to network related unpredictability, devices receiving the file stream are built with different technologies, processing, graphics and rendering engines, which adds to the unpredictability as to when the streamed file is played back. Even though devices/consumers are streaming the same recorded content from the same source, they are receiving data from each separate stream of the same file independently and playing back the content at different speeds at different time/frame of the stream.

BRIEF SUMMARY OF THE INVENTION

Disclosed herein is a method for providing synchronized playback of a playback media by a plurality of client devices during a real-time interactive broadcast session. Embodiments of the present invention are given in the dependent claims. Embodiments of the present invention can be freely combined with each other if they are not mutually exclusive.

A flow control based synchronization of media playback of the same media content is provided on all client devices participating in the same broadcast. Each downstream client device participating in the broadcast will independently display the same location in the media at the same time. The broadcaster device requests each downstream participant device in the broadcast to independently downstream the same recorded media, and the central controller will synchronize the media playback so that all downstream devices playback the media at the same location or frame as specified by the broadcaster. For the $3^{rd}$ party source, a $3^{rd}$ Party Media Manager control's the play of a playback media. The playback of the playback media at each of the downstream devices is further synchronized with the stream from the broadcaster device using a synchronization marker integrated into the broadcaster device stream.

According to one embodiment of the present invention, a method for providing synchronized playback of a playback media by a plurality of client devices during a real-time interactive broadcast session includes a central controller receiving from a broadcaster device a playback command, a selection of a playback media, and a playback start timestamp. The playback media comprises synchronization markers integrated into the playback media during recording, wherein the playback start timestamp corresponds to a location in the playback media at which the broadcaster device will start the playback of the playback media. The central controller sends the playback start command and the playback start timestamp to the broadcaster device and to the plurality of client devices in the real-time interactive broadcast session. The central controller sends a stream comprising the playback media comprising the synchronization markers to the broadcaster device and each of the plurality of client devices. The broadcaster device and the plurality of client devices each independently starts playback of the playback media at the synchronization marker corresponding to the playback start timestamp.

According to another embodiment of the present invention, a method for providing synchronized playback of a playback media from a $3^{rd}$ party source, by a plurality of client devices during a real-time interactive broadcast session, includes a central controller receiving a $3^{rd}$ party source location for the playback media and a playback start timestamp from a broadcaster device. The central controller sends to the broadcaster device and each of the plurality of client devices the playback start timestamp and the $3^{rd}$ party source location. The central controller sends to the broadcaster device and each of the plurality of client devices, a playback command. The broadcaster device and each of the plurality of client devices independently instructs the $3^{rd}$ party source to play the playback media starting at a location corresponding to the playback start timestamp.

In one aspect of the present invention, in response to receiving the playback command, the broadcaster device and each of the plurality of client devices independently connects to the $3^{rd}$ party source using the $3^{rd}$ party source location, synchronizes the start of the playing of the playback media at the playback start timestamp, and synchronize the playing of the playback media with a synchronization marker for a broadcaster device stream.

Computer program products corresponding to the above-summarized methods are also described and claimed herein.

BRIEF DESCRIPTION OF THE SEVERAL
VIEWS OF THE FIGURES

FIGS. 3-1 through 3-6 illustrate an embodiment of the flow-control based switched group video chat initialization and routing/switching according to the present invention.

FIGS. 4-1 through 4-5 illustrate an example of a flow-control based switched group video chat according to the present invention.

FIG. 5 illustrates an embodiment of the central controller of the system for a switched group real-time interactive broadcast using the switched group video chat according to the present invention.

FIGS. 6-1 through 6-5 illustrate an embodiment of providing a switched group real-time interactive broadcast using the switched group video chat according to the present invention.

FIGS. 7-1 through 7-8 illustrate an example of a flow-control based switched real-time interactive broadcast according to an embodiment of the present invention.

FIGS. 8-1 and FIG. 8-2 illustrate a flow-control based switching client application's audio/video encoding, decoding and synchronization architecture according to an embodiment of the present invention.

FIGS. 9-1 through 9-2 illustrate an embodiment of a system for flow-control based synchronized playback of recorded media at the device which is recording the media or for devices which are playing back synchronized media according to the present invention.

FIGS. 11-1 through 11-2 illustrate an embodiment of a method for flow-control based recording of media, according to the present invention.

FIGS. 12-1 through 12-8 illustrate an embodiment of a method for flow-control based synchronized playback of recorded media, according to the present invention.

FIGS. 13-1 through 13-6 illustrate an embodiment of a method for flow-control based synchronized playback of third-party recorded media, according to the present invention.

Figure 1:
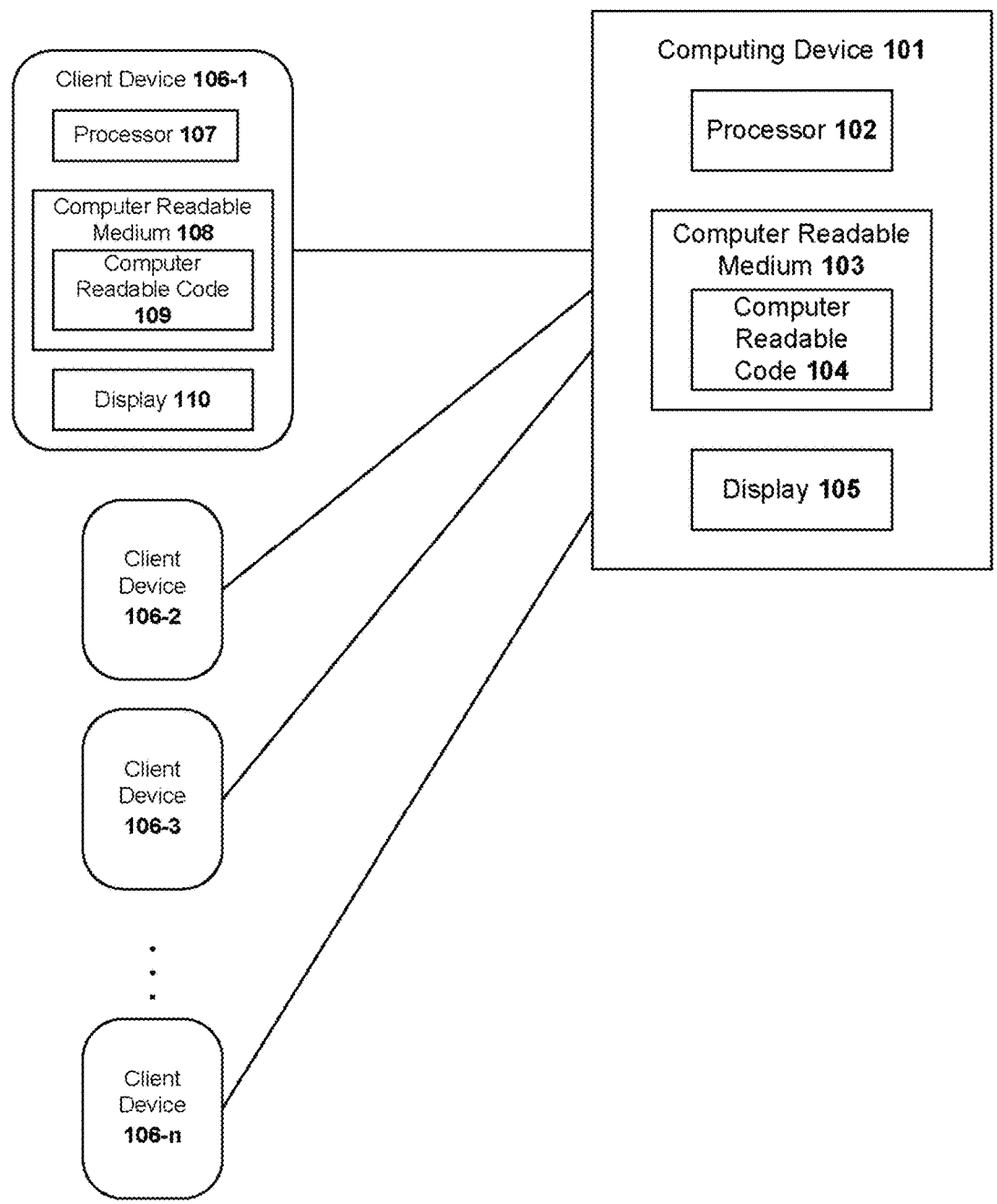
FIG. 1 illustrates an embodiment of a system for flow-control based switched group video chat according to the present invention.

DETAILED DESCRIPTION OF THE
INVENTION

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, web portals etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a system for flow-control (FC) based switched group video chat and real-time Interactive Broadcast (iBroadcast) according to the present invention. The system comprises a computing device 101 operationally coupled to a processor 102 and a computer readable medium 103. The computer readable medium 103 stores computer readable program code 104 for implementing the method of the present invention on the service side. The processor 102 executes the program code 104 to provide the flow-control based switching video conference and/or real-time Interactive Broadcast (iBroadcast) service based on the customer selection, according to the various embodiments of the present invention. In one embodiment, the computing device 101 is a server, and the processor 102 implements a central controller for communicating with a plurality of client devices 106-1 through 106-n. The client device 106-1 comprises a processor 107 operationally coupled to a computer readable medium 108 and a display 110. The computer readable medium 108 stores computer readable program code 109 for implementing the method of the present invention on the client side. The other client devices 106-2 through 106-n similarly comprise a processor, computer readable medium with computer readable code and a display.

The present invention addresses problems currently facing the industry in video conferencing/audio conferencing and the emerging broadcasting industry which is rapidly leveraging internet and mobile technologies. The present invention comprises a central controller and client devices acting together to provide the services described herein. The central controller may reside on a network, i.e. the "cloud", managing switched group video chats or iBroadcast events. Alternatively, the central controller may reside in a server or personal computer (PC), which hosts the software managing two or more group video chat sessions or iBroadcast events.

This present invention addresses the needs of customers in the (i) Social Media intersecting with Video Based Communications and (ii) Social Media intersecting with Broadcasting as well as all derivative industries which are and will continue to evolve over time based on customer and industry needs and demands. The present invention is driven by a need to see an evolution where real-time interactive broadcast will enable anyone and everyone to be their own broadcast studio and be able to reach out to anyone or any group globally in real-time and instantly making them a part of the real-time interactive broadcast stream and usher in a democratic mechanism where rich and underserved alike can have access to resources to reach out to the global community.

In addition, the present invention address the needs for technology, applications and processes to manage dynamic scaling from small (1, 2, 3) to very massive (millions) of users who join each group video or real-time interactive broadcast session. This present invention has the capability to dynamically morph the management infrastructure to handle sessions as they start small and dynamically scale to large numbers, while maintaining the active session with no interruption. Likewise, the management infrastructure can dynamically scale down from large numbers of participants to a few.

Figure 2:
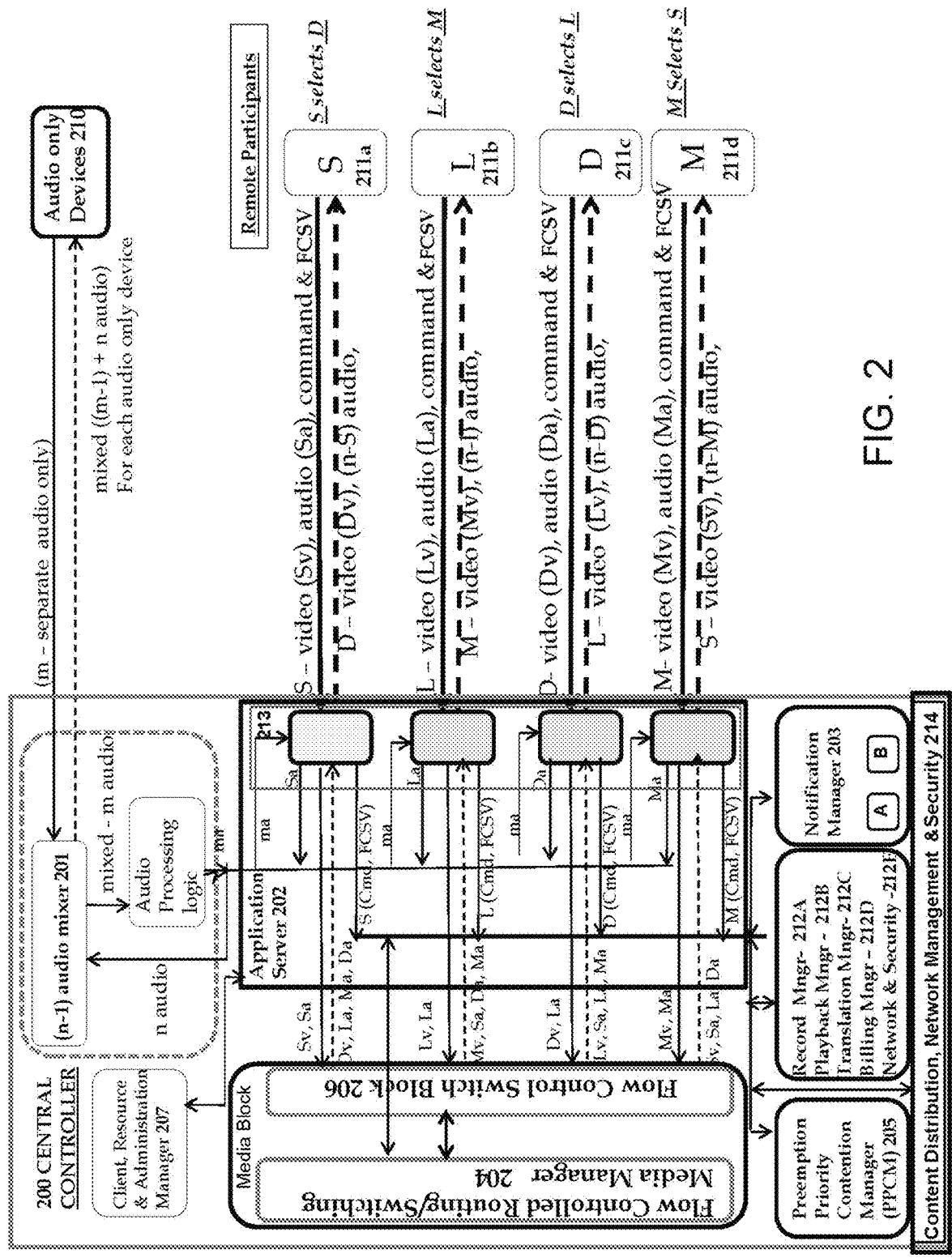
FIG. 2 illustrates an embodiment of the central controller of the system for flow-control based switched group video chat according to the present invention.

FIG. 2 illustrates an embodiment of the central controller of the system for flow-control based switched group video Chat (SGVC) according to the present invention. Illustrated are functional blocks of the central controller 200, links for communications, command and switching signals, and video/audio and web services 213 provided to the client devices 211a-211d. The Central Controller comprises the blocks described below.

Audio Mixer 201. The audio mixer 201 allows communications devices 210 with voice only capabilities to join a SGVC session as an audio only participant.

Application Server 202. The application server 202 comprises intelligence and knowledge of the SGVC and iBroadcast sessions. The application server 202 communicates, instructs, manages and maintains state of the active SGVC and iBroadcast sessions. The application server 202 further intercepts, translates and manages the Flow Control Switching or iBroadcast command signals and interfaces with the client applications based on the customers' selection of services. The application server 202 is responsible for initiating sessions, holding the state information of all active sessions, maintaining communications with each participants on one-to-one group chat sessions, initiating iBroadcast events, establishing unique session ID's, instructing the notification manager 203 to send notifications to the client devices 211*a*-211*d*. The application server 202 further instructs the flow controlled switching media manager (Media Manager) 204 to map the appropriate upstream video/audio to the requesting participant's port and to forward the port address to the flow control switch block (Switch Block) 206. The application server 202 intercepts the command signals from the client devices 211 of the session participants and interprets and instructs appropriate resources to work on the command. For example, the application server 202 may add new participant client devices to an SGVC or iBroadcast session, or remove an existing participant client device from, the session. The application server 202 may detect preemption signals for the session initiator client device and set appropriate resources to enable the request. In addition, the application server 202 is responsible for session termination.

In the case of an iBroadcast, the application server 202 based on each participant profile sets up each participant as an iBroadcast "Manager", "Broadcaster" or "Viewer". In each case the application server 202 instructs the web services to open up, based on class of participants, specific iBroadcast user interfaces (manager, broadcaster or viewer) and also instructs the media manager 204 to set up appropriate iBroadcast ports and resources for upstream and downstream audio/video and control signals. The media manager 204 maintains the logic and port mapping of all upstream and downstream ports and instructs the switch block 206 to switch the appropriate ports to the appropriate iBroadcast participants. As in the case of SGVC the application server 202 also instructs the notification manager 203 to manage the appropriate notifications/messaging etc. to and from the iBroadcast participant.

Notification Manager 203. During SGVC or iBroadcast session initiation, the notification manager 203A receives session specific information and instructions from the application server 202 to send notifications to the session participant client devices 211*a*-211*d* to join the session. Once the notifications are sent, a session task complete signal is sent to the application server 202 by the notification manager 203A. The notification manager 203A may perform other notification functions as needed. During a real-time interactive broadcast session, the notification manager 203B communicates with a session viewer flow control (FC) client application over a chat instant message service or gateway. If selected by the iBroadcast Manager (iBM), the viewer awaits in a queue to be part of the iBroadcast session. The notification manager 203B sends a notification to the viewer client device of the session status and the iBroadcast Manager (iBM) instructs the application server 202 to send the viewer to the queue and wait for the next opportunity to be selected by the iBM to be on the broadcast (as a broadcaster or interviewee). The notification manager 203B also updates the viewers in the queue on status and delay for getting live on the iBroadcast session.

The notification manager 203B, when instructed by the application server 202 also sends contextual information to all or selective participants/viewers who are on iBroadcast sessions and intercepts the return response from the session participants. This allows for a highly interactive and dynamic communication between the iBroadcast Manager (not shown) and the session participants/viewers.

Flow Control Switching Media Manager 204 (herein "media manager"). The media manager 204 receives instructions from the application server 202 on which participant's upstream video to map to which participants downstream port/URL. The media manager 204 maintains the status of all active upstream and downstream ports addresses/URL of each SGVC or iBroadcast session and each session participant. The media manager 204 also instructs the flow control switch block 206 to route specific upstream video and/or audio ports to specific downstream video and/or audio ports on a participant's client device.

In the case of iBroadcast, the media manager 204 receives instructions from the application server 202 on which participant's downstream ports/URL to connect to selected iBroadcast streams. The media manager 204 in turn instructs the switch block 206 to open required ports/URL and switch the appropriate streams to the participant. Likewise, when an event participant leaves the iBroadcast event, the media manager 204 receives the instructions from the application server 202 to stop the downstream iBroadcast and reallocate the ports.

Pre-emption, Priority, and Contention Manager 205 (PPCM). The PPCM 205 stores the preemption, priority and contention status of each SGVC session and of each participant on each session. The PPCM 205 receives instructions from the application server 202 to check for any contention with a specific participant flow control signal selection. The PPCM 205 passes the contention status to the application server 202. As an example, if an initiating participant (herein "initiator") sets a preemption command for the session, and another participant selects a flow control signal to view a different participant, then the PPCM 205 informs the application server 202 of the specific contention. The application server 202 in turn informs the other participant FC client application that his or her flow control signal selection is not allowed at this time. The FC client application on the other participant's client device changes the UI to reflect this information sent by the application server 202.

Flow Control Switch Block 206 (herein "switch block"). When the customer selects the SGVC or iBroadcast service, the switch block 206 receives instructions from the media manager 204 to route or switch specific upstream video and/or audio ports to specific downstream video and/or audio ports of the SGVC or iBroadcast participants' client devices. The flow control signals received from the FC client applications and the switching "intelligence" regarding to whom or when to route or switch video/audio streams resides with the application server 202. The application server 202 instructs the media manager 204, which maintains the routing map of each active session and participant, to in turn provide instructions to the switch block 206 pertaining to any change in the port allocation and assignment.

When the customers/participant selects iBroadcast services by selecting a specific iBroadcast event, the switch block 206 receives instructions from the media manager 204 to stream the iBroadcast event to the downstream ports of the participant. The media manager 204 receives the participant's event selection and downstream port and mapping information from the application server 202.

Client, Resource and Administration Manager 207 (herein "administration manager"). The administration manager 207 manages any resources required by the SGVC and the SGVC system, including but not limited to directories, databases, security and credentials, customer and vendors account/billing information, web services, client device type, and client specific application versions that are downloaded by the client.

Record, Playback, Billing, Network & Security and Translation Managers 212A-212E. The Record, Playback, Billing, Network & Security and Translation Managers 212A-212E enable recording and playback of sessions and events, monetizes services and billing, distributes content, networking and security, and translates video/audio content specific to each individual session participant's language choice respectively.

In the case of iBroadcast, the viewer can select from a web based directory which iBroadcast session they wish to join and for that particular iBroadcast session the viewer also has the option to select which Broadcaster (can be more than one) the viewer wishes to view during that session.

In the case where the customer selects the SGVC service, the session is initiated, and the participants are in the active SGVC session, the system allows each SGVC participant to select to "See" any of the other SGVC participants by utilizing user based flow control signals. Each SGVC participant is associated with a unique flow control signal, which is displayed on each client device by the FC client application resident on the participant's device. Each participant's client device uses its UI to communicate with the participant and with the central controller 200. A participant's flow control signal can be represented by the participant's image, phone number, name, or any other suitable representation. Each SGVC participant can select any flow control signal on his or her client device, resulting in a request to the central controller 200 to switch the downstream video displayed on the participant's client device to the participant's choice. Regardless of the number of participants on the SGVC session, when there is a bandwidth restriction or a small device display area (e.g. in a mobile device or smart phone), this embodiment of the present invention reduces the required network bandwidth and device resources to that of one-to-one video chat sessions between the participants. The central controller 200 receives the participant-selected flow control signals sent from the client applications resident on the client devices. The central controller 200 further manages contention, preemption, and priority, and establishes the communication needed to route or switch the appropriate upstream video to the right address or port mapped to the participants for downstream video and/or audio transmissions according to the selected flow control signals. When the client device has a larger display area and also has high end-to-end network bandwidth, the system can detect and send if requested by the SGVC participant more than one downstream video The FC client application in this case may be able to show multiple real-time videos of multiple SGVC participants as selected by the participant.

The application server 202 located at the central controller 200 manages and maintains all active SGCV and iBroadcast sessions. It maintains a map of all active participants who are on each SGCV or iBroadcast session and also maintains an active log of all participants who leave any event. It has a presence engine and maintains a dynamic log off and time stamps when any participant enters or leaves a session. The application server manages outbound messaging and inbound communications, maintains status of each client's network and device properties (network bandwidth, latency, priority, preemption, device type information etc.), and communicates user specific information to other resources at the central controller 200. The application server 202 manages the active SGVC sessions and maintains group call initiation, status, and call termination processes and all tasks necessary from the initiation to the termination of a session. The application server 202 controls the session environment based on client specific command signals (e.g. "Yak", "See", "Record Session", "Preemption"). The application server 202 detects the incoming flow control signal requesting specific actions by the client application and instructs the media manager (204) and the switch block (206) to switch/route the selected upstream video to the appropriate address/port of the client devices. These flow control signals are sent by the application server 202 to the media manager 204 which in turn instructs the switch block (206), to map a specific video stream and the (n−1) audio streams which are to be sent to the appropriate ports of specified client devices for downstream transmission. Here, n is the number of participants in the SGVC session. The (n−1) audio streams include the audio streams of the SGCV session participants, except for the client device's own audio stream. For example, in FIG. 2, in a four-party SGVC session with participants S, L, D and M, participant S hears participants L, D, and M on his or her device speaker. Instead of mixing the audio of L, D, and M at a central mixer, the central controller 200 sends the audio streams of L, D, and M to the FC client application on participant S's client device. The FC client application on participant S's client device then performs the audio mixing.

In the case when the number of participants (n) in a SGVC or in an iBroadcast session is large the applications server 202 can instruct the media server 204 to map only one or few audio ports and one or few video ports for each downstream client. The media manager 204 instructs the switch block 206 to open these one or few ports and transmit the (n−1) audio streams and the appropriate number of video streams (which is selected by the client application's flow control command) to the client device over these selected ports. The application server 202 also instructs the FC client application of the number of audio streams (n−1) and the number of video streams and each audio and video streams unique identification number (ID) which is being transmitted over these downstream audio and video ports. The client application intercepts these audio streams and performs its appropriate synchronization and mixing and plays out the video and audio on the device resources. In this embodiment, the central controller 200 performs limited if any pre-processing of the upstream video. Thus, delay and computational resources, such as signal processing, video and/or audio optimization, and compression at the central controller 200 is significantly reduced, which allows for significant scaling and bandwidth optimization for each SGVC or iBroadcast session.

The FC client application according to the present invention may be downloaded to the client device. The client device may comprise a mobile device, a smart phone, PC or notebook, tablet, cellular phones, PSTN phones, or any other intelligent communication device. The FC client application is responsible for maintaining messaging and communications with the application server 202. Once the SGVC or iBroadcast session is initiated and the session participants receive the notifications to join the SGVC or iBroadcast session, the FC client application resident on each client device launches a UI on the client devices and changes the UI based on the specific information received from the application server 202. In the case that the customer/viewer chooses to be in an iBroadcast session, he/she can also browse the iBroadcast web resources, select a specific iBroadcast session from a directory/list of session to join and initiate the communications with application server 202 from the browser interface. In the case where the FC client application chooses to participate in an SGVC, the FC client application can also receive instructions from the participant via the client resident UI and accept the participants' command signal selections (e.g. "Yak", "See", "Record"). The FC client application communicates this request to the application server 202 over the existing TCP connection (or other communications protocol), which sets up the necessary central controller resources to include the participant in the appropriate SGVC session. The FC client application also detects other flow control signals selected by the participants (e.g. selects a new conference group member's flow control image or button). The FC client application transmits information of the selected flow control signal to the application server 202, which depending on various client specific environment parameters (e.g. device type— PC, Smartphone, Tablet, network type—internet, cellular, PSTN, Radio, TV, cable and bandwidth high, low etc.) instructs the central controller resources to speed up or slow down the data transmission rate or increase or decrease the number of video streams to the client device and sets up the URL or port mapping for the downstream video chosen by the participant. The FC client application also receives the (n−1) audio streams, synchronizes the downstream video being viewed with its associated audio stream, mixes the synchronized audio with the remaining audio streams from other participants, and sends the mixed audio to the client device media player. The downstream video(s) are played on the video display area of the client device by the FC client application.

The FC client application is also responsible for the transmission of upstream audio/video. When the application server 202 sends the FC client application signal to upstream audio and video, the FC client application intercepts its input audio/video stream from its built-in audio/video device (video camera/microphone), from any external video camera/audio device, or from stored audio/video file. This intercepted audio/video data is split into its audio and video components, encoded, time stamped, and put in appropriate transport packets and sent to the central controller 200. In this embodiment of the present invention, the intercepted audio/video from the video/audio device can also be kept as a single stream, timestamped, and sent upstream to the central controller.

The FC client application both generates and time stamps each audio/video data packet, which when requested, is transmitted to the central controller 200. The FC client(s) receives (downstream) the streams based on what the customer/client chooses to view by selecting the flow control signal (e.g. as in the case of SGVC), or by joining a specific iBroadcast session. The FC client applications use the time stamped audio/video data packets to synchronize the specific audio to its own video and then sends this synchronized audio (Sa) to the FC client applications audio mixer where it is mixed with other downstream audio (if there is more than one audio downstreamed to the FC client). This mixed audio output is then sent to the device's audio player. The synchronized video(s) (Sv(s)) is sent to the FC clients video rendering engine and then to the client device media/video player. In addition to the synchronization of audio/video the FC client application also performs gain control, jitter management, noise cancellation, frame rate adjustment based on network bandwidth and other operations.

In addition, in the case of SGVC a participant selects the downstream video of the participant they want to see, or joins a specific event as in the case of iBroadcast, and this selected flow control signal is sent to the application server 202. The application server 202 instructs the media manager 204 to map the upstream video port or iBroadcast stream of the requested session participant to the downstream video port of the client device. After the mapping, the media manager 204 instructs the switch block 206 to route the upstream video to the ports assigned on the client device for down streaming video. The embodiment of the present invention can support very large numbers of switched group video chat participants while, in the worst case (low bandwidth with small client device display area as in current smartphones) taking up bandwidth resources needed for only one upstream and one downstream video chat session between each pair of participants. Each SGVC participant can hear all the other participants on the group video chat session and select which SGVC participant they want to "See" on their device. Thus regardless of the number of participants on the group video call, the bandwidth needed for each client device/participant is that of a one-to-one video chat session. If there is sufficient network bandwidth and larger display area on the client device, the participant on the SGVC may choose to have more than one video stream sent to their client device, thus "Seeing" more than one participant video on their display. The number of participants to be displayed on the SGVC participants device (also as in an iBroadcast session) is dependent on the client devices network bandwidth, client device compute resources, video display area and the FC client applications decision on the number of video streams it wants to downstream.

In the case of iBroadcast, the embodiment can support and dynamically scale from two to a large number of participants. During an SGVC session, any participant who is transmitting upstream video data can be viewed by multiple, single or no participants on the SGVC session. This provides significant flexibility and choice to each participant regarding who and what he or she wishes to view based on the participants of the SGVC session. This is in contrast to current video conferencing solutions that at a minimum require n*128 or so Kbits/sec of downstream bandwidth. When the conference group members (n) reach three or more, the bandwidth requirements rise significantly. In addition, the high quality video requires significantly more bandwidth than 128 Kbits/sec. In general, the higher the video quality of the conference, the higher the bandwidth requirements.

The switch block 206 sends the audio downstream of all the SGVC session participants, except for the participant's own audio stream, to the designated port/address of each session participant client application. As an example, assume that participant S in FIG. 2 selects the flow control signal for participant D to "See" participant D. The application server 202 instructs the media manager 204 to map the appropriate ports to downstream, to FC Client S and upstream video/audio from FC Client D. The media manager 204 maintains the dynamic switching map and instructs the switch block 206 to set up the necessary port connections. In this case, the FC client application on S's client device receives multiple audio (La, Da & Ma) and one video stream (Dv). The FC client application on S's client device synchronizes the downstream audio of Da with the associated video stream from Dv. This synchronized audio stream (Ds) is then sent to the audio mixing logic at S's FC Client application resident on client device, which mixes the now synchronized audio streams of Ds with the audio stream La and Ma. The mixed audio output is then played on S's client device audio player. At the same time, the synchronized video stream from D (Dvs) is played on S's client device media/video player. The participant S is now able to see the synchronized video stream (Dvs) of participant D and listen to the mixed audio of La, Ds, and Ma where Ds is the synchronized audio. This embodiment significantly reduces the lag between D's video and audio playback as it synchronizes D's video (Dvs) with D's audio (Ds) prior to playing.

This embodiment of the present invention leverages the audio mixing resources already available on the client device, or uses the FC client application's mixing algorithms thus significantly reduce the resources needed at the central controller 200. The FC client application on each client device manages any delay/latency of data payload and handles any buffering needs, if applicable. The inherent nature of the Internet and routed networks do not guarantee that all data, video or audio packets will arrive at a destination within a tolerable and acceptable time. When the audio and video are real-time or near real-time, any appreciable delay (e.g. more than ¼ second) between the video and its associated audio is distracting to the viewers/customers. However, if the video and its associated audio are synchronized with each other, this video/audio pair can be viewed a few frames ahead or behind the mixed session audio, as long as the audio/video pair is synchronized to each other within an acceptable tolerance.

FIGS. 3-1 through 3-6 illustrate an embodiment of the switched group video chat (SGVC) initialization and routing/switching according to the present invention. One of the SGVC session participants (the "initiator") launches his or her FC client application. The initiator's FC client application receives a request to initiate the SGVC session (301). In this example, the initiator's client device starts a TCP connection and communicates with the application server 202. To initiate the SGVC session, the initiator identifies the other participants of the SGVC by selecting a specific group of participants from the directory at the initiator's client device or by creating a new ad hoc group. The initiator's FC client application sends the request for the SGVC session with information on the other participants in the selected group to the central controller 200 (302). The application server 202 receives the request to initiate the SGVC session with information on the participants in the selected group (303). The application server 202 verifies the participant information and establishes a unique session ID and allocates resources for the SGVC session (304). The application server 202 then instructs the notification manager 203 to send a notification and SGVC session information to each participant's client device (305). Once each participant client device receives the notification of SGVC session information (306), each participant client device launches the FC client application and displays a new UI on the participant's client device (307). In this embodiment, the UT displays options including "Yak" (i.e., talk without video), "See" (i.e., talk and video) and "No" (do not accept session). Each participant client application receives a selection of "YAK", "SEE", or "NO" from its participant (308). A participant may select "Yak" to join the SGVC session as an audio only participant, such as when the participant's client device does not have a video camera or a carrier data plan that allows upstream video, or may simply choose not to enable up streaming of video. However, these participants can receive downstream video and audio, similar to accessing the Internet and browsing the web. Another session participant may select "See", thus enabling his or her FC client application to send upstream video and audio to the central controller 200. With both "Yak" and "See", the FC client application makes a TCP (or UDP or other communications protocol based on underlying network) connection with the application server 202 (309). Each participant FC client application then sends downstream video and audio port/addresses information to the application server (310).

The application server 202 receives control signals "Yak", "See" or "No" from the FC client application (311). If the control signal is a "No" the application server 202 removes this participant from the SGVC session participant list (312). When the application server 202 receives a "See" command signal (313), the application server 202 instructs the media manager 204 to assign and map each "See" participant's upstream video and audio to specific video and audio ports on the switch block 206 (314). In response, the media manager 204 instructs the switch block 206 to map the initiator's upstream video and audio ports to the downstream video and audio ports of each "See" participant FC client application (315). Each SGVC participant is now seeing and hearing the initiators video/audio stream. In this embodiment, the maximum number of downstream audio ports for each FC client application is a function of the client device and carrier network limitations, and not of the resources of the central controller 200. However, for practicality, an upper limit can be established for mobile devices, as well as for other computing device platforms. In instances when the number of participants (n) in a SGVC is large, the downstream audio may be sent over a single (or few) port. The application server 202 maintains and records, for the duration of the SGVC session, each "See" participant's FC client applications information, IP/Port address for upstream and downstream video/audio data and flow control/command signal connections (316). The application server 202 sends the addresses or ports to send their upstream video and audio to the FC client application of each "See" participant (317). Each FC client application of a "See" participant connects to the central controller over a one-to-one video chat session (324) and enables the upstream video and audio connections with the switch block 206 (325).

The switch block 206 receives the upstream video and audio from each "See" participant (318). The application server 202 instructs the media manager 204 to enable the switch block 206 to route the initialization video and audio streams to all participants (319). The switch block 206 maps the initialization video and audio streams to each participant client devices' downstream address or port (320). In this embodiment, the initialization audio and video streams are the initiator's. Alternatively, the initialization video and audio streams can be any audio and video stream selected by the application server 202 from a library of existing recordings or live video and audio streams from one of the other session participants.

When the application server 202 receives a "Yak" selection (313) from a session participant, the application server 202 records the "Yak" participant as one having no camera but has browsing capabilities (321). The application server 202 instructs the media manager 204 to assign each "Yak" participant a port for the upstreaming of audio and maps the "Yak" participant client device's ports or addresses for downstream video and audio (322). The application server 202 sends the address or port information for the upstream audio to the "Yak" participant client device's FC client application (323). The "Yak" participant's FC client application receives the port or address information and makes the appropriate connections for the upstream voice (326). The application server 202 accepts and establishes a one-to-one video chat session with each participant and establishes a "virtual" many-to-many video chat session internal to and visible only to the central controller 202. Each participant client device receives the initiator's video stream and the session participants' audio streams except for their own (327).

Each session participant's FC client application decodes and synchronizes the initiators downstream video with the initiator's decoded downstream audio (328), and then mixes this synchronized audio with the other downstream audio of other SGVC session participants before the mixed audio of (n−1) streams is played by the client device's audio player (331). The downstream video which is decoded and synchronized by each participant's FC client application is then sent to the client device media player, and played by the device media/video player (329).

Once the initiation phase is complete, the session participants can utilize the full set of features and functions available to their respective service plans, device and network capabilities. As each participant joins the session their individual Flow Control Tab (which could be their image/photo, icon, name or number or any other identification mark) appears across all the SGVC participants UI which the FC application on the participants device receives from the central controller 202 (332). A session participant can now choose to view a different participant from the initiator by selecting a specific flow control signal choice from the icons appearing on participants UI. As mentioned above, the flow controlled signal choices are displayed by the flow control client application UI and can be images, phone numbers, names or anything else representing the session participants. The participant can scroll and select the session participant they want to view and/or hear. Once the FC client application receives a participant's flow control signal request to view a video stream of a SGVC session participant (333 and 334), the FC client application sends the flow control request to the application server 202 over the established connection (335). The application server 202 receives the request and instructs the PPCM 205 to detect and respond if there is any contention with respect to preemption or priority (337). If the PPCM 205 detects either a set preemption flag (i.e., current SGVC session is being preempted by initiator's choice) or a set priority flag (i.e., another participant has priority to send a specific video stream to the participant), then the PPCM 205 informs the application server 202 of the contention. In response, the application server 202 informs the flow control client application of the contention (336). Upon receipt, the FC client application displays this information on the client device UI and requests that the participant to try again later. If there is no contention, then the application server 202 instructs the media manager 204 to map specific upstream video to the participant client device's downstream video port (341). The media manager 204 performs the mapping and directs the switch block 206 to send the upstream video to the downstream video port assigned to the participant FC client application which is requesting the new video stream (342). The participant client device receives the selected video stream (340).

At any time in the SGVC session, the initiator and other participants can choose commands from a set of command options from a pull down menu. The initiator may select from a large number of commands, such as Preemption, Priority, Translate (language translation), Terminate Session, Add or Remove participants, Select Front/Back camera, Accept or Reject new participants to the current session, Record the session, Playback a pre-recorded session and Mute or un-Mute any participant on the session. The other session participants are provided a subset of these commands. Once the user selects a specific command through the FC client UI, the FC client application sends this command signal to the application server 202. If the command signal is from the initiator (351), and the initiator requests preemption (364), then the FC client application requests that the initiator choose which SGVC participant's flow control to use to force the preemption (365). Preemption can be video only preemption or it can be a video and audio preemption. As an example, if the initiator sends a preemption request, the initiator's FC client application also sends information to the application server 202 indicating whether the preemption is a video only preemption or a video and audio preemption. If the preemption is a video only preemption (366), the FC client application receives from the initiator a selection of a session participant's video to be used as a preemption video stream (367). Alternatively, a pre-recorded or a live streaming video may be selected as the preemption video stream. The FC client application on the initiator's client device sends the preemption command and the selection of the preemption video to the application server 202 (368). The application server 202 instructs the media manager 204 to map the selected upstream video port to the downstream video ports of the other session participant client devices (338). The media manager 204 maps the new path and instructs the switch block 206 to redirect this video stream to the downstream ports of the session participant client devices. The audio ports are not changed since they are not affected, unless the preemption video is a prerecorded or live video stream. However, if the original preemption signal from the initiator's client device was to preempt both video and audio, then in addition to the video ports being remapped, all the downstream audio traffic is suppressed except for the audio from the selected session participant's FC client application. The initiator's client device maintains the audio streams from the session participant client devices, which is a special feature of the initiator FC client application. This is established by the application server 202 and executed by the media manager 204. If the preemption is both a video and audio preemption, then the FC client application receives, from the initiator, a selection of a participant's video and audio streams, or a prerecorded file or URL, with which to preempt (369). The initiator's FC client application sends a preemption command signal for a video and audio preemption to the application server 202 (370). The application server 202 instructs the media manager to map the appropriate preemption video and audio port to the downstream video ports of the SGVC participant devices (339).

When the removal of the preemption command by the initiator is communicated to the application server 202, the application server 202 releases the preemption restriction, clears the preemption flag, and notifies the session participants of the change, and brings the session to a normal status.

When a FC client application receives a "leave" command selection from a participant (343), indicating that the participant wishes to leave the SGVC session, the FC client application sends the "leave" command signal to the application server 202 (344). The application server 202 instructs the media manager 204 to disconnect the participant from the session and to release the resources associated with this participant (348). The application server 202 then disconnects the connection (TCP, UDP or other communications protocol) with the participant's client device (349), updates the SGVC participant list accordingly, and informs each remaining session participant's FC client application of the updated SGVC participant list (350). In response to receiving the update, the FC client applications of the remaining participants update their respective UI to reflect the change while holding the SGVC session (347). The leaving participant's flow control client application releases the client device resources for the SGVC session (345), concluding this participant's exit from the SGVC session (346).

When the initiator client device receives a "terminate SGVC" command (353), the initiator client device's FC client application sends the "terminate SGVC" command signal to the application server 202 (356). The initiator client device's FC client application releases the device resources for the SGVC session (357). The initiator client device then exists the SGVC session (358). When the application server 202 receives the "terminate session" command from the FC client application at the initiator client device, the application server 202 sends a "terminating session" message to the session participant client devices (359). The application server 202 instructs the media manager 204 to termination the SGVC transmissions and to release resources for the SGVC session, and in response, the switch block 206 releases the ports associated with the SGVC session (360). The SGVC session at the central controller 200 is thus terminated (363). At the client devices, the SGVC session participants' FC client applications leave the SGVC session (361), and thus exits the SGVC session (362). When the initiator client device request is not a "terminate SGVC" command (353), the FC client application sends the command signal to the application server (354). The application server receives the command signal and performs the appropriate task (355).

Figures 1, 3:
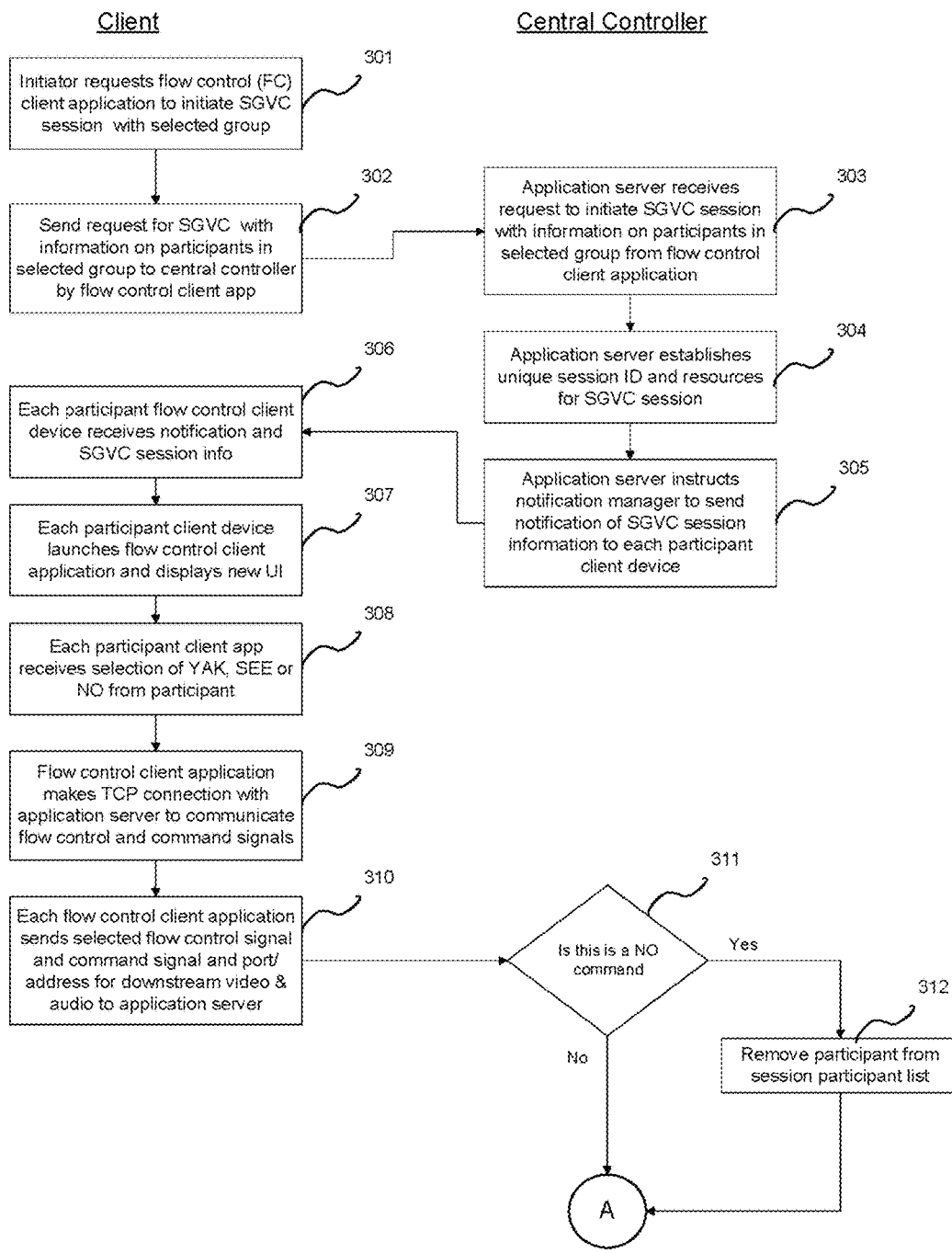
Figures 2, 3:
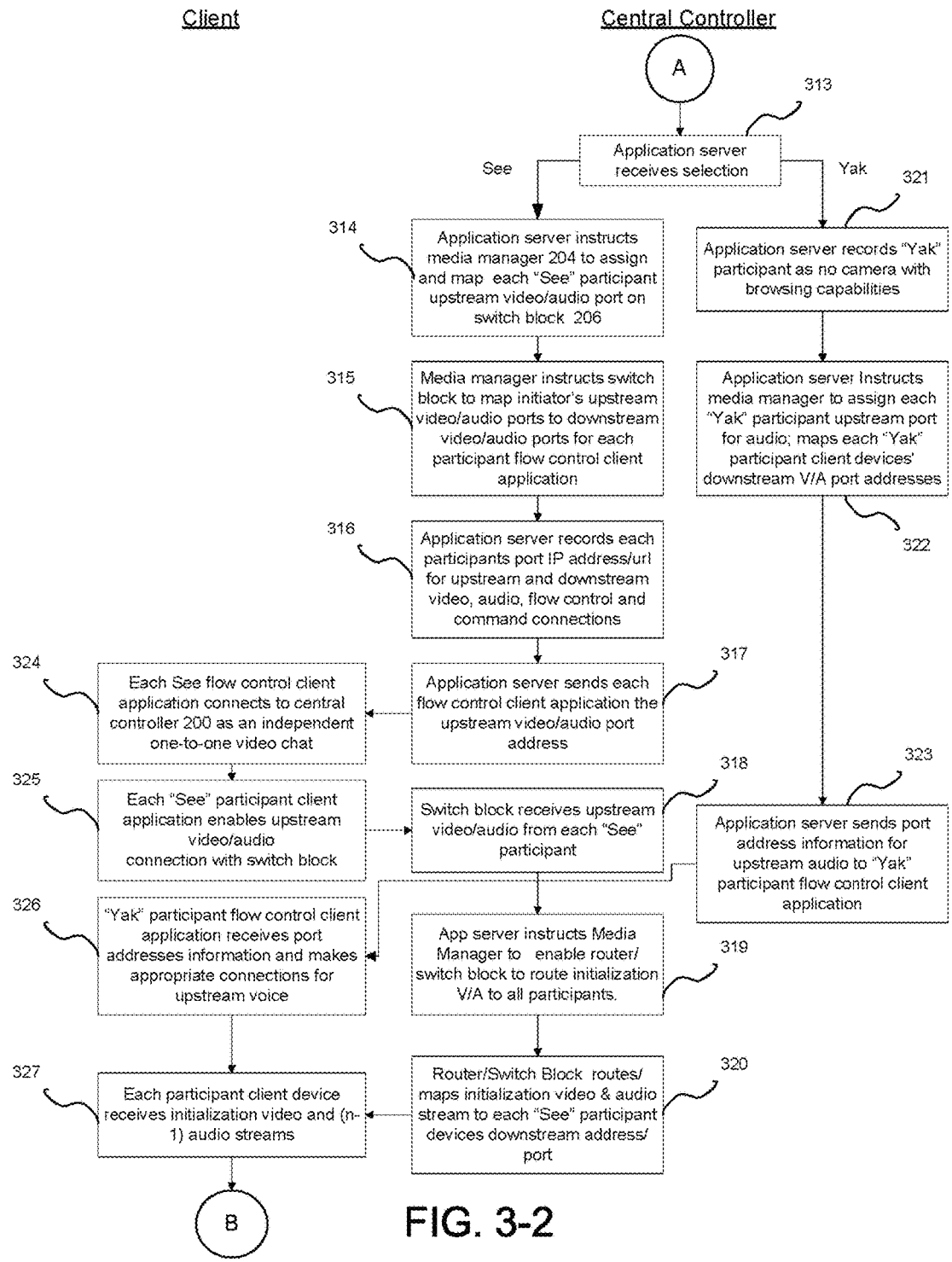
Figure 3:
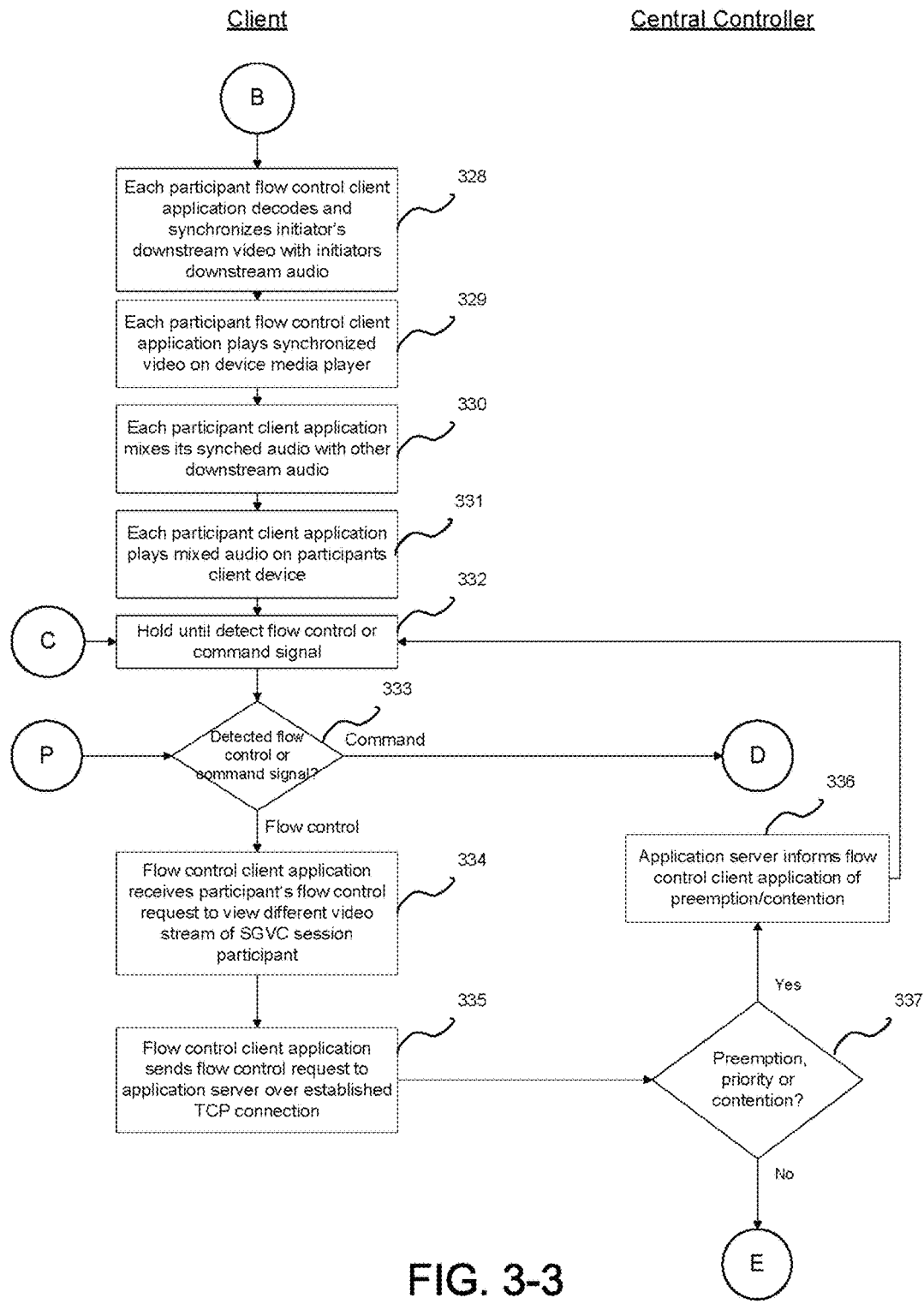
Figures 3, 4:
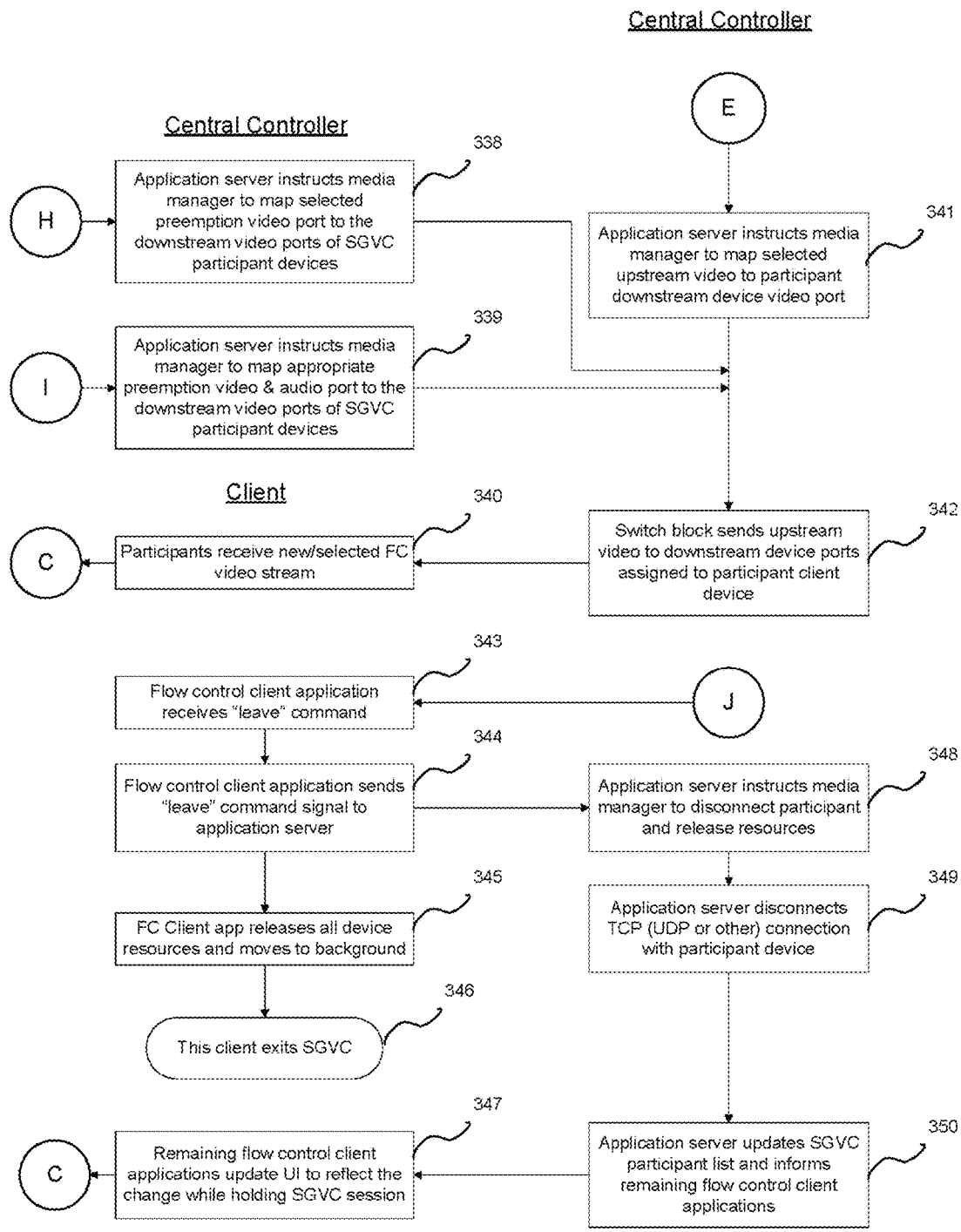
Figures 3, 4, 5:
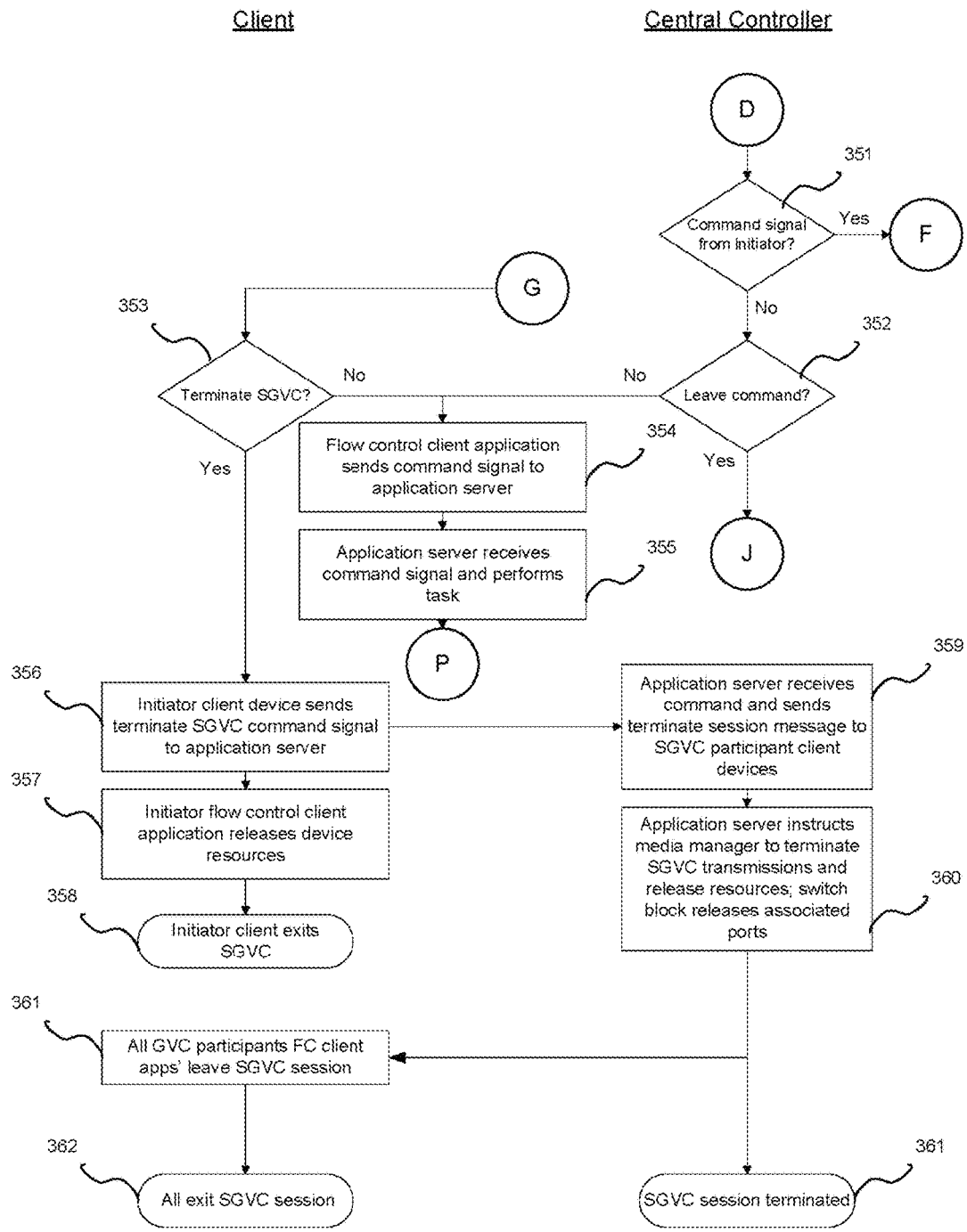

FIGS. 4-1 through 4-5 illustrate an example of a FC based switched group video chat according to the present invention. FIG. 4-1 shows example client device interfaces as the initiator sets up the SGVC session according to the present invention. The initiator (i1) launches the FC client application at the initiator client device or initiates a session using the web browser connecting with the SGVC service. In this example the client device launches the UI on the display 451, and the client device connects with the central controller 200 using a TCP connection (or other communications protocol). The initiator client device shows the initiator the directory of the existing groups (Group 1, Group 2 . . . etc.), which was earlier created by the initiator. The initiator may change, edit or create a new group prior to initiating a new session. The initiator may also choose to create an ad hoc group from the initiators contact/directory to initiate an ad hoc group video chat session or a one-to-one chant session.

Assume in this example that there are four participants in Group 1 (g1): initiator (i1); participant 2 (p2); participant 3 (p3); and participant 4 (p4). A client device UI comprises a display area 452 where the downstream video selected by a given participant is displayed. In this example, display area 452 is displaying the video of the initiator (i1). The icons 454-457 comprise representations of the participants of Group 1, such as images, phone numbers, or names. The icons 454-457 represent the flow control selection signals of the participants in the SGVC session. The flow control signal area 453 is scrollable, and a given participant can scroll and select whose downstream video the given participant wants to view. As discussed above, the selection is dynamic and real-time, or near real-time, and any participant can view any other participant on the session by selecting the appropriate flow control signal icon. In addition to the downstream video displayed in viewing area 452, a given participant also sees him or herself via a video loopback on his or her own device display area As an example, if session participant p2 selects flow control signal icon 454 for viewing the initiator's video, then participant p2 will see the initiator's video in the display area 452 while viewing his or herself on icon 455. Similarly, participant p3 can select the flow control signal icon 457 to see the video of participant p4 on the display area 452 while watching him or herself on icon 456. The video loopback does not impact the network bandwidth as this video stream does not leave the participants' device. This allows each participant to see what the other participants would see when they select to see this participant.

The area 458 below the flow control signals is the area for displaying representations of the command signals, "Yak" 459 (audio only), See 460 (enable upstream video transmission), and c1 461 (open command menu). Selection of the "Yak" command signal 459 allows the session participant to join the SGVC session as an audio only participant with no upstream video capability. For example, the participant may choose this option when the participant's device does not have a video camera, when the participant does not have a carrier plan for upstream video, when the participant chooses not to upstream video because of restrictions on their data plan, or when the participant simply chooses not be seen at this time. In a "Yak" mode, the participant can select the flow control signal to receive downstream video without upstreaming his or her own video, while actively participating on the audio session.

Selection of the "See" command signal icon 460 allows the participant's video to be upstreamed and viewed by other session participants. A participant who selects to be the "See" mode can later, within the same session, choose to change to the "Yak" mode. Likewise a participant who selected to be in the "Yak" mode, likewise, can later change to the "See" mode and upstream his or her video for viewing by other participants in the same session. The application server 202 manages the participants' flow control signal selections, adapts the internal controller resources according to the selections, and informs the flow control client applications to update their respective UI's accordingly.

When the c1 command signal 461 is selected, a command to open the menu 467 is displayed. In this example, the command menu is displayed as a pop-up menu with a list of command buttons. Examples of command signals that may be part of the command menu include, but are not limited to: (i) Chat, to open a group chat session and chat display area; (ii) Add, to add a new user to the SGVC session; (iii) Remove, to remove a specific or several participants from a SGVC session; (iv) Accept, to accept a new participant into the SGVC session; (v) Priority, to set priority levels for the SGVC participants (e.g. default is no priority or all participants having the same priority); (vi) real-time Interactive Broadcast (iBroadcast), to switch the mode of the SGVC session to "real-time Interactive Broadcast" by the initiator, where any participant's video and/or audio stream can be broadcast to all or a select set of participants; (vii) Mute, to select by the initiator to mute one or more session participants; (viii) Front/Back Camera, to select the front or the camera of the client device to capture the upstream video; (ix) Record, to start or stop a recording session (x) Preemption—to force a preemption state to allow a specific person or video and/or audio to be downstream to all the SGVC participants.

FIGS. 4-2 through 4-3 illustrate a flowchart of the example flow control based switch group video chat according to the present invention. The example starts with the initiator launching the FC client application at the initiator client device, connecting (via TCP, UDP or other communications protocol) with the application server 202, and selecting a specific group (e.g. Group 1) from the displayed directory (401). The initiator can choose to edit/modify this specific group or create a new group before requesting the application server 202 to start the session initiation process. Once the application server 202 receives the request to start the SGVC session with the list of participants of Group 1 from the initiator's FC client application (402), the application server 202 establishes the session ID for the SGVC session, and verifies that the participants in Group 1 are valid (403). The application server 202 instructs the notification manager 203 to send the Group 1 participants requests to join the SGVC session initiated by the initiator (404). The initiator's FC client application is sent the relevant ports or addresses to send its upstream video and/or audio to the Central Controller 200. In this case the upstreaming of the video and/or audio starts as UDP, and if UDP is restricted, the application server 202 switches to a TCP connection. The ports or addresses are dynamically assigned. The FC client applications on the Group 1 session participants' devices receives the requests to join from the notification manager 203, and each launches the FC client application on their respective client devices (405). The participants' devices each displays a new UI showing the representation of the initiator 462 (i1), command options for "Yak" 463, See 464, and "NO" 465 commands (406). The given participant can select the "NO" command 465, thus rejecting the request to join the SGVC session. This "NO" command signal is received by the application server 202, which removes the given participant from the session request. In this example, assume that all Group 1 participants accept the requests to join the SGVC session. Each participant can now select either the "Yak" command or the "See" command. In this example, assume participant 4 (p4) chooses the "Yak" command 463 and thus does not upstream any video, although p4 is able to receive downstream video and audio. Assume also that participants p2 and p3 each selects the See command 464. These command signals are transmitted by each respective FC client application on the client devices of participants p2, p3 & p4 to the application server 202. In addition, each FC client application sends its respective device's downstream video and audio port or address to the application server 202 (406). In this example, each FC client application sends one downstream video port and three downstream audio ports or addresses to the application server 202. The application server 202 receives the command signals and the ports or addresses (407). If there is a large number of participants on a SGVC, the application server 202 can choose to set up one or few downstream audio ports for each FC client application and downstream the SGVC participants audio over these one or few audio ports to each FC client application on the SGVC. This action by the application server 202 conserves the total number of allocated ports for the SGVC and reduces the number of downstream ports for each receiving client device. The upstream ports are located on the switch block 206, which is assigned to receive the upstream video and/or audio traffic from the client devices of participant's p2, p3, and p4. Here, the client device of participant p4 only gets an upstream audio port since p4 selected the "Yak" mode. After receiving the information, the application server 202 instructs the media manager 204 to map the required upstream and downstream video and audio ports for the client devices of participants p2, p3 and p4 (407) (ports for initiator i1's client device are already mapped). The media manager 204 maps the resources and instructs the switch block 206 to assign the transport ports or addresses. The application server 202 accepts the one-to-one video chat connections for the "See" mode participants and the voice connection for the "Yak" participants. The application server 202 also informs the G1 session initiator and participants (i1, p2, p3 & p4) FC client application of the port address, downstream video and audio commands and their respective mode of "Yak" or "See" (408). The media manager 204 instructs the switch block 206 to send the initiator's video stream and the three audio streams of the other participants to each participant client device (410). Each FC client application opens their respective receiving ports and updates their respective UI to let the participants know of the status of the other participants in the G1 session, and to receive and transmit the video and/or audio streams (409). The initiator's upstream video and audio (i1) are now streaming down to the client devices of participants p2, p3 and p4 on their specific downstream ports. Participants p2 and p3 are sending upstream video and audio to the switch block 206, and p4 is sending only an audio stream up to the switch block 206. The initiator's FC client application plays back the initiator's video stream (411). The session participants i1, p2, p3 and p4 each receives (n−1) audio streams. In this example, the FC client application on participant p2's client device receives the audio stream of i1, p3 and p4 and synchronizes the downstream video from the initiator with the associated downstream audio from the initiator (412). The FC client application on participant P2's client device sends this synchronized audio, along with the downstream audio streams from participants p3 and p4, to the audio mixer. This mixed audio stream is then played on participant p2's client device while playing the initiator's video on display area specifically allocated for the downstream video (413). The initiator's video and audio streams can be any video and audio stream selected by the initiator and/or the application server 202. In some cases, during session initiation and set up, the application server 202 can choose to send to the G1 participants' specific video and/or audio streams other than that of the session initiator. This concludes the initiation phase of the G1 SGVC session.

Once the initialization phase is complete, the participants or the initiator can select to view a different participant by selecting his or her corresponding flow control signal representation on their UI. Here, the session participants are on a bridged audio session where each participant can hear the mixed audio of all the other SGVC session participants. However, each SGVC participant can only see one video stream. If not restricted by bandwidth limitations, and/or there is enough video display area on a given participant's client device, the given participants can select more than one participant's video streams to view at one time. The application server 202 monitors, manages and detects the network bandwidth and/or device restrictions and informs the FC client application on the given participant's client device of the number of downstream video streams the given participant can receive at a time. Assume here that there is restrictive network bandwidth and/or a limited display area, such as that in a cellular network or with a mobile device or smartphone. Assume also that after being placed into a mode where the initiator's video stream is viewed, as described above, the initiator i1 selects participant p2's flow control signal, participant p2 selects participant p3's flow control signal, participant p3 does not change the selection, and participant p4 selects participant p3's flow control signal, as illustrated in FIG. 4-3. Each session participant can choose to dynamically select any flow control signal at any time and do not have to wait or synchronize with anyone else on the session. The flow control signals are transmitted from each FC client application to the application server 202 via the established ports (414). The application server 202 receives the flow control signal requests from each FC client application and instructs the PPCM 205 to perform its preemption, priority and contention check. If there is no contention detected, the PPC manager 205 sets the no contention flag. The application server 202 then instructs the media manager 204 to remap the upstream video ports from the session participants i1, p2 and p4 to the appropriate downstream video ports (415). Once remapped, the media manager 204 instructs the switch block 206 to reassign the ports and routes the downstream video to their appropriate ports (416). The intelligence, state and decision logic of all active sessions and their flow control status are managed, maintained and executed by the application server 202. Once instructed by the application server 202, the intelligence of dynamically remapping and maintaining current mapping of each active session, and each participant's upstream and downstream video or audio port is managed, maintained, and communicated by the media manager 204. Once instructed by the media manager 204, the actual switching/routing of the upstream video and audio ports to their associated downstream video and audio ports are executed and maintained by the switch block 206 through the duration of the active session.

As described above, each FC client application synchronizes its selected downstream video with the associated downstream audio, sends this synchronized audio with the other downstream audio to the participant client device's audio mixer, and plays it on the participant client device's media player. Simultaneously, the synchronized downstream video is played on the display area as defined by the FC client application on the participant's UI. In this example, the initiator client device synchronizes the downstream video (p2) from participant p2 with the associated audio (a2), mixes this synchronized audio Sa2 with audio a3 and a4 from participants p3 and p4, and plays the mixed synchronized audio on the initiator client device's speaker. At the same time, the initiator FC client device plays the downstream synchronized video (Sp2) of participant p2 in the display area, which is allocated on the UI by the FC client application on the initiator client device. Likewise, participant p2's FC client application displays participant p3's synchronized video and synchronizes participant p3's video with the audio (a3). This synchronized audio (Sa3) is then mixed with audio from i1, p3 & p4 before it is played on the p2's media player. a. Participant p3 does not changes his or her selection, and the FC client device of participant p4, which is in the "Yak" mode, displays the downstream video of participant p3 synchronized with the audio a3 of participant p3 (417).

Given the flexibility of the architecture, there may be other commands, as described above. These commands can be applied during the SGVC session by the initiator client device and/or by the participants' client devices. FIGS. 4-4 through 4-5 illustrate a flowchart of an example process to manage a "preemption" command request by the initiator according to the present invention. Preemption is a command signal which enables the session initiator to "force" all or a select set of session participants to view and/or hear a specific video and/or audio stream selected by the initiator. This allows the initiator (or a preemptor client device) to have everyone or a select set of the participants on the SGVC to see and/or hear a particular participant on the session. In this case, the FC client application gives the initiator the option to (a) select a session participant, (b) select a pre-recorded video and/or audio stream from the directory or web, or (c) select a live stream by selecting a specific URL to be streamed. The initiator selects the command button 461 in the FC client application UI (418). The FC client application detects the selection and opens the menu 467 (419). The initiator selects a preemption command from menu 467 (420). The FC client application then requests that the initiator select whether this is a video only preemption or a video and audio preemption (421). Assume that the initiator selects a video only preemption and selects the upstream video from participant p3 as the preemption video (422). The FC client application sends a request to the application server 202 with information on the initiator's selections. The application server 202 receives this request and instructs the media manager 204 to remap the upstream port for participant p3 to the downstream ports for participants i1, p2, and p4 (423). The audio ports are now remapped since this is a video only preemption. If the initiator had selected both video and audio preemption, using participant p3's video and audio, then the media manager 204 would suppress the downstream audio of participants i1, p2, and p4 to each session participant. The media manager 204 instructs the switch block 206 to route the upstream video port of participant p3 to the downstream video ports on client devices for participants i1, p2 and p4 (424). Each FC client application receives the downstream video of participant p3, performs the synchronization of the audio stream a3 with the video stream of participant p3, plays participant p3's synchronized video, and mixes the audio streams appropriate to the client device's (n−1) mixing (425).

Assume now that the initiator selects a preemption command from the menu 467 and selects both video and audio preemption (426). Further assume that the initiator selects a preemption with the initiator's own video and audio, forcing the Group 1 participants to see the initiator's video and to hear the initiator's audio. The initiator client device's FC client application sends a request with information on this preemption command to the application server 202 using its existing TCP connection (or other communications protocol) (427). The application server 202 follows the earlier defined process, except that in this example, the application server 202 instructs the media manager 204 to also perform an audio preemption. In response, the media manager 204 remaps the upstream video port of the initiator to the outgoing video ports of client devices for participants' p2, p3 and p4, and flags that the downstream audio ports, except for the initiator client device, as suppressed for the duration of the preemption mode (428). The initiator client device's audio mapping does not change. The initiator thus hears all of the participants' upstream mixed audio streams. The media manager 204 instructs the switch block 206 to perform the physical mapping forcing the initiator's video and audio on all of the SGVC session participant client devices, thereby transporting the initiator's video and audio to downstream video ports for client devices of participants p2, p3 and p4. The initiator's audio port remains connected to receive all of the audio traffic from participants p2, p3, and p4 (429). The FC client applications of the participants each now display the initiator's video synchronized with the initiator's audio (430).

Once the initiator selects the remove preemption command and sends the request for the removal to the application server 202, the application server 202 removes the preemption and brings the session to its normal state.

"Leave" is another example of a command as shown in FIG. 4-5. In the illustrated example, session participant p2 selects the "leave" command, and the leave command is sent by participant p2's FC client application to the application server 202 using the existing TCP connection between participant p2 and the application server 202 (432). The application server 202 receives the leave command signal and instructs the media manager 204 and the switch block 206 to disable participant p2's device ports and to return the port resources (433-435) to the central controller 20. The application server 202 takes participant p2 out of the current SGVC participant list to reflect the fact that participant p2 is leaving the session (433). The media manager 204 in turn instructs the switch block 206 to disable participant p2's ports and to return the port resources (434). The switch block 206 responds by disabling participant p2's ports (435) and the media manager rests its current SGVC session port map to reflect the change of state of this specific SGVC. The application server 202 informs the remaining participants i1, p4 and p3 of participant p2's departure from the session (436). The FC client application on each remaining participant client device updates their respective UI's by removing the flow control signal representation of participant p2, and the session continues in the changed environment (437).

Other commands may be requested by the initiator and/or the participants which change the session's or specifically the session participant's environment. For instance, when the Record command is received by the central controller 200, it sends instructions to the Recording Manager 212A to set up the FC client application' specific request and start recording the session. When the central controller 200 receives the Playback command from the FC client application, it instructs the Playback Manager 212B to set up and start playing back the FC client's request. Likewise when the Central Controller 200 receives the Translate command and the specific language to which to translate the session, it instructs the Translation Manager 212C to set up the translation resources to translate the session requested to the FC client's unique requirements. The flexible SGVC and iBroadcast architecture allows any individual FC client application to dynamically set the translation parameters during a SGVC or iBroadcast session or during playback to their specific language selection. Thus, during a session of n participants, any FC client application can choose to get the session translated in their specific language needs and played on their own FC client application/device. Other session participants in the same session might choose a different language selection.

FIG. 5 illustrates an embodiment of the central controller of the system for a switched group real-time interactive broadcast (iBroadcast or iB) using the switched group video chat according to the present invention. iBroadcast is an interactive audio/video broadcast session where any viewer on the session can be added instantaneously and in real-time to become part of the iBroadcast and be seen and heard by all the other viewers. Using iBroadcast, any individual or group can create their own iBroadcast (iB) session and become the broadcaster of that session (or channel) and reach an audience located anywhere in the world. In essence, any person using iBroadcast (iB) can become his or her own broadcast station, with the ability to reach a global audience, and at any instance in the iBroadcast (iB) session, select any of the viewers on their session to also become part of the iBroadcast. The iBroadcast Controller (iBC) 511, when instructed by the application server 202 manages the iBroadcast (iB) Request Process & Queuing Manager (iBRPQM), the Message Detection and Prioritization Manager 203C and the Viewer Notification Chat/Text Manager 203B. The iBC 511 communicates with the viewers and manages the chat/text and notification during the iBroadcast Manager's (iBM) selection and decision process as to which specific viewers audio/video streams are to be broadcasted onto which specific session. In an iB session, the iBroadcast Manager (iBM) can set up any number of different iBroadcast (iB) sessions and select, from a set of broadcasters, which broadcaster to "show" on specific sessions. As an example, assume that Broadcaster B1, 501, can be viewed by a first set of session viewers (X). On the same iBroadcast Manager (iBM) station, Broadcaster B2, 502, is set up by the iBM to be viewed by a second set of session viewers (Y). Each session viewer, by using their FC Client Application UI or from the iBroadcast (iB) web site, can select the flow control signal of one of several broadcasters displayed on FC client application UI, and can choose which broadcaster's video and/or audio streams they as viewer's wish to receive. In addition a given iBroadcast (iB) viewer may request the iBC 511 to be included in a broadcast session by using the FC client application and sending a notification using SMS, text, chat or some other mechanism to the iBC 511 at the central controller 200. The message detection and prioritization manager 203C receives the incoming viewer request, and the iBC 511 informs the iBroadcast Manager (iBM). The iBM may decide not to respond to the request or may decide to send a notification to the viewer. If the iBM decides to query the viewer, it sends the request to the iBC which instructs the viewer notification manager 203B, to open a communications port with the selected viewer. The notification manager 203B sends the acknowledgement to the FC Client application over the existing chat session, and the switch block 206 establishes the necessary upstream ports to allow the selected viewers FC client application to initiate a one-to-one video chat session between the viewer and iBM. The selected viewers FC client application UI changes and displays not only the current downstream broadcast(s) (one, two or several display windows) but also opens up a separate one-to-one chat window. Based on the viewer's device type (PC, Tablet, smartphone or other computational devices), the FC client application changes the UI based on available display area, processing power or network bandwidth etc. Likewise, the iBM can at any given time select a viewer from set Y to be iBroadcasted to the rest of the viewers in set Y. This iBroadcast (iB) modality allows a real-time interactive broadcast capability. Any individual who is a viewer in the iBroadcast (iB) session can also be, selected to instantly and in real-time be included in the broadcast when enabled by the iBM. This is accomplished by establishing a session between the client and the central controller 202 and the selected viewer's upstream audio/video being placed into the iBroadcast session. This capability is enabled by the flexible iBroadcast (iB) architecture, described above. Any number of viewers can instantly become the "broadcaster or interviewee" while the other viewers on the session are able to instantly and simultaneously view the broadcaster's and/or interviewee's video and/or audio stream.

There are three main participants which make up an iBroadcast session: the viewers who watch and interact with the iBroadcast session; the presenter(s) who are the broadcaster(s); and the iBroadcast session Manager (iBM). iBroadcast sessions can be of any size, from a few people to a large number of people. In addition an iBroadcast session is highly flexible where an individual can establish a private iBroadcast session for his or her family, friends, or clubs. An entertainment or sports celebrity, corporation, news or political organization can set up very large public iBroadcast sessions and open the iBroadcast for anyone to view. Based on the type of iBroadcast session the iBM dynamically adapts to the size of the session, as well as the complexity and other needs of the iBroadcast session. As an example if the iBroadcast is for an individual with a relatively small number of viewers, the iBM reduces its complexity and presents itself as a iBroadcast Manager from small groups. In this case, there are only two main "groups": the viewer or audience; and the broadcaster who is also the iBroadcaster Manager for small groups. The flowchart example below describes the use case for a large iBroadcast session where there are three distinct and separate "groups": viewers (iV) or audience; iBroadcaster(s) or presenter(s) (iP); and the iBroadcast Manager (iBM). There can be one or several iBM's depending on the size of the iB session. For example, in a very large iB session, the master iBM can choose to have several subordinate iBM's to manage the viewer chat sessions and other iBM functions. The master iBM establishes several subordinate iBM's to manage the viewer selection process and be the interviewee queue handlers. The master iBM can also set up a dedicated iBM to monitor the BLEEP function which allows the iBM to stop or "bleep" any inappropriate audio/video from being iBroadcasted.

Figures 6, 7:
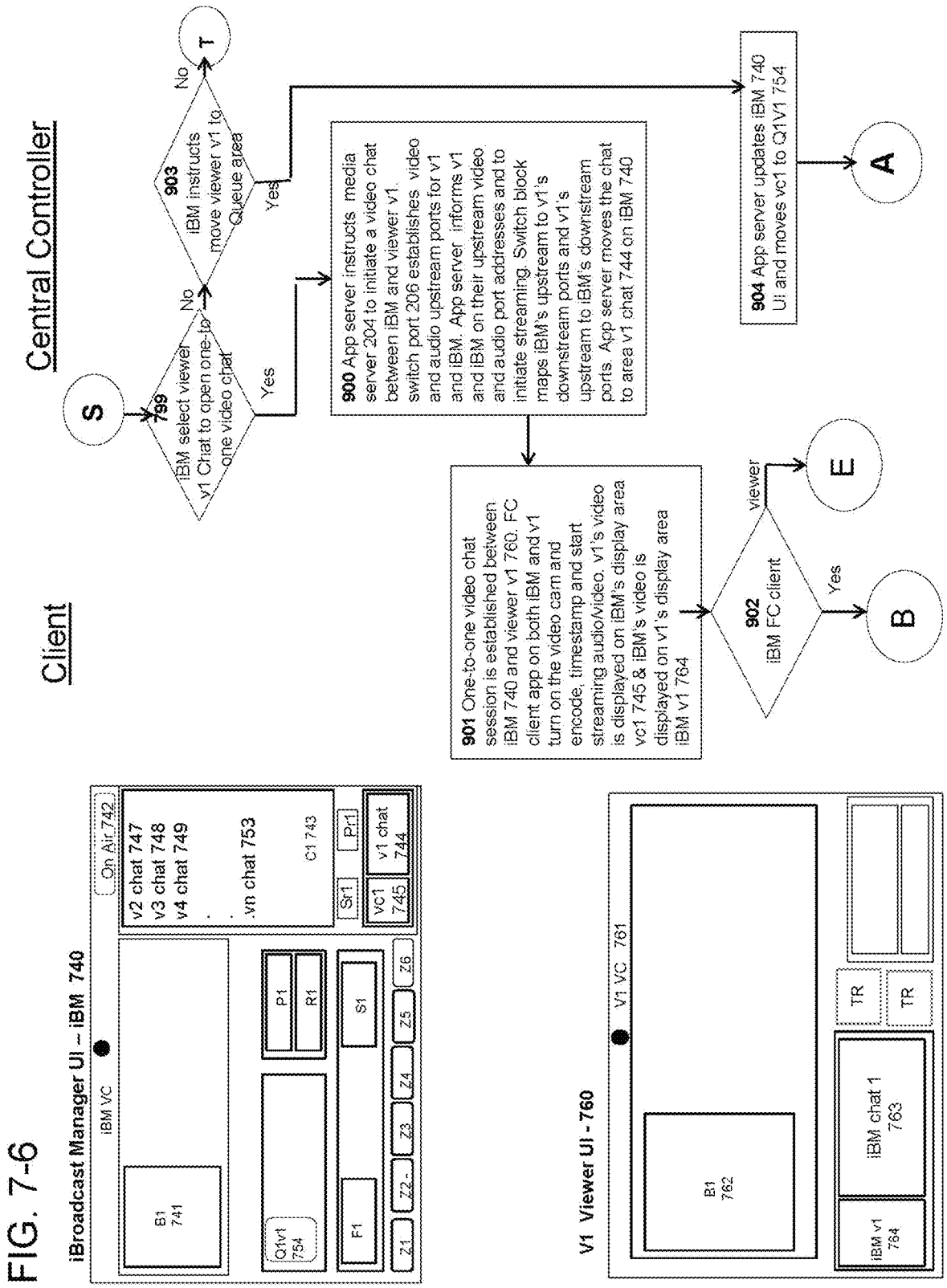
Figure 7:
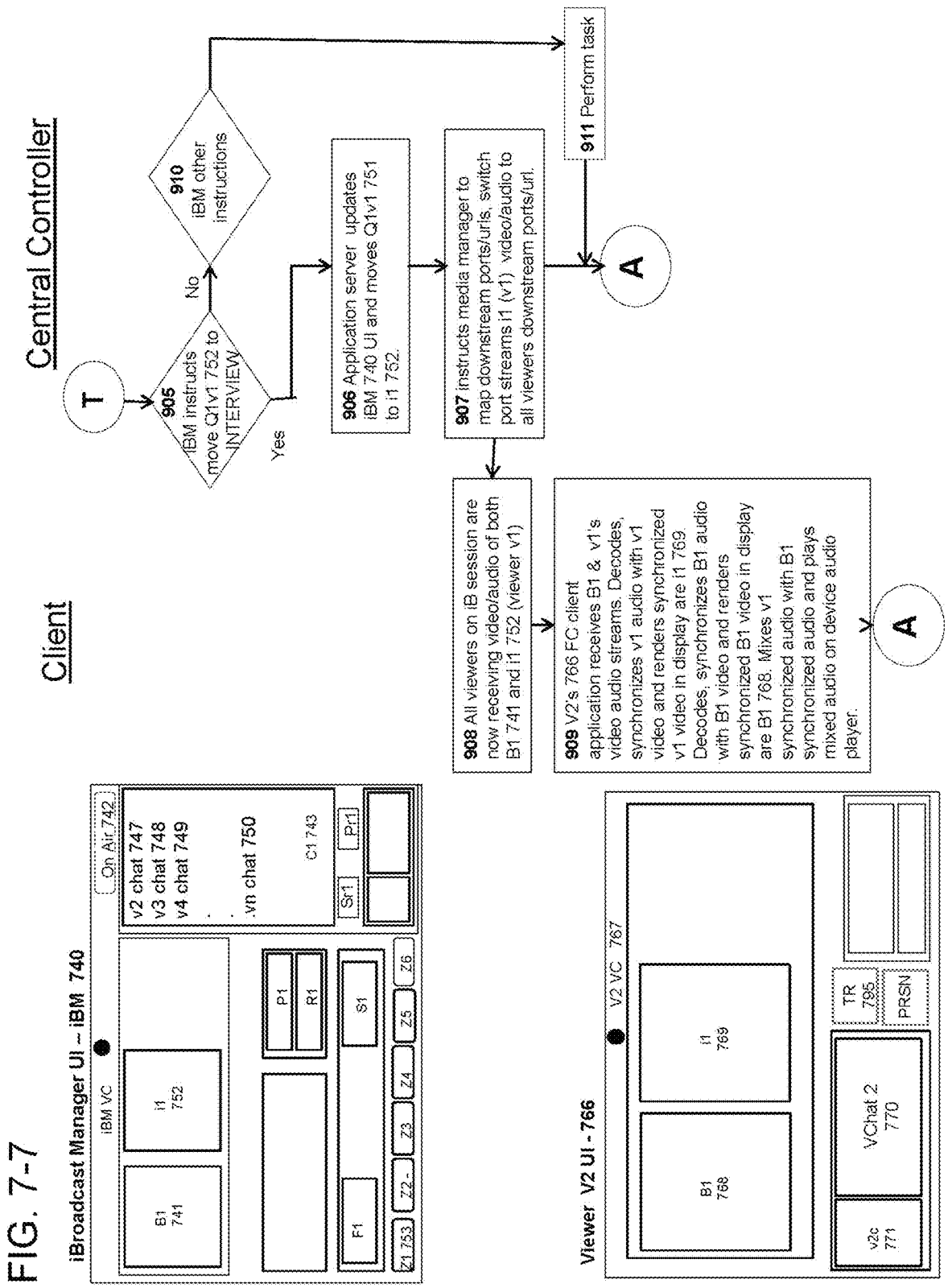
Figures 7, 8:
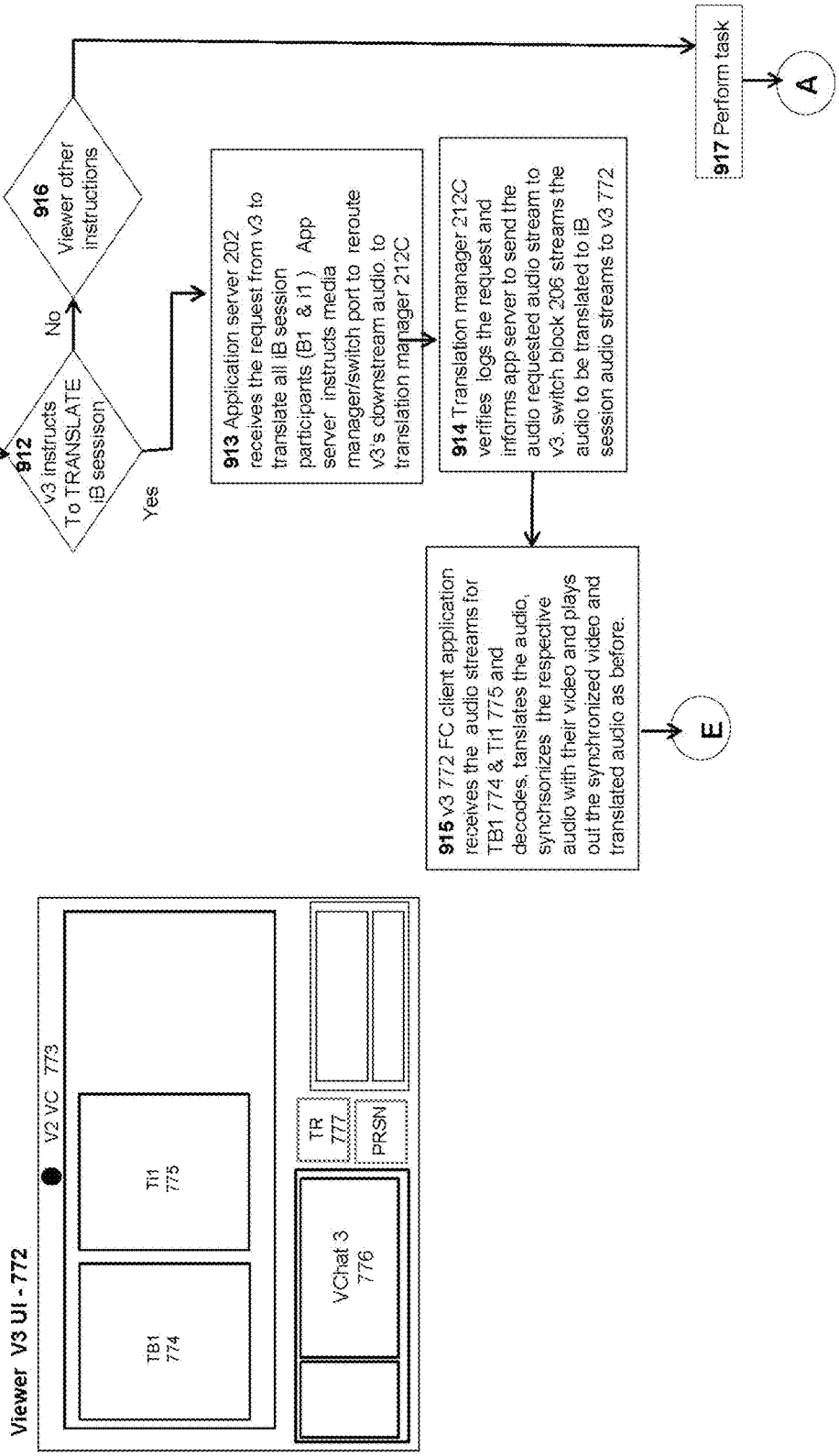
Figures 1, 8:
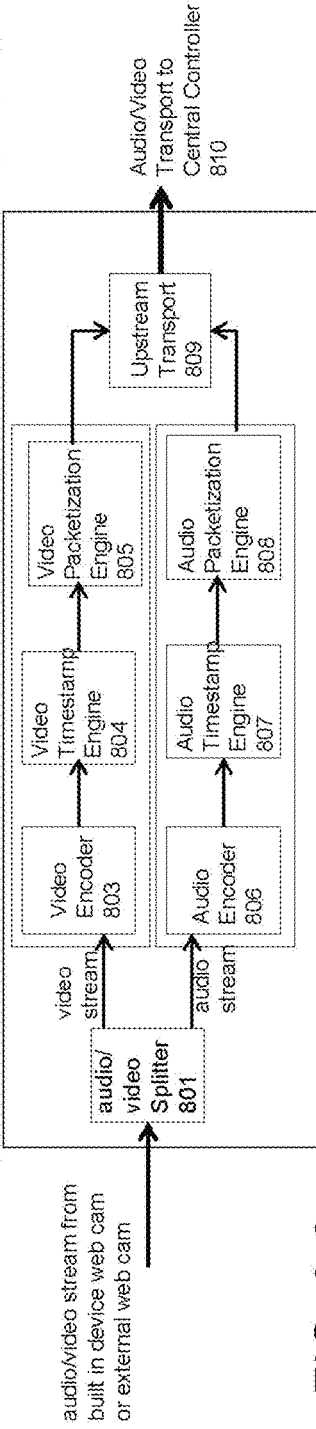
Figures 2, 8:
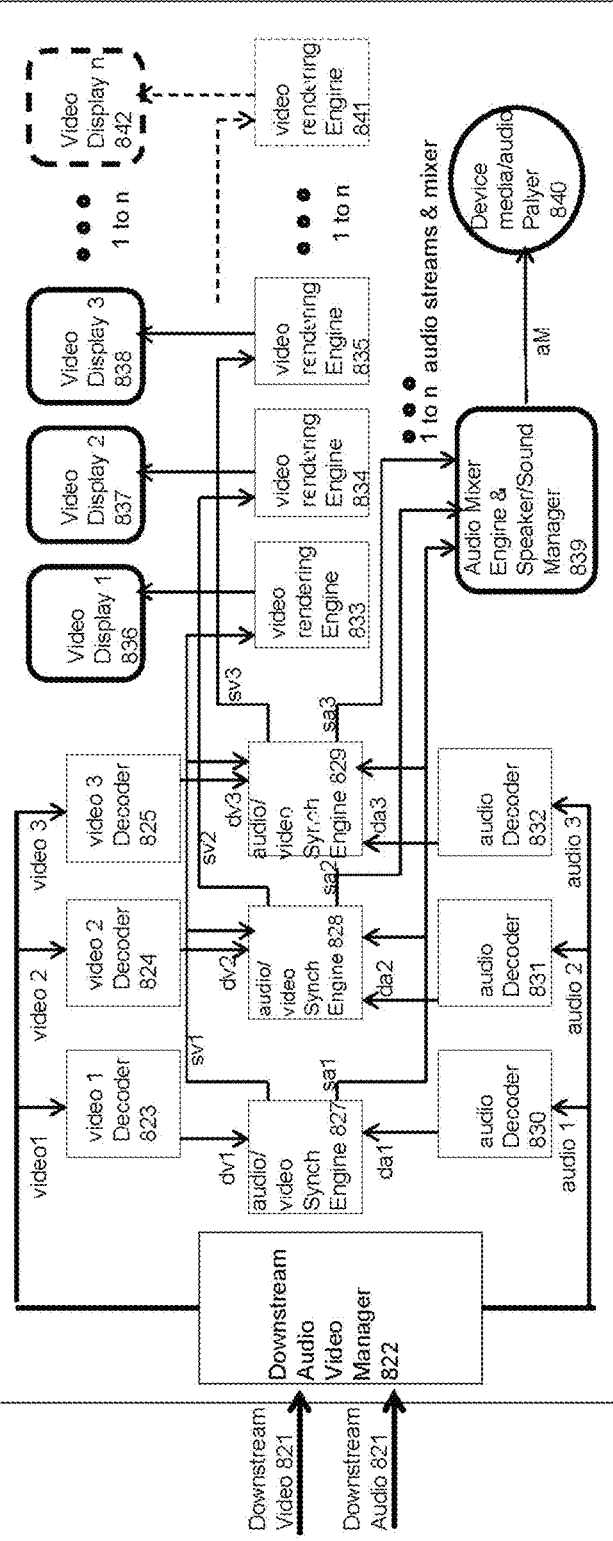

FIGS. 7-1 through 7-8 illustrate an example of a Flow-Control Based Switched Real-Time Interactive Broadcast according to an embodiment of the present invention. These figures show one possible UI configuration for the real-time interactive Broadcast Manager (iBM), the interactive Broadcaster (iB) and the real-time interactive Broadcast Viewer (iV). FIG. 7-1 shows an example iBM user interface (UI) 700 as it registers, communicates with the central controller 200 and initiates an iBroadcast session (iB session). The FC client application on the iBM's client device uses a web browser interface or launches the FC client application to register with the iB web services. The iBM selects a specific iB session or creates a new iB session. Assuming in this example the iBM selects an existing iB session with a pre-registered session ID. Also assume that in this example the iBM selects a single broadcaster (B1) to be the presenter. When the selected iB (B1) registers and starts upstreaming, B1's video is displayed in the iBM's display window B1 701. Once iBM detects that B1 is streaming, the iBM turns on QA 718, the ("On Air" or "Live" command signal). QA 718 sets the session "LIVE or "On Air" and once it is set the function of 718 changes and toggles to become the button to turn the session "Off Air". Once the session is "Live" or "On Air" and since this is a very large "public" iB session any registered user of the iBroadcast service can decide to "Join" this iB session and are able to downstream video/audio of B1 and all contextual information related to this iB session. Furthermore, if any viewer who has "joined" this iB session choose to send a text/chat message to the iBM, that chat/text message is displayed on the iBM's chat/text area C1 704. The iBM can decide to select one or several chat/text participant from the area C1 704. iBM also has a list of participants who have joined the session and can decide to select anyone from this list to place on the iBroadcast session. In this example the iBM selects a chat participant from C1 704, the iBM also sends a request to the application server 202 to set up a session with the selected viewer. The application server 202 established the one-to-one chat session with the viewer (as described in earlier sections) and at the same time the viewer's text/chat is moved to the area C2 716. The viewer's session initiates with the iBM and is displayed in the area VC2 715. If the iBM decided to place this viewer on the iB session and the viewer chooses to be on the iB session, the iBM moves the viewer from VC2 715 to the interviewee queuing area and places them in the interviewee queue—in this case let's assume there are already three iB session viewers (Q1 705, Q2 706 and Q3 707) in the interview queue and this interactive viewer Q4 708 is placed fourth in the queue. Let's also assume that two additional viewers i1 702 and i2 703 were earlier selected by the iBM to be on the "Live" broadcast. All iB session viewers/participants receive the downstream video/audio of B1, i1 and i2 on their FC client applications in addition to all contextual information related to this iB session and enabled by the iBM. The number of iBroadcaster's or the number of interviewees on each iB session is decided by the iBM. There could be several iB's and several interactive viewer interviewee's on the iB session at one time. The iB Session in this invention can dynamically scale and support from 1 to millions of viewers on an iB session and any viewer on the iB session, if selected by the iBM, can instantly become part of the real-Time Interactive Broadcast Session and their video/audio stream can be transmitted to all viewers of the iB session globally.

Sr1 713 is a search control function for chat participants, where the iBM can choose to search through the viewer chat area C1 704 to find a specific viewer or specific text in the chat area. Pr1 714 is a control function for the presence engine showing the total number of participants on the iB session at any given time. In addition if the iBM selects Pr1 714, a global mapping tool is displayed which shows the names and location of all the viewers/participants on this specific iB session real-time. The locations of the viewers/participants may be obtained from a variety of sources, such as a viewer profile, viewer inputting information, a location of an access point or gateway to which the viewer client device is connected, or from the viewer client device's GPS. The viewer's on the iB session have the option on their FC client application to disable this feature and opt out of showing their presence. F1 711 enables the IBM to select any stored video/audio clips or files from iBM's local directory or from the web and play them on the iB session in location 702 or 703.

The iB Session Control and Management Signals area (719) is used by the iBM to control and manage the flow of the iB Session. Z1 717 is the INTERVIEW function which the iBM uses to send the $1^{st}$ person on the queue (in this case Q1 705) to the interviewee area 702 or 703. Once in the "interviewee" area 702 or 703, the switch block 206 on the central controller 200 switches the viewer's upstream audio/video to enable streaming to all the other participants/viewers on the iB session. Z2 718, TOGGLE allows the iBM to send only one selected downstream (audio/video) to FC client application which have small display areas or have slow network bandwidth. In the case of smartphones, the iBM has the intelligence to send only one or two video/audio downstream based on the Flow Control signal of the FC client application (choice of who the client wants to see). Z3 719 BLEEP is used by the iBM to instantly stop a downstream video and/or audio of any presenter—iB (701), or interviewee i1 702 or i2 703. Z4 720 is a command function for iBM to RECORD current iB Session or PLAYBACK a pre-recorded session. Z5 721 allows the iBM to clear all chat message in area C1. Z6 722 TRANSLATE, allows the iBM to translate the iB Session to language of choice by placing the downstream of B1, it and i2 though the specific Translation Manager FIG. 2.0 212 C which is resident on the central controller 200.

FIG. 7-2 illustrates an example of a Real-Time Interactive Broadcast Viewer User Interface (UI)/Block Diagram 729A. The viewers (V1) FC client application registers and joins the iB session. Once it is joined it receives the iB session downstream video/audio and all contextual information related to the iB session. In this example the iBM is downstreaming several video & audio streams which are being displayed on the viewer UI 729, in display area B1 720, i1 721 and i2 722. If V1 chooses to interact with the iB session V1 can send a chat to the iBM from the chat area Vchat 1 724 which is displayed on the iBM's chat display area C1 704. If iBM selects V1 to chat with, then the application server 202 opens up a chat between the iBM and V1's FC client application. iBM opens up a chat display area Vc2 715 and starts a video with V1 which opens up a video chad display area V1 723 on its client device. When the iBM sends question/query/poll or other forms of Q&A it is displayed on the viewer V1's UI in the location V1QA 725. The Viewer V1 can choose to respond by using the reply function in area VR1 726 on V1's UI. TR728 is the translation function and allows any viewer to translate from a list of language options, all or selected downstreams of the presenters, in this example B1, i1 and i2 to the viewer's language of choice. This embodiment allows any viewer on the iB session to dynamically choose and translate any or all downstream video/audio streams of presenters to the viewer's specific language needs. In essence, this invention on any given size of iB session (1 to millions) allows customized and targeted language translation to an individual viewer needs. DP 728B is a function which allows the viewers to opt out of showing their presence.

FIG. 7-3 illustrates an example of a Real-Time Interactive Broadcast Broadcaster User Interface (UI)/Block Diagram 730A. The broadcasters (B1) FC client application registers and joins the iB session. Once it has joined, the iBM sends B1 all the contextual information related to the iB session and requested the application server 202 to initiate B1 video/audio upstreaming procedures. The application server 202 as described earlier, instructs the media manager 204 and switch port 206 to enable B1 to upstream. Once B1 starts its upstream, the iBM receives B1's video/audio and displays it on iBM's display area B1 710, and the broadcaster's UI displays B1 on its display area B1 730. Once the iBM selects the interviewees, their video/audio is displayed on the broadcaster UI "interviewee" display area i1 731 and i2 732. As the iBM puts viewers on its interviewee queue, the application server 202 also populates/updates the broadcaster UT area Q1 733, Q2 734, Q735 and Q4 736. B1's interviewee queuing area is identical to the iBM's. B1PF 739 is the function for selecting to play and stored file/clip or can choose an URL or web site to play out a specific content. B1 can choose to play a video/audio file or clip on the interviewee area 731 or 732. B1B 740 is the function which enables B1 to browse its local directory and/or the internet to find the stored video/audio files/clips to upload to B1's director. B1 can use this for playback purposes from B1PF 739. iBM sends the "question" or "communication soliciting viewer response" to the broadcaster B1's UI in the area marked B1QA 737. The viewers' responses are aggregated but the application server 202 and sent to BR1 738.

FIGS. 7-4 through 7-8 illustrate a flowchart of an example Flow-Control Based Real-Time Interactive Broadcast session with a large number of participants. The example starts with the FC controlled applications registering with the iB website as an interact broadcast manager (iBM) 740 and selecting a specific real-time interactive broadcast session with its unique session ID. In addition the iBM also selects a specific broadcaster B1 (780). The application server 202 is notified and it instructs all central controller 200 resources to allocate resources to enable the requested iB session (781). Application server 202 notifies real-time interactive broadcaster iB and updates iBM that the session is ready to start (782). B1 750 registers with the iB web services which notifies the application server 202 (783). Application server 202 instructs the media manager 204 to map appropriate resources for iBM and B1's FC client applications (784). Media manager 204 notifies switch block 206 to set up the upstream and downstream ports/URL for iBM and B1. Application server 202 instructs B1 to start upstream (785). B1's web cam turns on and starts upstreaming video/audio data to central controller 200. iBM and B1 both receiver B1's video/audio stream and play B1's video/audio on their respective FC client's (786). iBM selects "On Air" 742 and the session is live and B1's video/audio is streaming (787). iBM is waiting to send commands to the application server 202 based on session needs (788).

Once the iB session is "On Air" any viewers FC clients can browse the iB web site and "join" the iB session. As viewers register and join the application server 202 is notified (789). As new viewers join the iB session, the application server 202 notifies the media manager 204 to map new users port/URL's. The media manager 204 instructs the switch block 206 to downstream iB session broadcast to all viewers. Application server 202 updates iBM sr1 with the total number of viewer on the iB session and updates the presence database with viewers presence information (793). Viewers FC client application receive B1's downstream audio/video and all contextual information. Viewers FC client application decodes the audio/video, synchronizes the B1 video with B1 audio, and plays the synchronized B1 video on the display area B1 762 and plays B1's synchronized audio on the device audio player (794). Viewer is now 'tuned in/watching" the iBroadcast session and can choose to interact and send the application server 202 commands (795). Viewers can choose to interact and send chat messages to the central controller 200, in this example viewer v1, v2, v3 and v4 send a chat message with questions and/or requesting to be on the iB session (796). The application server 202 intercepts these chat messages and updates iBM's UI and v1, v2, v3 and v4's chat message show up on iBM chat area c1 743 (797). iBM decides to select v1 to chat with and sends application server 202 a notification by selecting v1's chat/text (798). Application server 202 receives the command from iBM (799). Switch Block 206 establishes video/audio upstream ports for iBM and v1, and application server 202 informs iBM and v1 to start streaming. Switch port 206 streams iBM's upstream video/audio to v1 and v1's audio/video to iBM (900). FC client applications on both iBM and v1 turn on their video cams, encode the video/audio data, timestamp and stream to the switch block 206. iBM 740 displays v1's downstream video at vc1 745 and v1 760 displays iBM's downstream video in iBMv1 764 area (901). iBM selects to move v1 to the queue area Q1v1 754 and instructs application server 202 (903). Application server 202 updates iBM 740 UI and moves v1 to Q1v1 754 on iBM 740. iBM instructs application server 202 to put v1 in the iB session and broadcast v1 to the iB session viewers by selecting the INTERVIEWEE control tab Z753. Application server 202 moves v1 from the queue Q1v1754 and places v1 in the "interviewee" area i1

752 and updates iBM UI (906). Application server 202 instructs media manager 204 to map v1's upstream to all viewers, media manager 204 instructs switch block 206 to stream v1's upstream to all viewers URL's/ports (907). All viewers on iB session are now receiving video/audio streams of both B1 741 and i1 752 (908). As an example, viewer v2 766 FC client application receives B1 & v1's video and audio streams. It decodes and synchronizes v1 audio with v1 video, re-synchronizes the v1 with the synchronized B1 video (which operates as the reference video) and renders the synchronized v1 video in the display area i1 769. Likewise it decodes and synchronizes B1 video and audio and render synchronized B1 video in the display area B1 768. Mixes v1 synchronized audio with B1 synchronized audio and plays mixed audio on device audio player (909).

Viewer v3 selects TR777 to translate the iB session, and application server 202 detects the request (912). Application server 202 instructs media manager 204 to reroute v3's downstream audio to the translation manager 212C on the central controller 200. Switch block 206 reroutes audio ports (913). Translation manager 212C logs the client device and user requesting the translation and informs the application server to send requested audio to the viewer v3. Switch block 206 sends the requested audio downstream to v3 FC client application 773. (914). V3 772 FC client application receives the audio for TB1 774 & Ti1 775, decodes, translates using translation engine on client application and synchronizes the respective audio with their video, and plays the synchronized audio and video as before.

Figures 3, 4, 5, 6:
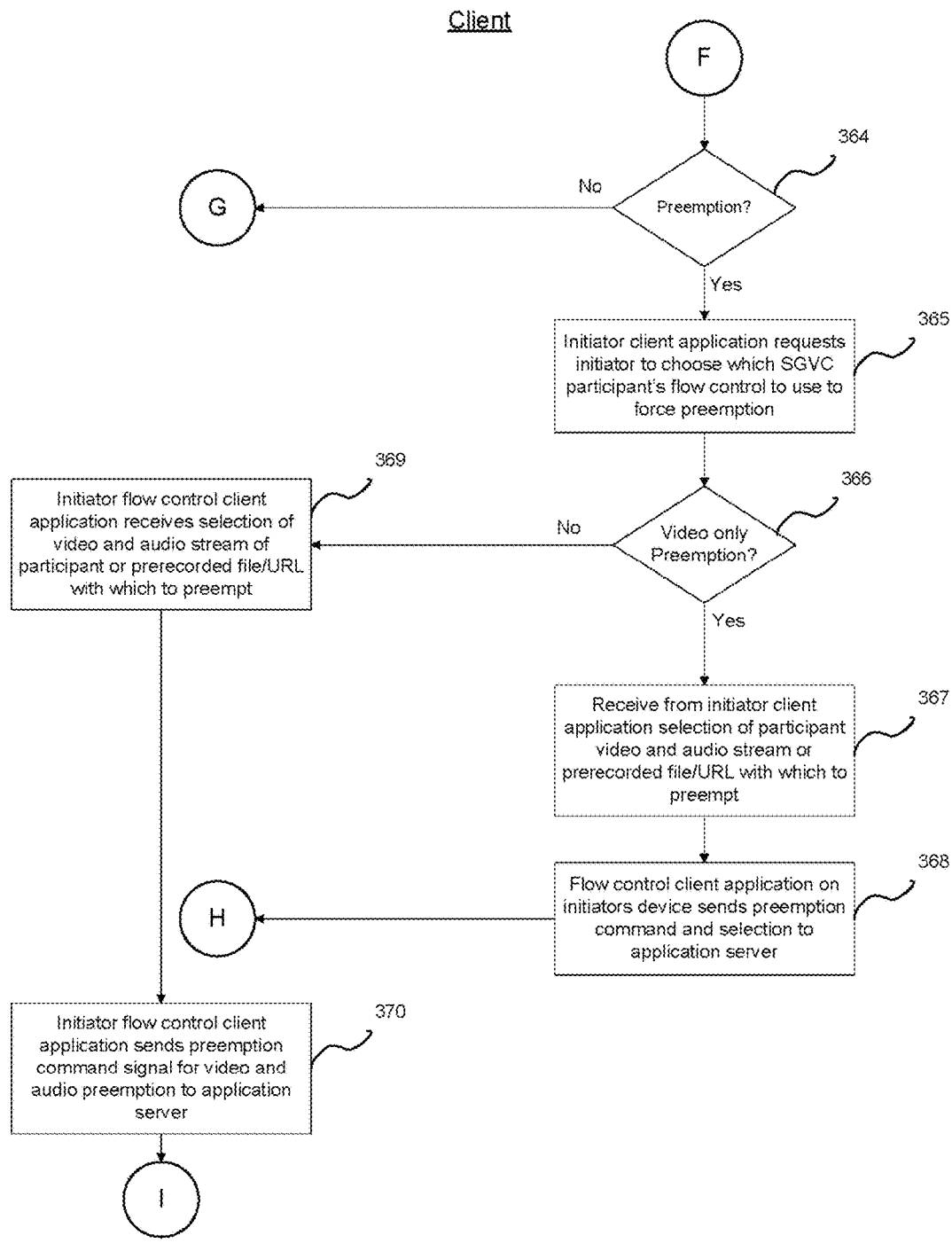
Figures 1, 4:
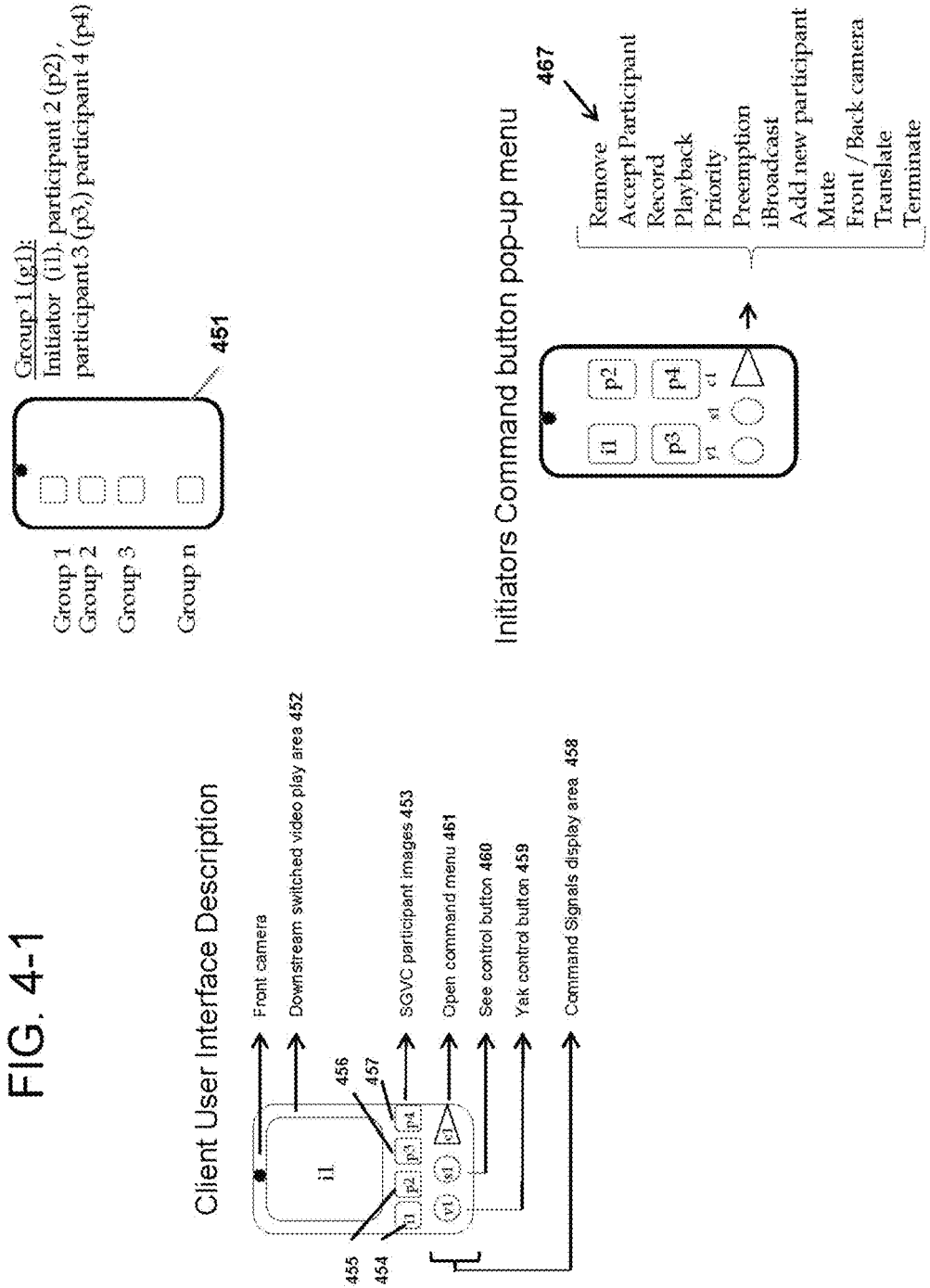
Figures 2, 4:
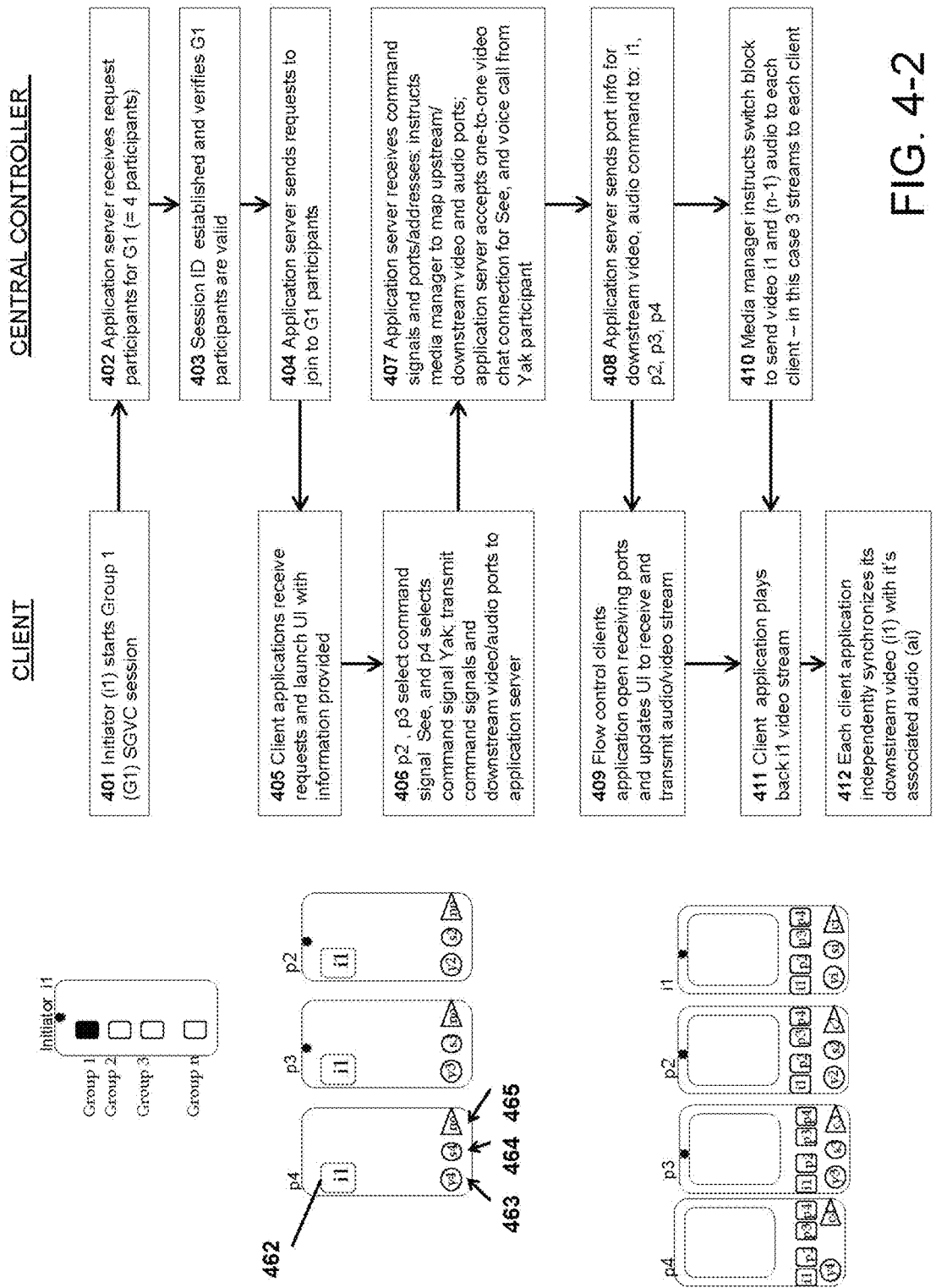
Figures 3, 4:
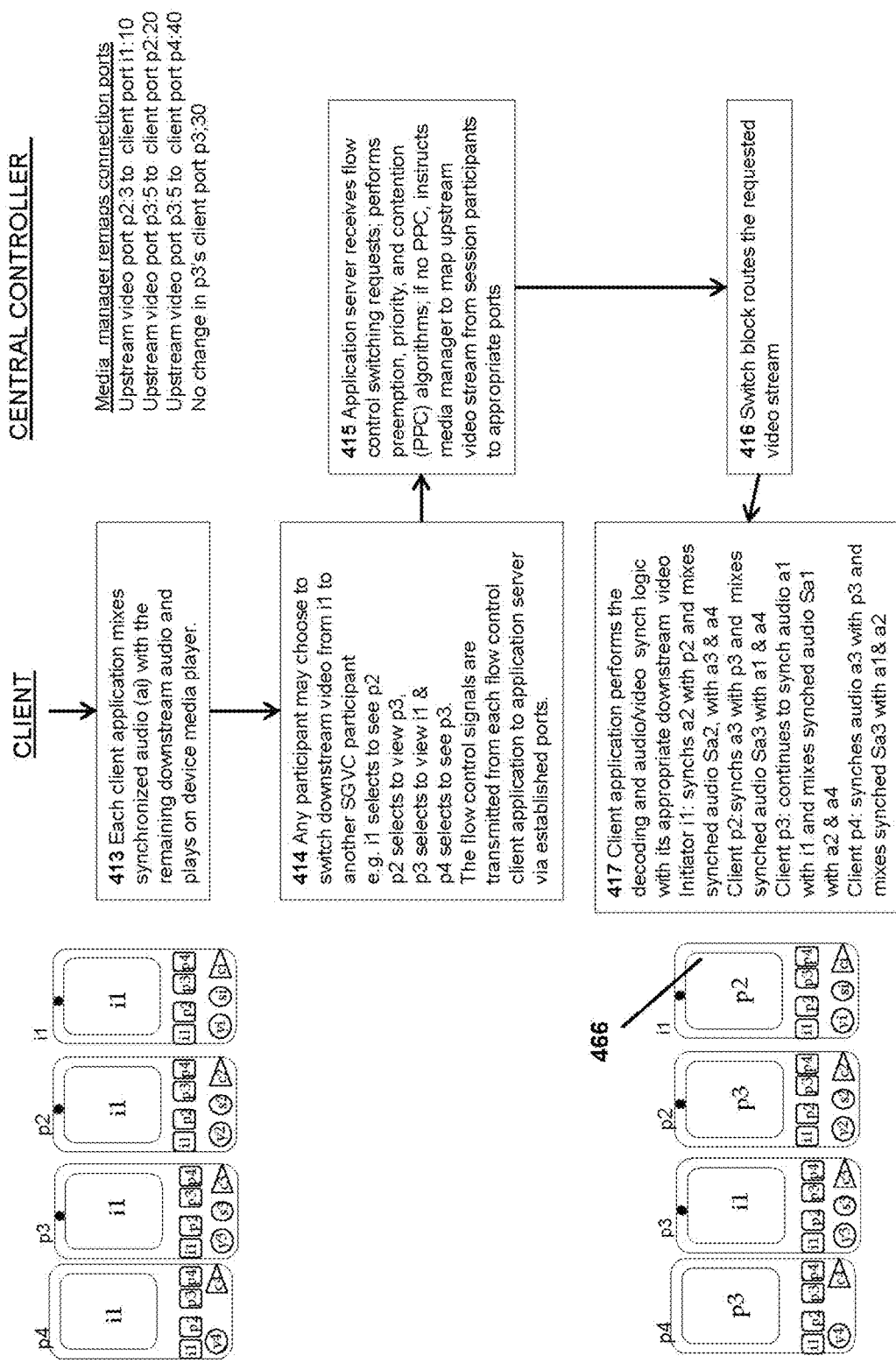
Figure 4:
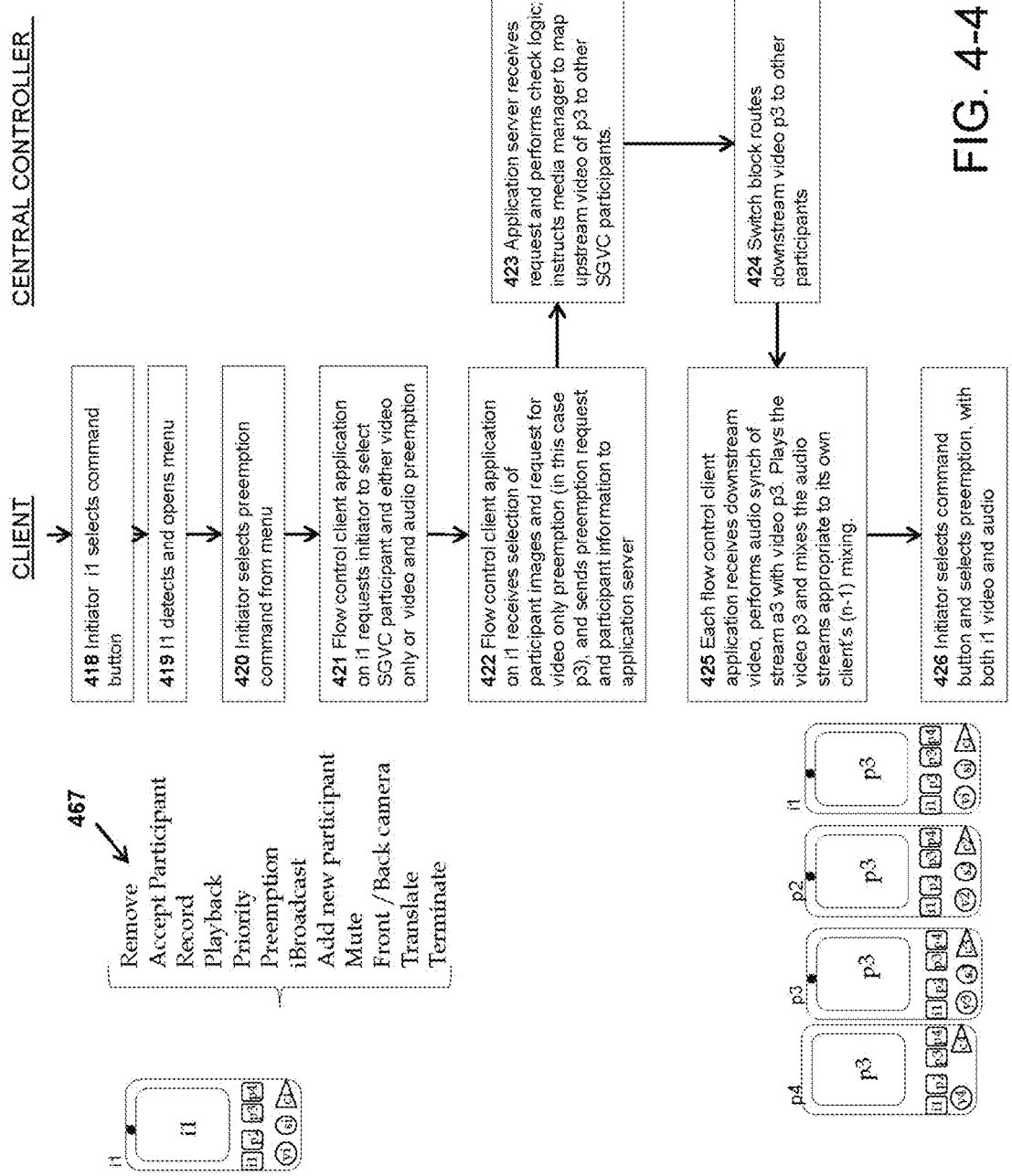
Figures 4, 5:
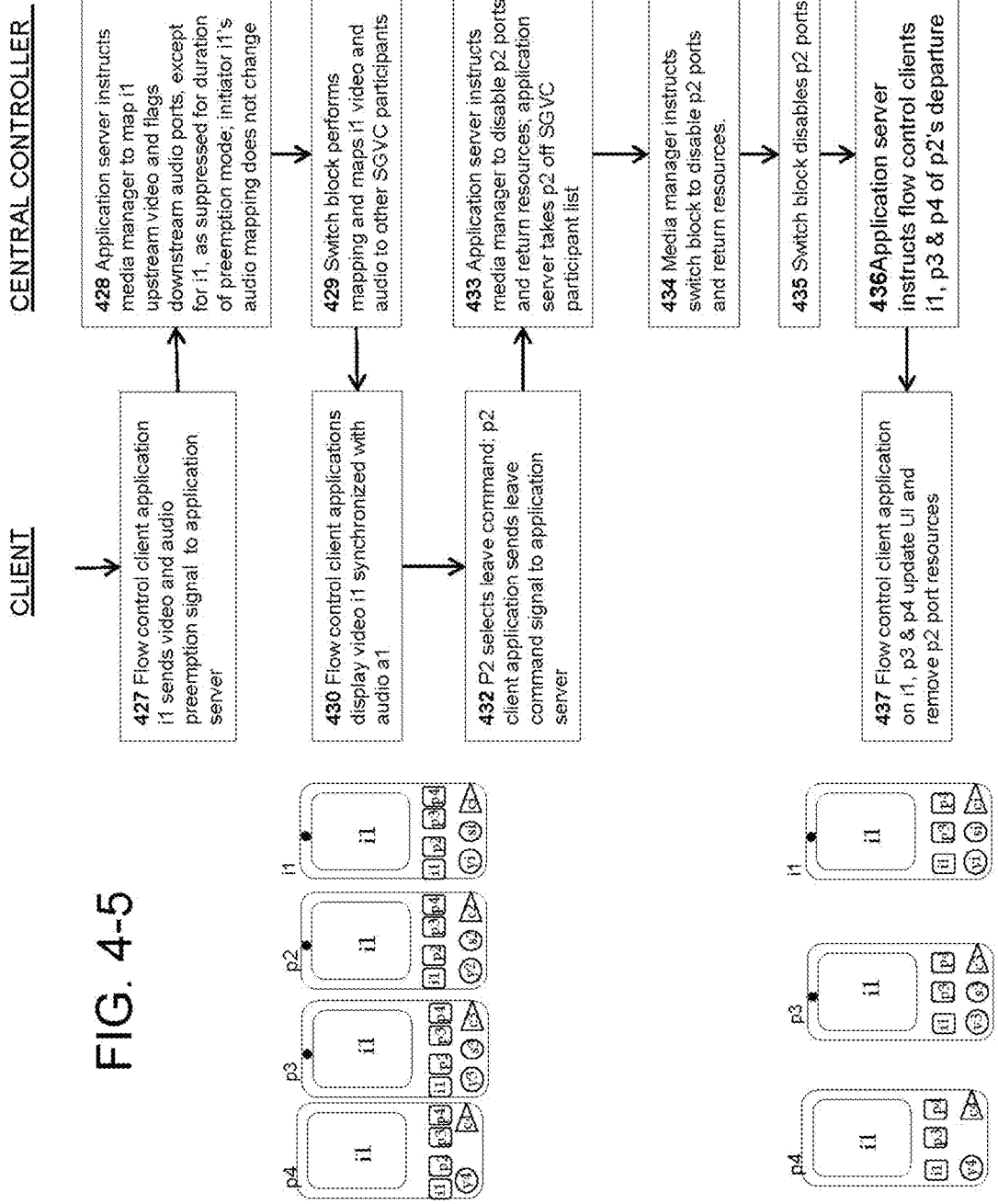
Figure 5:
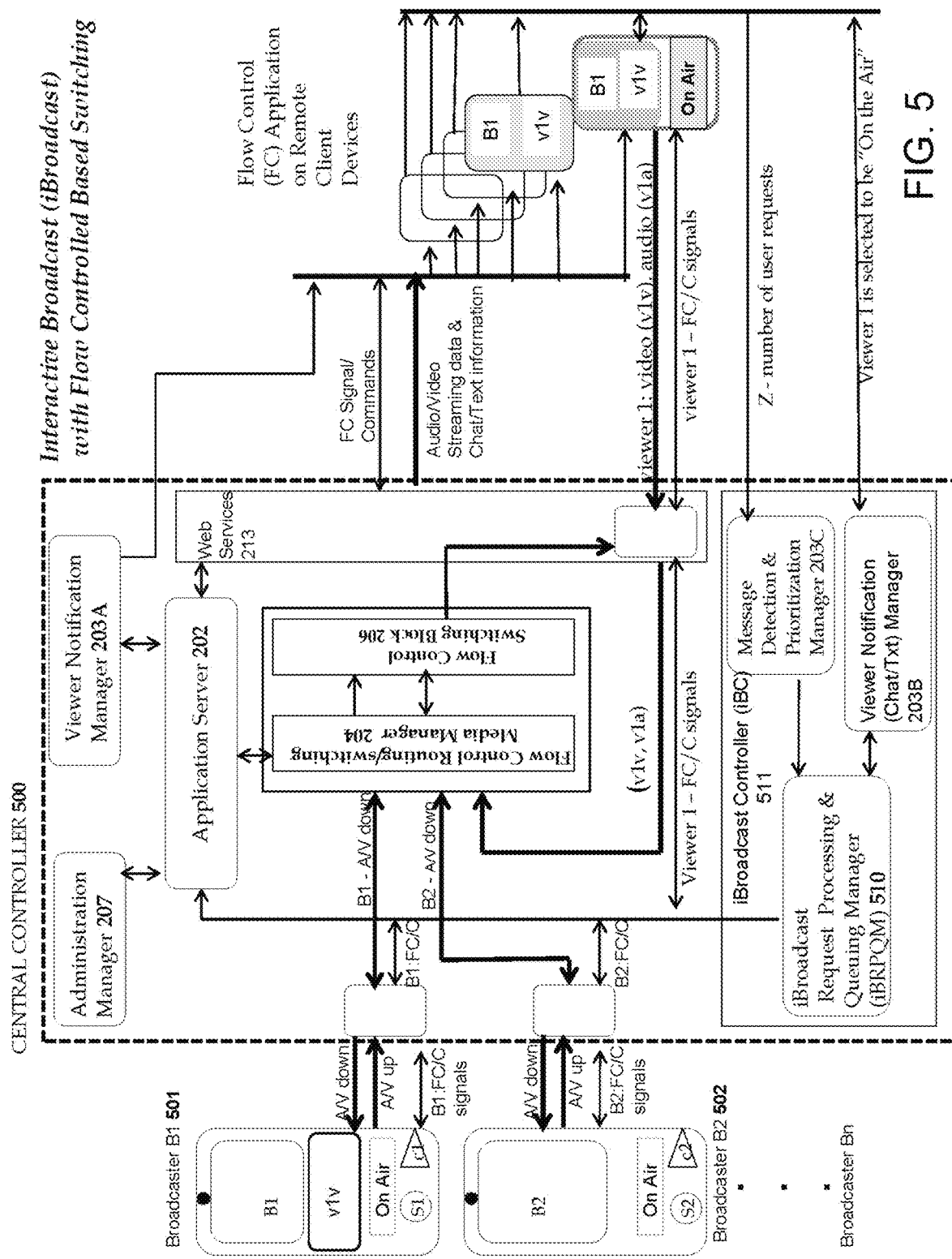
Figures 1, 6:
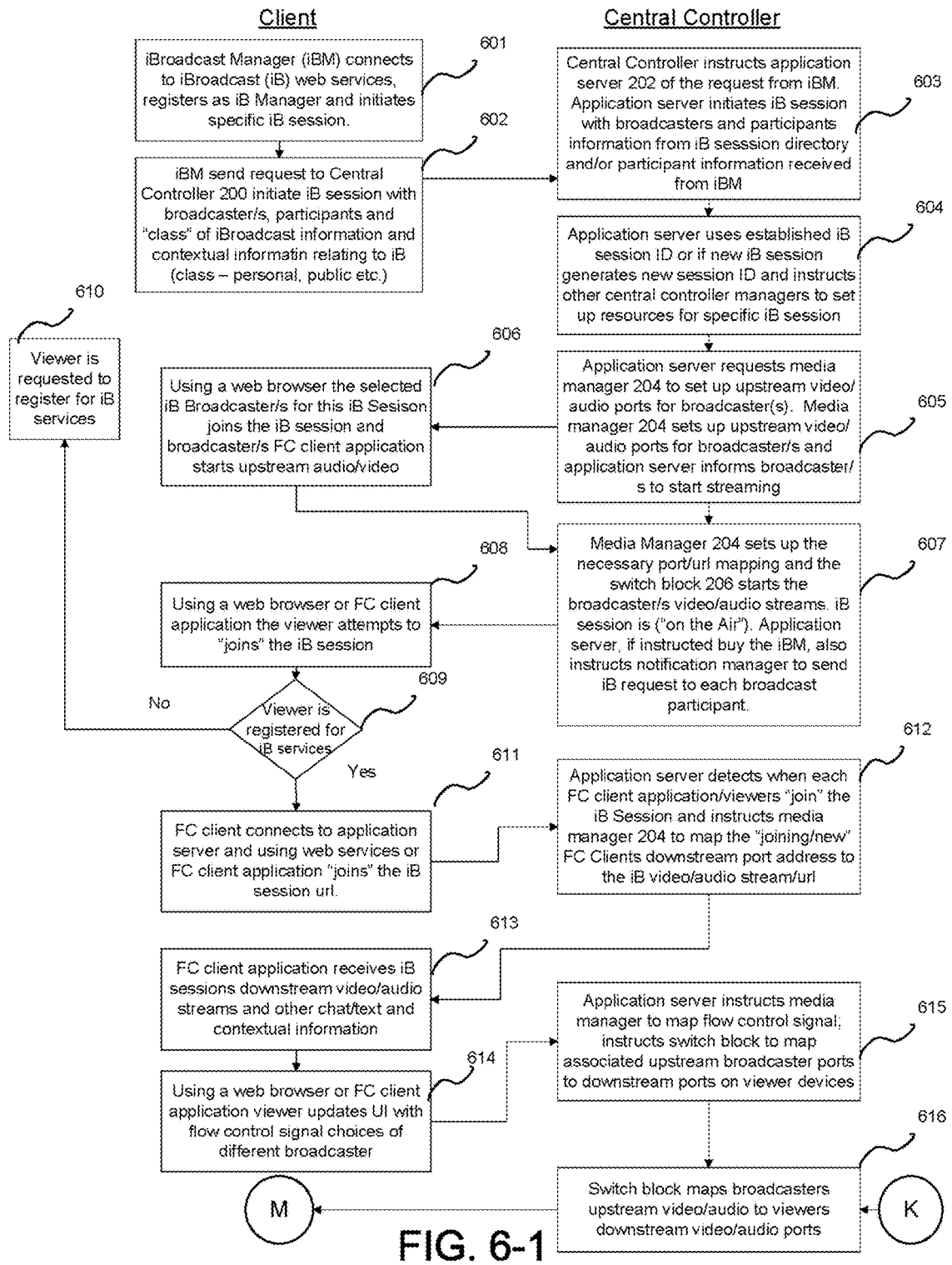
Figures 2, 6:
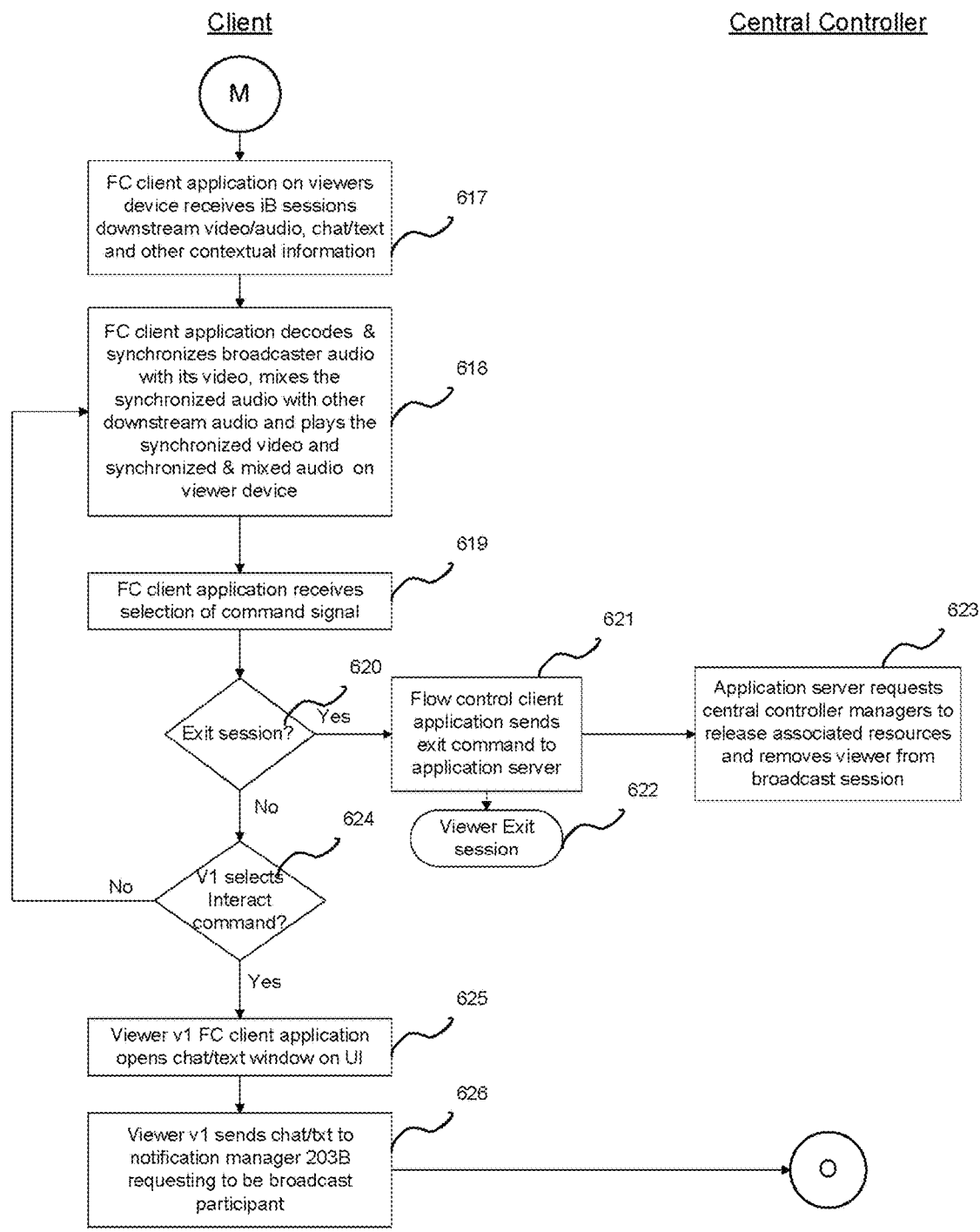
Figures 3, 6:
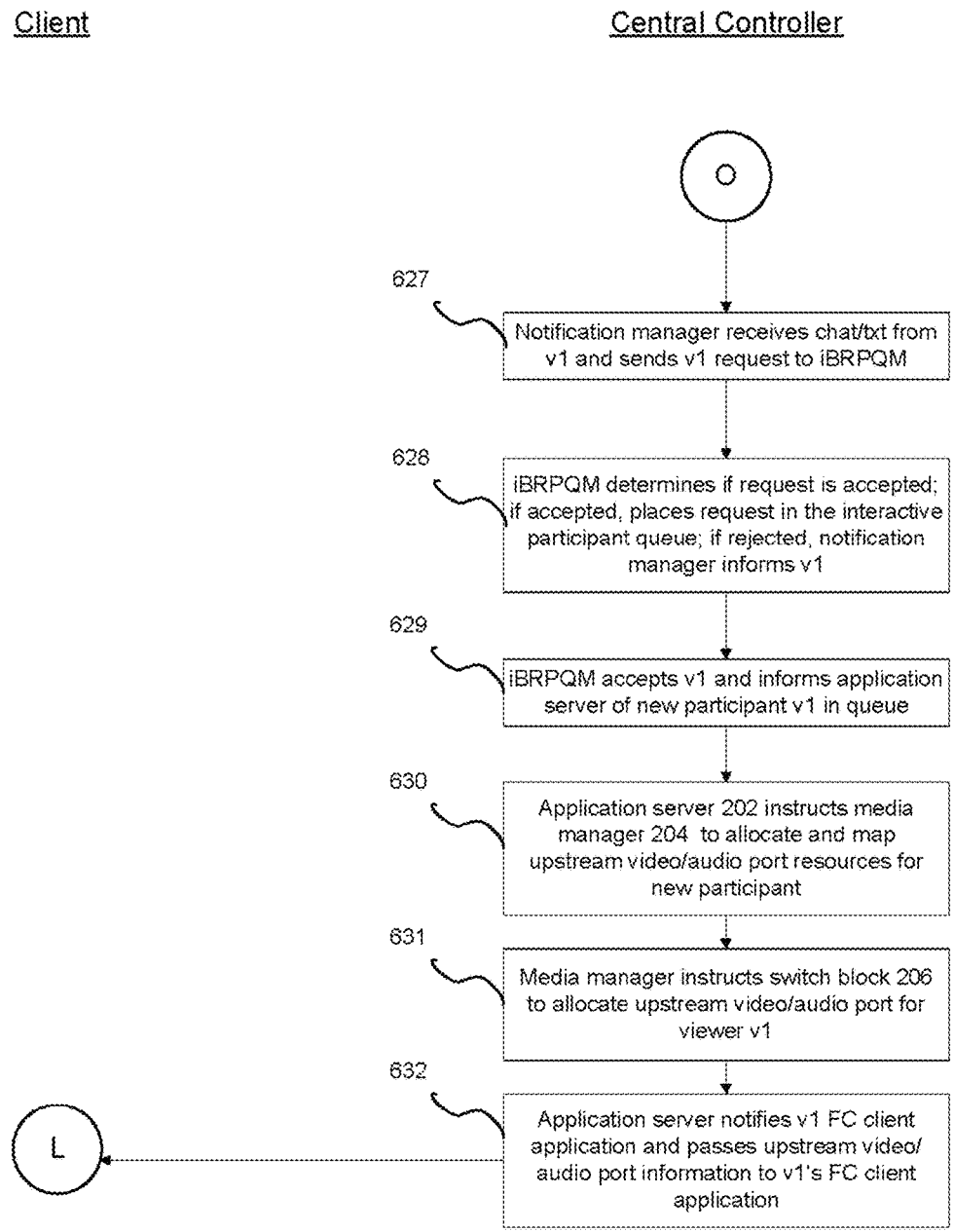
Figures 4, 6:
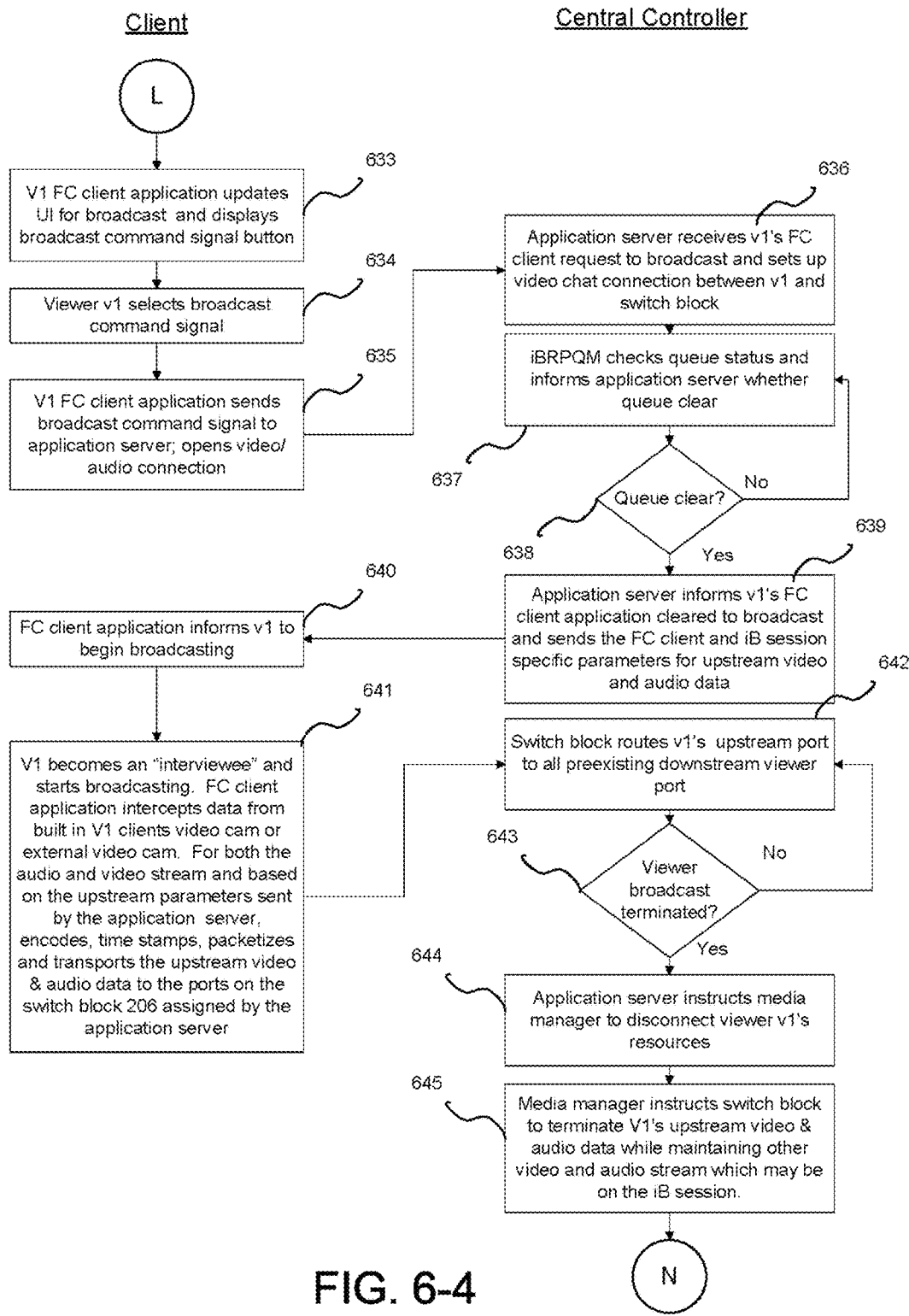
Figures 5, 6:
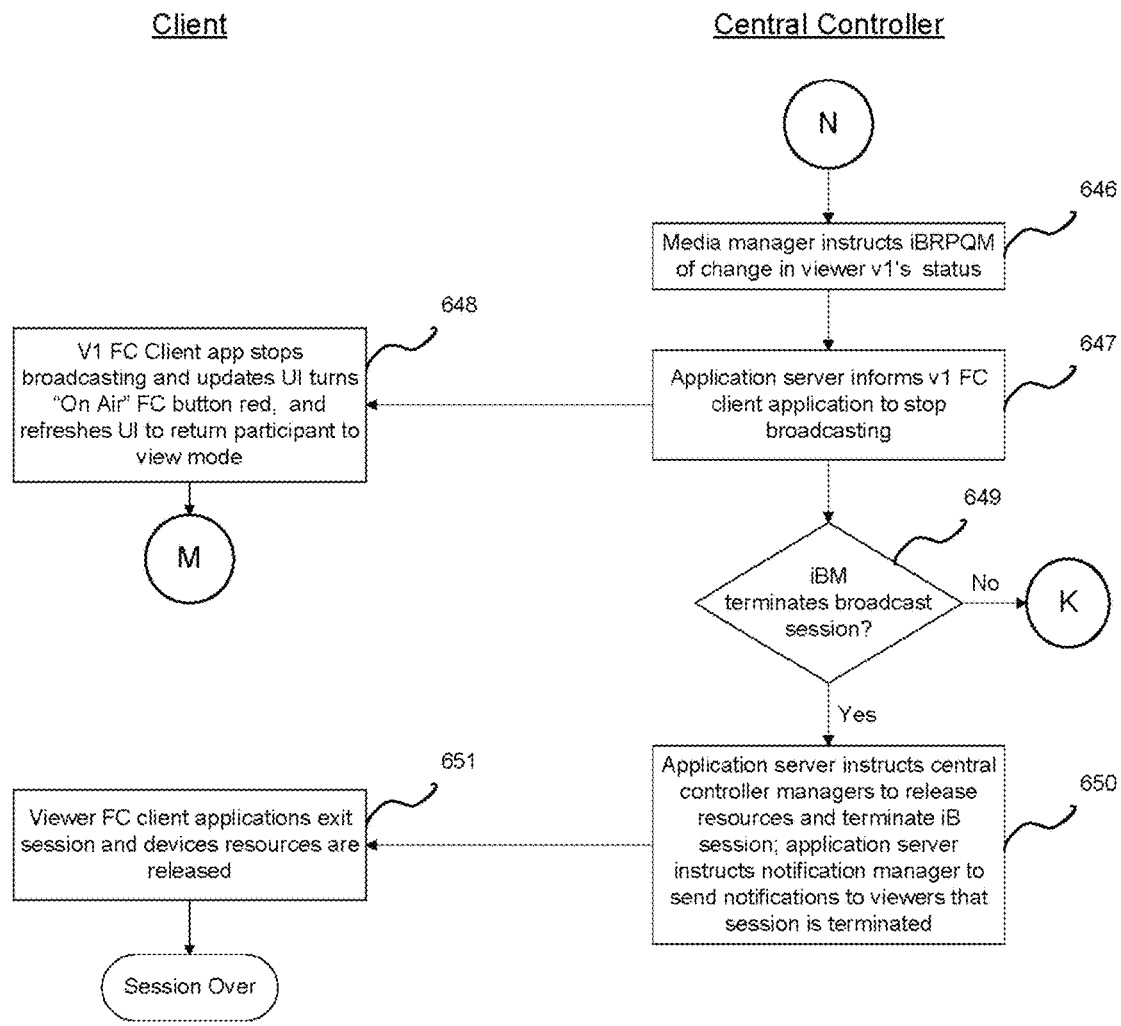

FIGS. 6-1 through 6-5 is a flowchart illustrating an embodiment of providing an iBroadcast (iB) session according to the present invention. This example is explaining various stages of a large iBroadcast session. To initiate the iBroadcast session the iBM can use web browser to connect with the iB web services hosted by the central controller 200 or the iBM can launch the FC client application resident on the iBM's client device to start the iBroadcast session. The application server 202, on the central controller 200 receives the request and opens required TCP connection (or any other communications protocol) between the iBM's FC client application and the application server 202. The iBM selects a broadcast group (b1) from the directory, and the iBM's FC client application receives an acknowledgement for the initiation of the iBroadcast session (601). A request for the iBroadcast session with its unique session identification (ID) is sent from the iBM's FC client application or web services to the application server 202, with details of the information on iB session and specific parameters for IB session and all other contextual information associated with specific iB session e.g. "Personal" or "Public" iBroadcast session, information with plurality of broadcasters and a plurality of participants (602). The application server 202 resident at the central controller 200 receives the request for the iBroadcast with information from the iBM on the specific iB session selection, broadcaster/s selection, and other contextual information related to specific iB session (603). The application server 202 uses iB session ID associated with the specific iB session or if new iB session generates a new session ID for the iB session, and sets up the broadcast resources for the iB session (604). The application server 202 requests the media manager 204 to set up the upstream video and audio ports for the broadcaster/s and instructs the broadcaster/s FC client application(s) to start upstreaming on specific Switch block ports (605). The broadcaster(s) FC client application using a web browser interface or by launching its FC client application registers to the specific iB session as a broadcaster and starts upstreaming its video/audio to the specified ports on the switch block 206 on the central controller 200 (606). The media manager 204 instructs the switch block to start streaming broadcaster/s upstream audio/video for the iB session on the specified ports/URL. The application server 202 instructs the notification manager 203 to send notifications to the b1 participants to join the iBroadcast session and the iBM sets the "on Air" switch to start the iBroadcast session. In the case of large iB sessions, as in this example, the application server 202 posts the scheduled iBroadcast session's on the web site using its web services scheduler (607). All registered viewer can, by logging into the iB web site, view and select the iB session they wish to join a session which is "live on Air". The application server 202 detects when a viewer's FC client application has "joined" a specific iB session and informs the viewer's FC client applications that the session is active (608). If a client device does not have the FC client application (609), then the client application requests that the client device register for the iB services and redirects it to the registration site on the iB web site (610). The FC client application on each viewer's device, using a web browser or its FC client application "joins" the specific iB session URL (611), and uses the list of available broadcasters to update the client device's UT to show representations of the flow control signal choices (611). The application server 202 detects each FC client application as they join the iB session, registers them, and requests the media manager 204 to stream the iB session and all contextual content/information to the downstream ports of the FC clients (612). The FC client application at each iBroadcast viewer's client device receives a selection of available broadcaster's flow control signal (613). The viewers' FC client applications, using the web services and established communications port with the application server 202, sends the flow control signal choices of the broadcaster(s) on this specific iBroadcast session (614). The application server 202 instructs the media manager 204 to map the updated request of different broadcaster choice of the viewer and requests the media manager 204 to map the associated broadcasters' upstream video/audio and all other associated information related to the current iBroadcast session to the downstream ports/URL received from the viewer FC client application (615). In response, the switch block 206 maps the new selection/broadcaster's upstream video and/or audio to the viewers' downstream video and/or audio ports/URL (616). The FC client application on each viewer's client device receives the broadcaster's downstream video and/or audio (617). The FC client application on each viewer's device decodes and synchronizes the broadcaster's video stream with the broadcaster's audio stream and plays the synchronized video on viewer client device's media/video player. In addition FC client application on the viewer's device mixes this synchronized audio with the other audio streams sent to the viewer's client device and plays the mixed audio on the devices audio players (618).

Assume that the FC client application of a given viewer's (v1) client device receives the selection of a command signal (619). If the selected command signal is an exit session command signal (620), then this FC client application sends the exit session command signal to the application server 202 (621). The viewer's FC client device then exits the iBroadcast session (622), and the application server 202 requests that the central controller managers 203, 204, 510, and 207 to release resources associated with the given viewer and removes the given viewer from the iBroadcast session (623). If the given viewer (v1) wishes to be included in the iBroadcast as an "interviewee" (e.g. to participate in an interactive interview or to show a specific live video from a location etc.), the given viewer selects the "interact" or "chat" command (624). The FC client application on the given viewer's FC client application opens a chat or text window on the client device UI (625), and the given viewer sends a chat or text to the notification manager 203C with a question to the broadcaster or a request to be a broadcast participant (626). The notification manager 203 receives the chat or text from the given viewer and sends the given viewer's request to the iBroadcast Request Processing and Queuing Manager 510 (iBRPQM) (627). The iBRPQM 510 determines whether the request is accepted, i.e., whether v1 is accepted as an "interviewee" to be made part of the iBroadcast session. If the request is accepted, then the request is placed in an interactive participant queue. If the request is rejected, the notification manager 203 informs the given viewer's FC client application of the rejection (628). If the iBRPQM 510 selects v1 to be on the broadcast session, then the iBRPQM informs the application server 202 of the new viewer v1 in the queue (629). The application server 202 instructs the media manager 204 to allocate and map the upstream video and audio ports for viewer v1 (630). The media manager 204 instructs the switch block 206 to allocate the upstream video and/or audio ports for viewer v1 (631). The application server 202 also notifies the FC client application on viewer v1's client device that it has been selected to be on the iBroadcast as in "interviewee" and the port address/URL to send the upstream video and/or audio (632). The viewer v1's FC client application then updates the UI on v1's client device for the iBroadcast session, and displays a broadcast command signal button (633). Assume that viewer v1 selects the broadcast command signal button (634). The viewer v1's FC client application sends the broadcast command signal to the application server 202 and opens a video and/or audio connection, and starts to upstream video and/or audio (635). The application server 202 receives the request to broadcast and establishes a session between the iBM and viewer v1's FC client application (636). The iBRPQM 510 checks the queue status and informs the application server 202 whether the queue is clear (637). If the queue is clear (638), the application server 202 informs the viewer v1's FC client application that viewer v1 is cleared to broadcast (639). The viewer v1's FC client application informs the viewer v1 to start broadcasting (640). Viewer v1 begins to stream video and audio to the application server 202, thus becoming a "broadcaster" or "interviewee" depending on the decisions made by the iBM. V1's FC client application intercepts the client devices built in video cam or external video cam's video/audio streams. The FC client application based on the specific parameters send down from the central controller 200 and based on the FC client devices properties (network bandwidth, device processing capacity, and other device, network and iB session specific parameters) encodes, timestamps each data packet, packetizes and transports the video and audio payload to the switch block 206 (641). The switch block 206 routes viewer v1's upstream video/audio to all downstream viewer ports. Viewer v1's audio and video streams are now being broadcast to all b1 session viewers (642). If the iBM terminates viewer v1's broadcast session, or viewer v1 exits the broadcast session (643), the application server 202 instructs the media manager 204 to disconnect v1 broadcasting resources (644). The media manager 204 instructs the switch block 206 to terminate the upstream video and audio ports for viewer v1 while maintaining the original broadcasters' upstream video and audio ports to all b1 session viewers (645). The media manager 204 instructs the iBRPQM 510 of the change in viewer v1's status (646), and the application server 202 informs viewer v1's FC client application to stop the broadcast (647). Viewer v1's FC client application updates the UT to indicate that the viewer v1's broadcast is terminated and returns the viewer v1 to view mode and turns off the "On the Air" button on the viewers device UT (648). If the iBM terminates the iBroadcast session (649), then the application server 202 instructs the central controller managers (203, 204, 510, 207) to release all iB resources and to terminate the session. The application server 202 further instructs the notification manager 203 to send notifications to all viewers that the iB session is terminated (650). Each iBroadcast session viewer's FC client application exits the iBroadcast session and release client device resources (651).

The present invention addresses many of the shortcomings of existing solutions for video conferencing, video chant and real-time interactive broadcasting, especially with the limitations for mobile devices/users. Video conferencing, especially with three or more participants, requires significant bandwidth and relatively complex algorithms and technologies to facilitate the services. In contrast, video chat is generally a one-to-one chat service. The present invention, Flow-Controlled, Switched Group Video Chat establishes virtual many-to-many group video chat session by creating multiple one-to-one video chat sessions connected via the central controller. The central controller establishes this virtual group and enables any chat participant to select and view the video stream of any other participant on the same group video chat session while simultaneously receiving the audio stream of all the other session participants which is synchronized and mixed at the FC client application.

In addition, the iBroadcast addresses many of the shortcomings of the current and traditional broadcasting technologies (TV, Cable and Satellite TV, Radio, internet TV to name a few). iBroadcast brings new and significant real-time interactive capabilities to "broadcasting" and allows any viewer from a PC, mobile device, Internet enabled TV or any other connected devices to instantaneously connect to and become a part of the iBroadcast session which can be transmitted globally across networks and across geographic boundaries. Also iBroadcast, brings to any individual, group or company the capability to be their own broadcast station and reach small or large numbers of viewers locally or globally and literally broadcast from anywhere and bring in viewers to become part of the iBroadcast from any location in the world.

FIGS. 8-1 and 8-2 illustrate an embodiment of a Flow-Control Based Switching Client Application's Audio/Video Encoding, Timestamping, Decoding and Synchronization Architecture according to the present invention. Specifically, FIG. 8.1 is the block diagram for the FC client application when the client application is upstreaming video & audio data to the central controller 202. FIG. 8-2 is the block diagram for the FC client application when the client is receiving downstream audio/video data from the central controller 200. This embodiment leverages both the upstream and downstream blocks to enable Flow-Control Based audio/video synchronization for FC client applications. As described in earlier sections, the inherent nature of the internet does not guarantee that data (video and audio) payload will arrive at the same destination at the same time or within a tolerable time delay or lag. To mitigate and minimize any lag between the video and its associated audio packet, FIG. 8.1 encodes and time stamps every video and audio data packet before it upstreams it to the central controller 200. Based on the Flow-Control selection (who the viewer wishes to see and hear) from the downstream FC client application in a SGVC or iB session, the central controller 200 streams the requested video/audio to the downstream/receiving FC client application as shown in FIG. 8-2. The FC client application decodes the video/audio packets, synchronizes the video with it associated audio packet before playing out the synchronized video on the FC clients display area. Likewise the synchronized audio is mixed with other downstream audio prior to being sent to the audio player.

FIG. 8-1 illustrates a FC Client Application Upstream Audio/Video Encoder & Synchronization Manager 801 comprising the audio/video splitter 801, which takes the input from the FC client built in video camera or any other external video camera and in this example splits the video and audio into two separate streams and sends them to the respective audio/video encoders. In a different case, the audio/video from the video camera can also be left as a single audio/video stream and be sent to be timestamped prior to being encoded and packetized. In this example, the video encoder 803 receives the video stream from the splitter 801 and based on instructions and parameters received by the FC client application from the application server 202 (encoder format/type, frame rate/bandwidth etc.) encodes the video packets. The Video Timestamp Engine 804 time stamps each packet and sends the packet to Video Packetization Engine 805. The Video Packetization Engine 805 puts the video packet in its appropriate format and includes all necessary sequencing, Flow-Control identification and control information as instructed by the application server 202 and sends the packet to Upstream Transport 809 which transports the video stream to the switch block 206 on the central controller 200.

FIG. 8-2 illustrates a FC Client Application Downstream Audio/Video Decoder & Synchronization Manager (820) comprising the downstream FC client application audio/video manager 822. In this example, the downstream A/V Manager 822 receives the downstream audio and video streams from the switch block 206 and sends the video streams to their respective video decoders (823, 824, 825 . . . n) and the audio streams to the respective audio decoders (830, 831, 832 . . . n). The video decoder 823 decoded the video1 stream and sends the decoded video stream dv1 to the audio/video synchronization engine 827. The audio decoder 830 decodes audio1 stream and sends the decoded audio stream da1 to the same audio/video synchronization engine 827. The audio/video synchronization engine 827 synchronizes each video data packet with its associated audio data packet using the timestamp and sequencing information placed by the Upstream Encoder & Synchronization Manager (FIG. 8-1) and using FC client's proprietary algorithms and processes sends the synchronized video sv1 to the video rendering engine 833. The video rendering engine 833 operates on the synchronized video data streams and displays the synchronized video on the FC client application UI 836. The synchronized audio sa1 is sent to the audio mixer engine 839, where sa1 is mixed with other audio streams (if there are more than one downstream audio received by this FC client application). The mixed synchronized audio is sent to the FC device audio media player. Based on the device and the level of access the FC client may have to the devices audio mixer, the FC client may send the synchronized audio and other SGVC or iB session downstream audio directly to the client device audio mixing resource. Similar to Audio/Video pair1, the other downstream audio/video pairs 2, 3 . . . n are operated on by the FC Client Application Downstream Audio/Video Decoding & Synchronization Manage. In addition the now synchronized audio video pair are resynchronized with the sa1 and sv1 which are the reference audio/video pairs. The synchronized video sv2 and sv3 are displayed in location 837 and 838 respectively. The synchronized audio sa2 and sa3 are likewise sent to the audio mixer 839.

This audio/video synchronization allows for FC controlled based synchronization of each audio video pair (audio with its associated video) and significantly reduces any time lag between the video and its associated audio. When a broadcaster says "hello" the viewer should hear "hello" and see the lips form the words "hello" at the same time or within a short time lag (lag greater than +1-150 MS degrades viewer experience significantly). As discussed earlier the internet does not guarantee quality of service (QoS) and does not guarantee that the audio and its associated video data packets will arrive at their destination at the same time or within a specific and guaranteed time delay and or lag. This invention allows for the audio/video synchronization with minimal lag between the video and its audio for SGVC and iB sessions.

"Real-time" interactive broadcast, as used in this specification, refers to the ability to select any client device that is receiving and viewing the broadcast (client can be from a few or from among 100's of 1000's of viewers on a broadcast session), and include this client device's video and audio streams in the broadcast stream, such that both the broadcast's and the client device's video and audio streams are seen and heard by all viewers at the same time. The viewers experience the interaction between the client device and the broadcaster as if a single integrated broadcast session. With such real-time interactive broadcast, any client device receiving the broadcast stream can instantly become an audio and video transmitter and be included in the broadcast they are viewing, as well as being a receiver of the broadcast. The interaction between the client and the broadcaster is thus in real-time in a manner similar to a telephone call between two parties where each party is simultaneously a transmitter and receiver. In contrast, texting, SMS/chat, or email is interactive but not "real-time". One can send an SMS/Text/email, but the reply from the receiving party is not dependent on the real-time aspects.

Synchronized Playback of Recorded Media

Another embodiment of the present invention provides a flow control based synchronization of media playback of the same media content on all client devices participating in the same broadcast. Each downstream client device participating in the broadcast will independently display the same location in the media at the same time. In this embodiment, the broadcaster device requests each downstream participant device in the broadcast to independently downstream the same recorded media, and the central controller 500 will synchronize the media playback so that all downstream devices playback the media at the same location or frame as specified by the broadcaster. The broadcaster device's Central Media Player, which includes the Recording Manager 212A, the Playback Manager 212B, the Playback Server & Recorded Media Server 212D, and the $3^{rd}$ Party Media Manager 214 (see FIG. 10). The $3^{rd}$ Party Media Manager 214 control's the play, pause, rewind and forward of a playback media from the central controller 500 and informs all downstream devices to play, pause rewind and forward to a specific synchronization marker location in the playback media. The playback of the playback media at each of the downstream devices is further synchronized with the stream from the broadcaster device using a synchronization marker (sv1) integrated into the broadcaster device stream.

There are significant benefits to synchronizing playback of recorded media within a broadcast framework and has applicability in many verticals and use cases, e.g. interactive education, training, entertainment, news, sports, etc. The broadcaster (educator, trainer, coach or artist) can stream pre-recorded course content, training modules, and/or skills/game play book. The broadcaster can play a music video to a small or large group of viewers during the broadcast and control the media playback using play, pause, rewind and forward commands, such that the playback of the media at each downstream device is synchronized to the location within the media as selected by the broadcaster. All downstream devices render and display the media stream at the same time and at the location as specified by the broadcaster. The broadcaster can select any participant's downstream device and give them permission to control the broadcaster's media player.

This embodiment of the present invention is capable of synchronizing the playing of a recorded media at downstream devices within a broadcast in two scenarios. In a first scenario, the pre-recorded media in question is in a $3^{rd}$ party media server where the broadcaster does not have management control of the media server or the source which is hosting the pre-recorded media being streamed. In this case, the streaming media is being synchronized at each downstream device based on a synchronization marker, such as a timestamp or frame information, relayed to each device by the broadcaster's media player. In a second scenario, the pre-recorded media is stored on the media server under the broadcaster's management and control, enabling the broadcaster to play, pause, rewind and forward the recorded media at the source and to synchronize all downstream devices to the source, using the synchronization marker selected by the broadcaster.

Figures 1, 9:
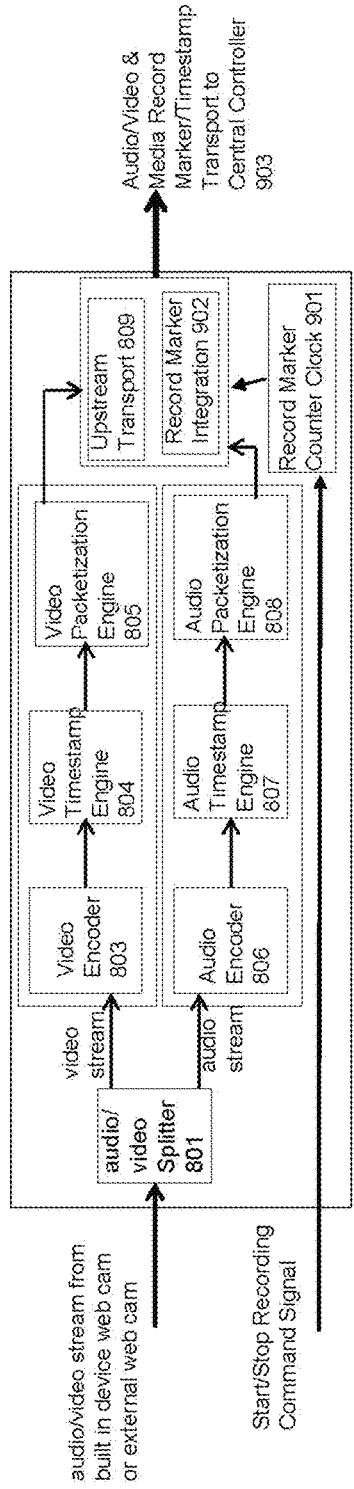
Figures 2, 9:
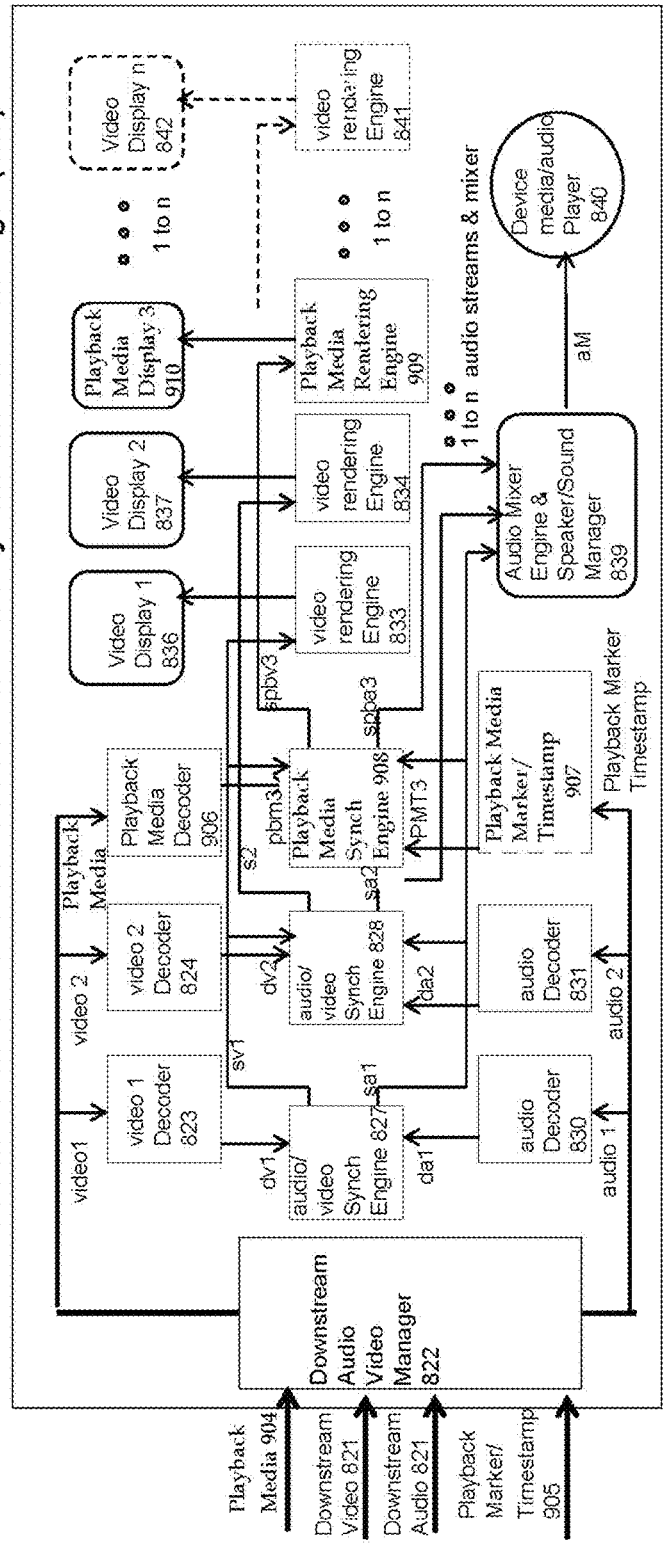

FIGS. 9-1 through 9-2 illustrate an embodiment of a system for flow-control based synchronized playback of recorded media, according to the present invention. In addition to the components with like numbers, as described with reference to FIGS. 8-1 and 8-2, the system includes the following:

Recording Marker/Counter Clock 901: When the initiator selects the Record command on the Flow Control (FC) Client Application, it sends the Start Recording Command Signal to the Recording Marker/Counter Clock 901. The Recording Marker/Counter Clock 901 starts generating the Synchronization Markers which are sent to the Recording Marker Integration block 902 and sends a Recording Marker Integration block signal to start the insertion of the Synchronization Markers. When the FC Client Application sends a Stop Recording command, the Recording Marker/Counter Clock 901 stops generating the Synchronization Markers and sends a signal to the Recording Marker Integration Block 901 to stop the insertion of the Synchronization Markers into the upstream media.

Recording Marker Integration 902: The Recording Marker Integration block 902 inserts the Synchronization Markers into the upstream media and stops inserting the Synchronization Markers when it receives the Stop signal from the Recording Marker/Counter Clock block 901.

Playback Media Decoder 906: The Playback Media Decoder 906 decodes the downstream media based.

Playback Marker Timestamp 907: The Playback Marker Timestamp Block 907 continually receives the Synchronization Marker 905 from the Central Controller 500, detects the class of media, and moves the appropriate Synchronization Marker (PMT3) to the Playback Media Synchronization Engine 908.

Playback Media Synchronization Engine 908: The Playback Media Synchronization Engine 908 receives the decoded media from Playback Media Decoder 906, the Synchronization Markers from the Playback Marker Timestamp 907, and the broadcast device's (i1) synchronization marker (sv1) from Audio Video Synchronization Engine 827 and synchronizes the Playback Media. Based on the media type, specific application use case, and the command sent by the Central Controller 500, the Playback Media Synchronization Engine 908 may use some or all Synchronization Markers to synchronize the Playback Media, including synchronizing the playback of the Playback Media with a stream from the broadcaster device (i1). The stream from the broadcaster device (i1) includes the synchronization marker (sv1) integrated therein. The synchronized media (spbv3) is sent to the Playback Media Rendering Engine 909.

Playback Media Rendering Engine 909: The Playback Media Rendering Engine 909 renders receives the Synchronized Media from the Playback Media Synchronization Engine 908 and renders the media playback Media Display 3 (910). The Playback Media Display 3 (910) displays the Playback Media based on the location and position as instructed by its FC Client Application.

Figure 10:
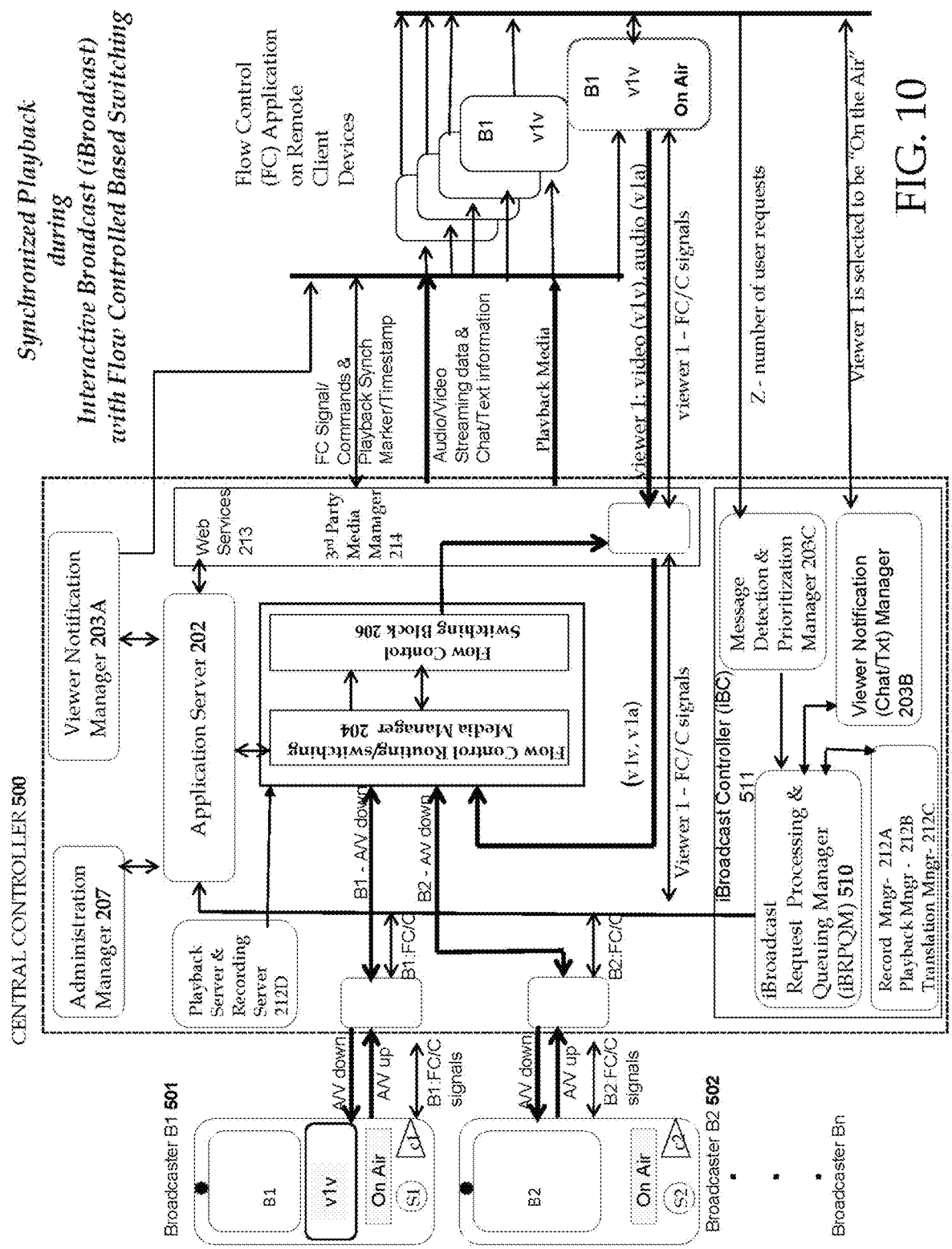
FIG. 10 illustrates an embodiment of the central controller of the system for flow-control based synchronized recording of media as well as playback of recorded media, according to the present invention.

FIG. 10 illustrates an embodiment of the central controller of the system for a synchronized recording and playback of recorded media, according to the present invention. In addition to the components with like numbers, as described with reference to FIG. 5, the central controller 500 includes the following:

Recording Manager 212A: The Application Server 202 receives the Record or Stop Recording command from the Broadcaster's FC Client Application (501, 502 . . . ) and sends the command to start or stop recording to the Recording Manager 212A. The Recording Manager 212A sends commands to initialize or close resources on the Recording Media Server 212D. Once the recording is stopped, the Recording Manager 212A receives the "name" or "ID" of the recorded media sent by the broadcaster (501, 502 . . . ) to the Application Server 202, which instructs the Recording Manager 212A to store the recorded media with the specific name/ID.

Playback Manager 212B: The Playback Manager 212B is activated when the media to playback is under the management and control of the Central Controller 500. In this scenario, when the broadcaster (501,502 . . . ) FC Client Application sends Playback commands (name/ID of Playback Media, Start Playback, Pause, Rewind, Forward, Stop Playback) to the Application Server 202 in the Central Controller 500, the Playback Manager 212B is activated. The Playback Manager 212B coordinates with the Playback Server 212D based on the commands received from the Application Server 202. The Playback Manager 212B requests that the Playback Server 212D locate the appropriate Media to be played back, Start Playback, Pause, Rewind, Forward, or Stop the Playback Media.

Playback Server & Recorded Media Server 212D: Playback Server & Recording Media Server 212D serves two functions. The Recorded Media Server function records and stores upstream media when instructed by the Playback Manager 212B. The Playback Server function, based on the instructions it receives from the Playback Manager 212B or the Central Controller 500, streams the Playback Media to the Flow Control Switching Block 206 when asked to Play, Rewind, Forward, Pause, or Stop the playing of the Playback Media when instructed by the Playback Manager 212B.

$3^{rd}$ Party Media Manager 214: When the broadcaster device (501, 502 . . . ) decides to playback media from a $3^{rd}$ party source, the broadcaster device sends the 3$^{rd}$ party source/URL to the Central Controller 500. The Application Server 202 in the Central Controller 500 instructs the 3$^{rd}$ Party Media Manager 214 in the Web Services Block 213 on the Central Controller 500 to instruct all downstream devices connected to this specific broadcast to connect and request playback media from the selected 3$^{rd}$ party source. The 3$^{rd}$ Party Media Manager 214 receives specific commands from the Application Server 202 related to the 3$^{rd}$ Party Playback Media and relays the commands to all downstream devices connected to this specific broadcast (Start Playback, Pause, Rewind, Forward, Stop). The 3$^{rd}$ Party Media Manager 214 also send the Synchronization Marker associated with each command to synchronize the playback of the 3$^{rd}$ party media at each downstream device with the playback of the 3$^{rd}$ Party Media at the broadcaster device.

Figures 1, 11:
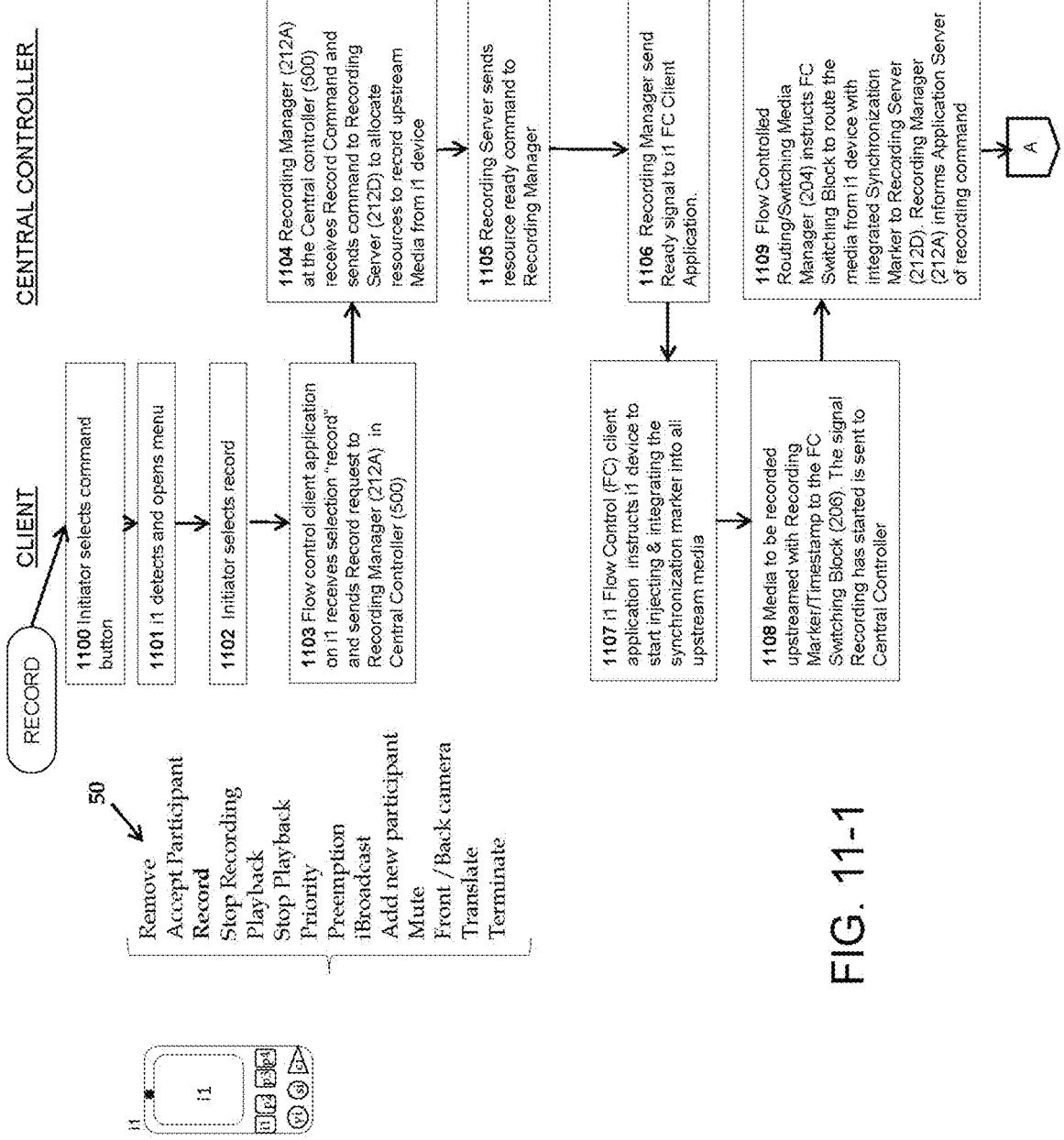
Figures 2, 11:
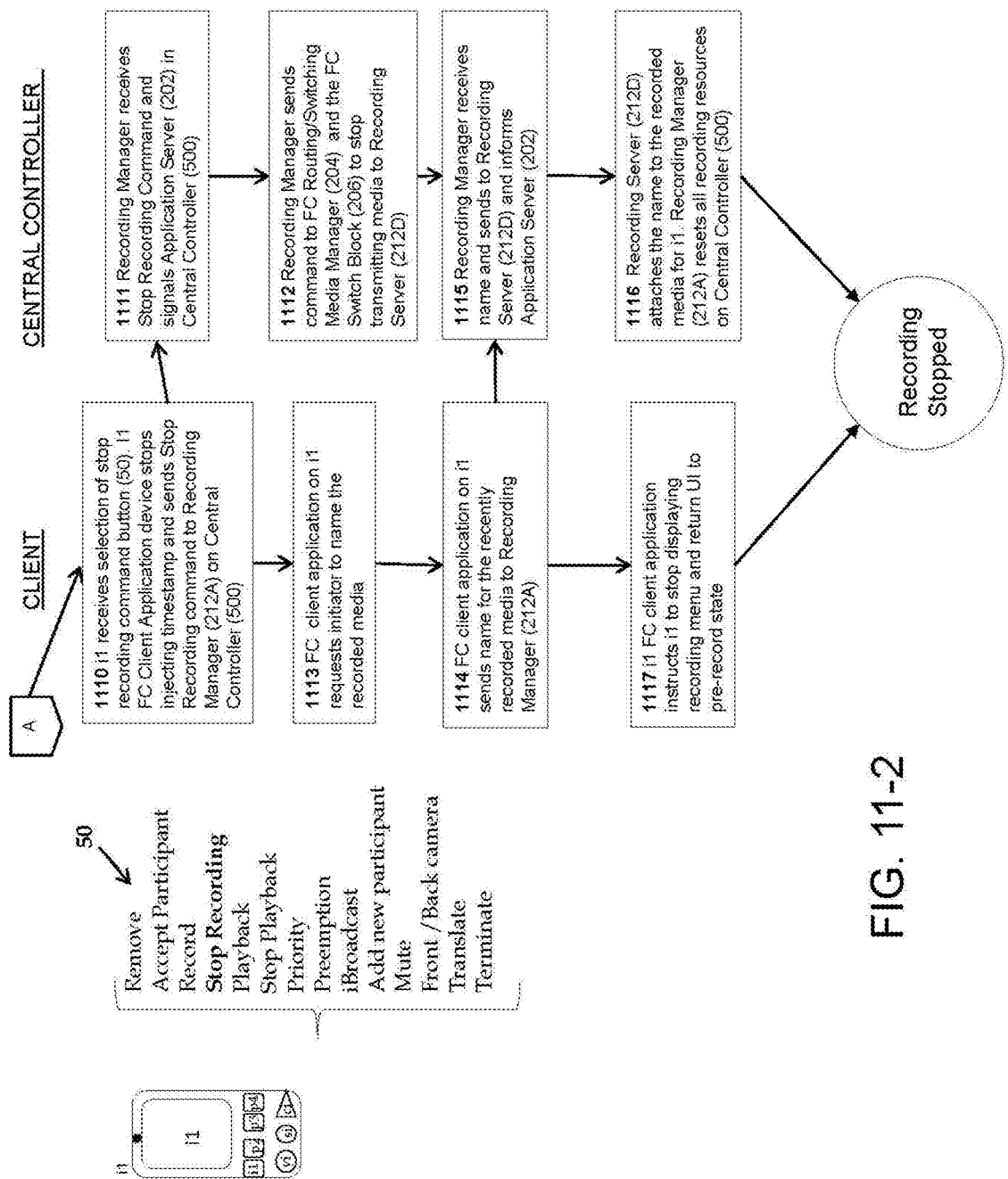

FIGS. 11-1 through 11-2 illustrate an embodiment of a method for flow-control based recording of media, according to the present invention. Referring to FIG. 11-1, an initiator at the broadcaster device (i1) selects the command button (1100). The broadcaster device (i1) detects the selection and opens the drop down menu 50 in response (1101). The initiator selects the record option (1102). The Flow Control (FC) client application on the broadcaster device (i1) sends the Record command to the Recording Manager 212A on the Central Controller 500 (1103). The Recording Manager 212A on the Central Controller 500 sends a record request from the broadcaster device (i1) and broadcasts an event identification to the Application Server (202) at the Central Controller 500. The Recording Manager 212A sends the Record command to the Recording Server 212D to allocate resources to record the upstream media from the broadcaster device (i1) for a specified broadcast event identification (1104). The Recording Server 212D sends a resource ready command to the Recording Manager 212A (1105). The Recording Manager 212A sends a resource ready indication to the FC Client Application on the broadcaster device (i1) (1106). The FC Client Application on i1 instructs the Recording Marker Counter Clock 901 to initialize and requests that the Record Marker Integration block 902 at the broadcaster device (i1) to start injecting and integrating a synchronization marker into all upstream media (1107). In this embodiment, the synchronization marker comprises a media frame marker timestamp, however, other ways of marking locations in the media may be used. All media with the Synchronization Timestamp continues to upstream to the FC Switching Block 206, and the Record command is sent to the Application Server 202 on the Central Controller 500 (1108). The FC Routing/Switching Media Manager 204 instructs the FC Switching Block 206 to route the media from the broadcaster device (i1) with the integrated Synchronization Timestamp to the Recording Server 212D. The Recording Manager 212A on the Central Controller 500 informs the Application Server (202) that recording has commenced (1109).

Referring to FIG. 11-2, during the recording event, the FC client application on the broadcaster device (i1) receives a selection of the stop recording command on the FC client application. In response, the FC client application on the broadcaster device (i1) stops injecting Synchronization Timestamps into the upstream media and sends a Stop Recording command to the Recording Manager 212A on the Central Controller 500 (1110). The Recording Manager (212A) receives the stop recording command from the broadcaster device (i1) and signals the Application Server (202) on Central Controller (500) (1111). The Recording Manager 212A sends the Stop Recording command to the FC Routing/Switching Media Manager 204 and the FC Switching Block 206 to stop transmitting media to the Recording Server 212D and to return all recording resources to their original state (1112). The FC application on the broadcaster device (i1) requests that the initiator names the recorded media (1113). The broadcaster device (i1) FC client application receives an input of the name of the recorded media, and the FC application at the broadcaster device (i1) sends the name to the Recording Manager (212A) on the Central Controller 500 (1114). The Recording Manager (212A) on the Central Controller 500 receives the name of the recorded media and sends it to the Recording Server 212D and informs Application Server 202 (1115). The Recording Server 212D attaches the name and identity information to the recorded media for the broadcast device (i1), and the Recording Manager 212A resets all recording resources on the Central Controller 500 (1116). The FC client application on the broadcaster device (i1) stops displaying the recording menu and returns the user interface to the pre-record state (1117). Recording is now stopped.

Figures 1, 12:
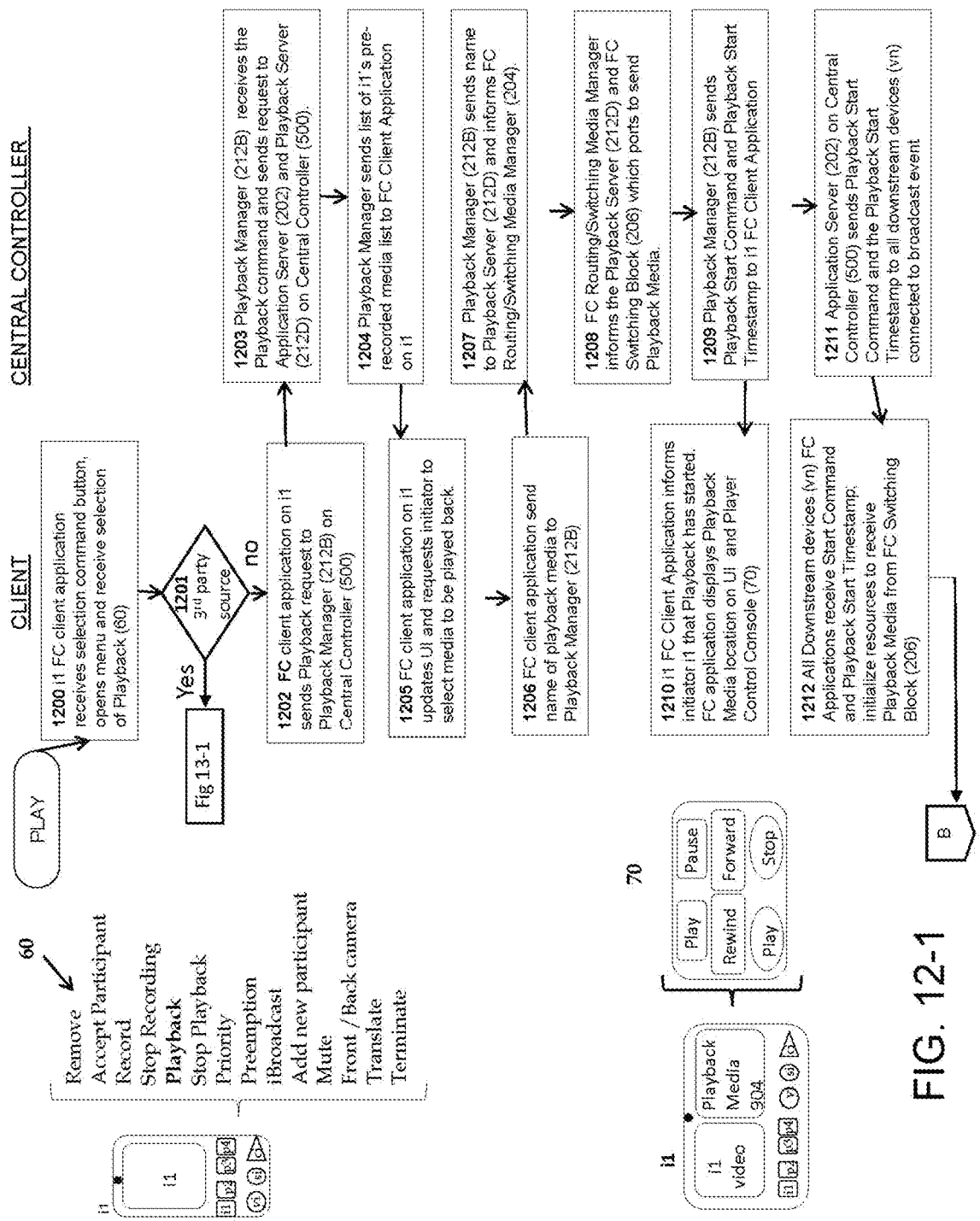
Figures 3, 12:
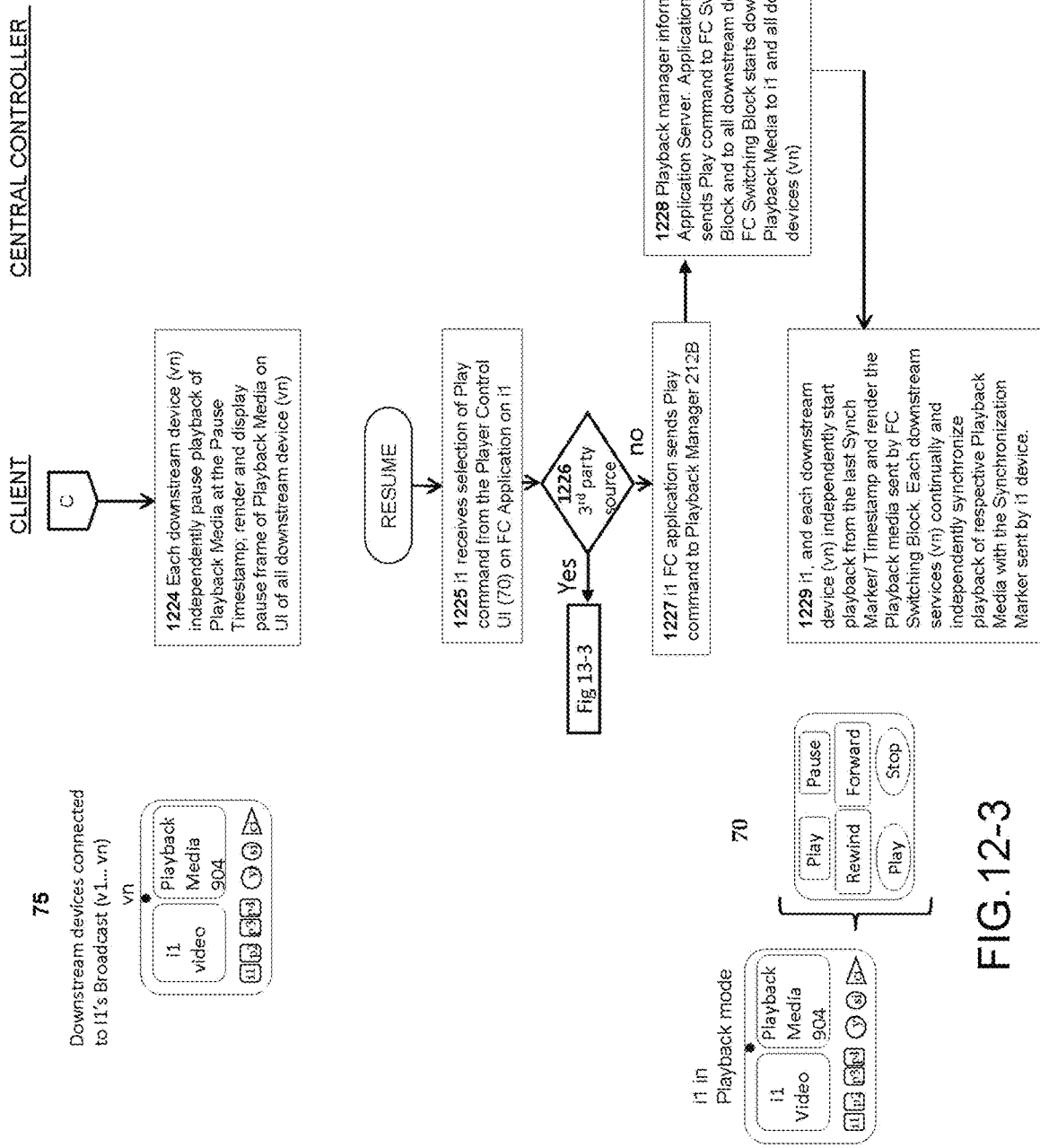
Figures 4, 12:
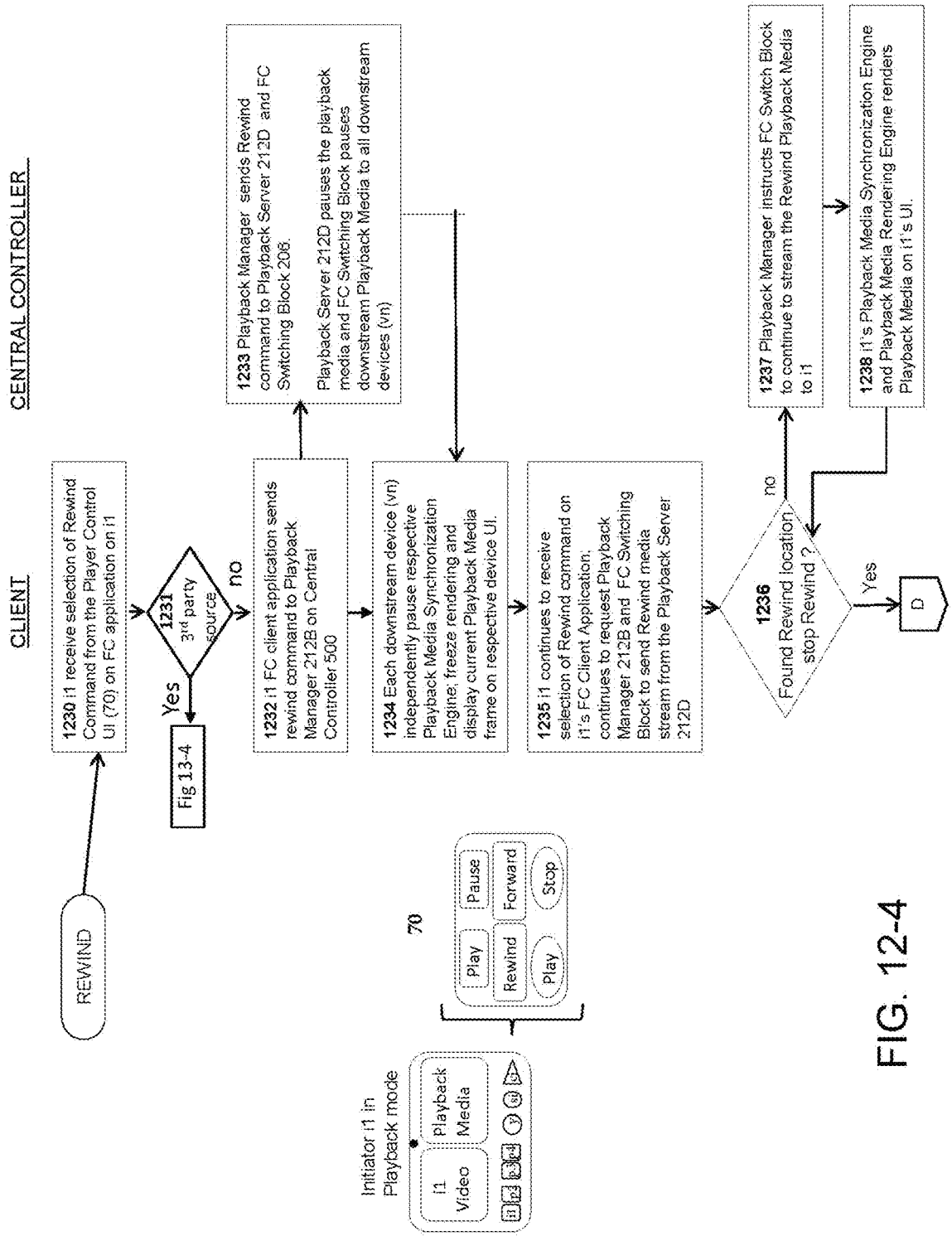
Figures 5, 12:
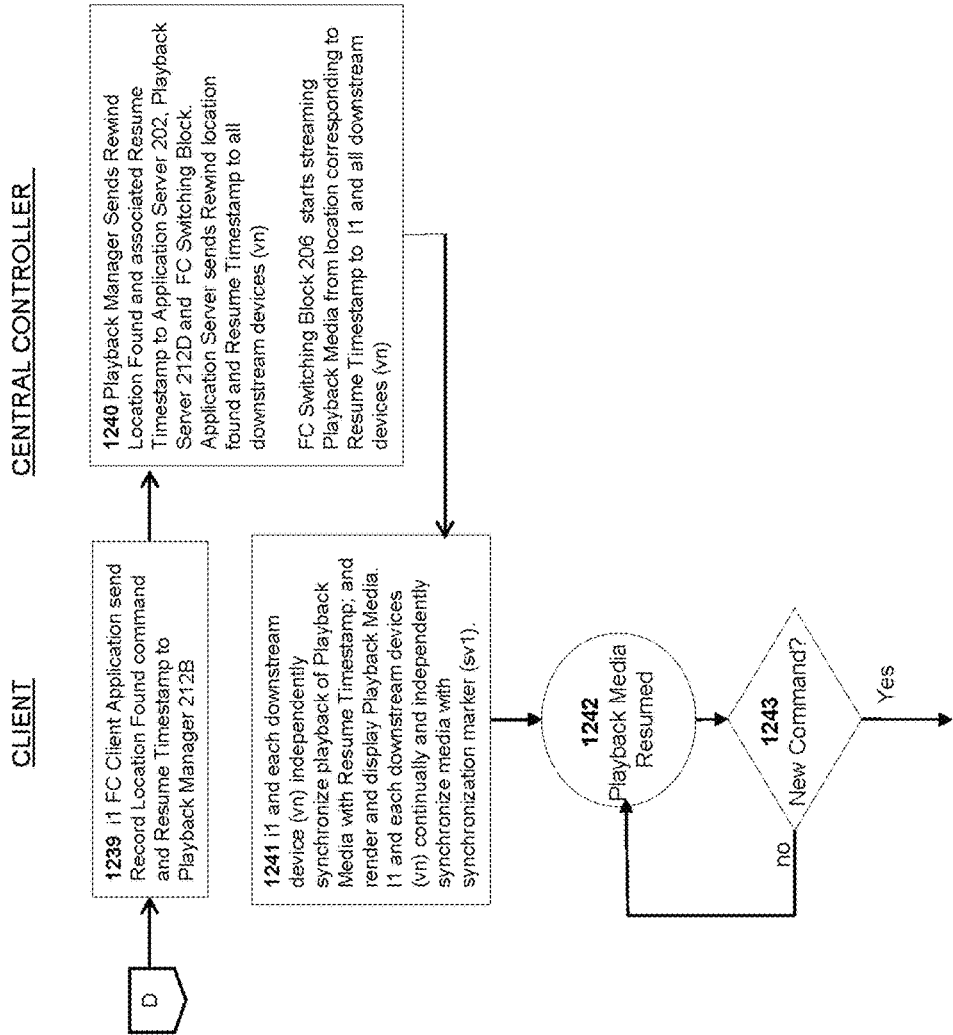
Figures 6, 12:
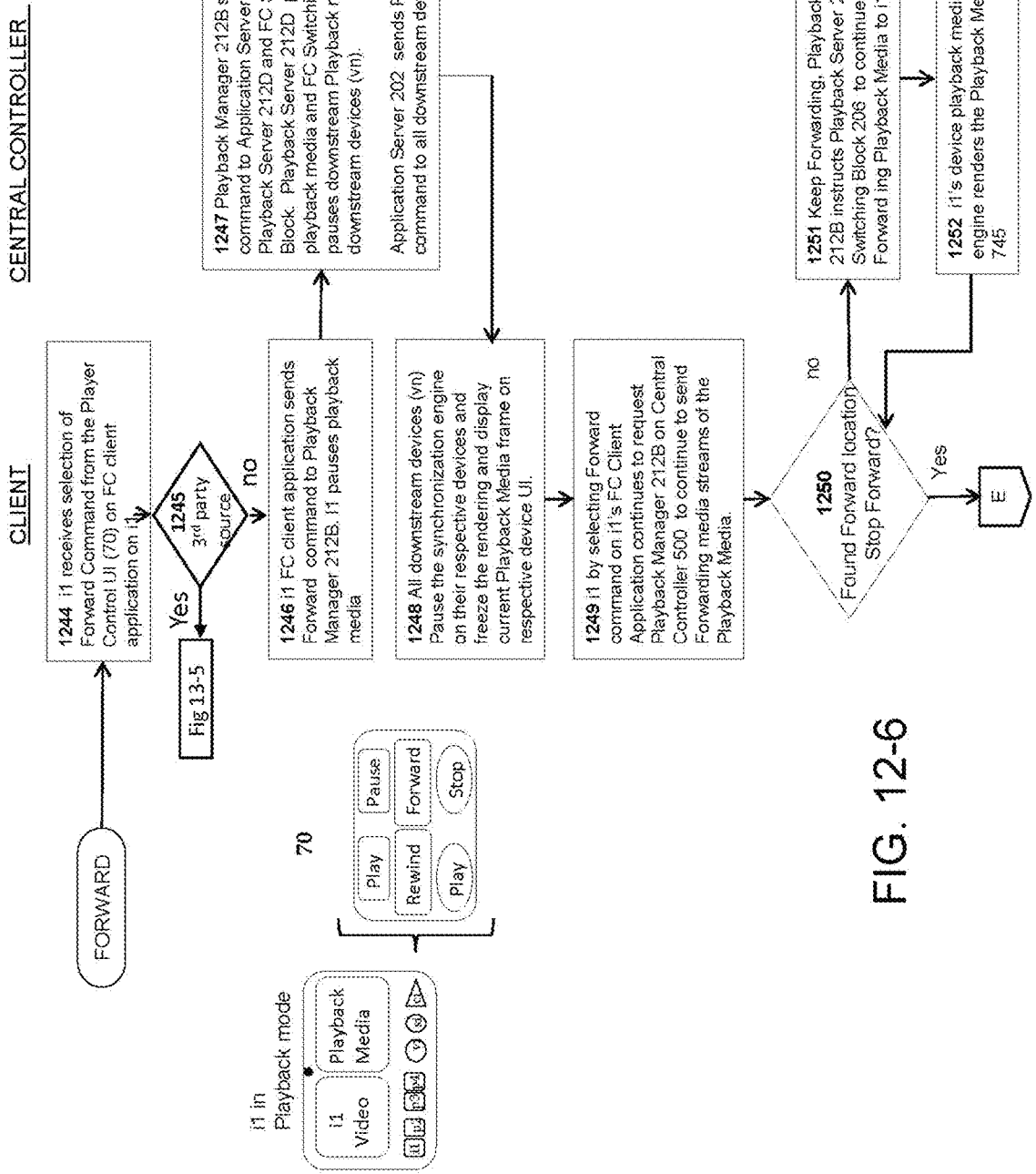
Figures 7, 12:
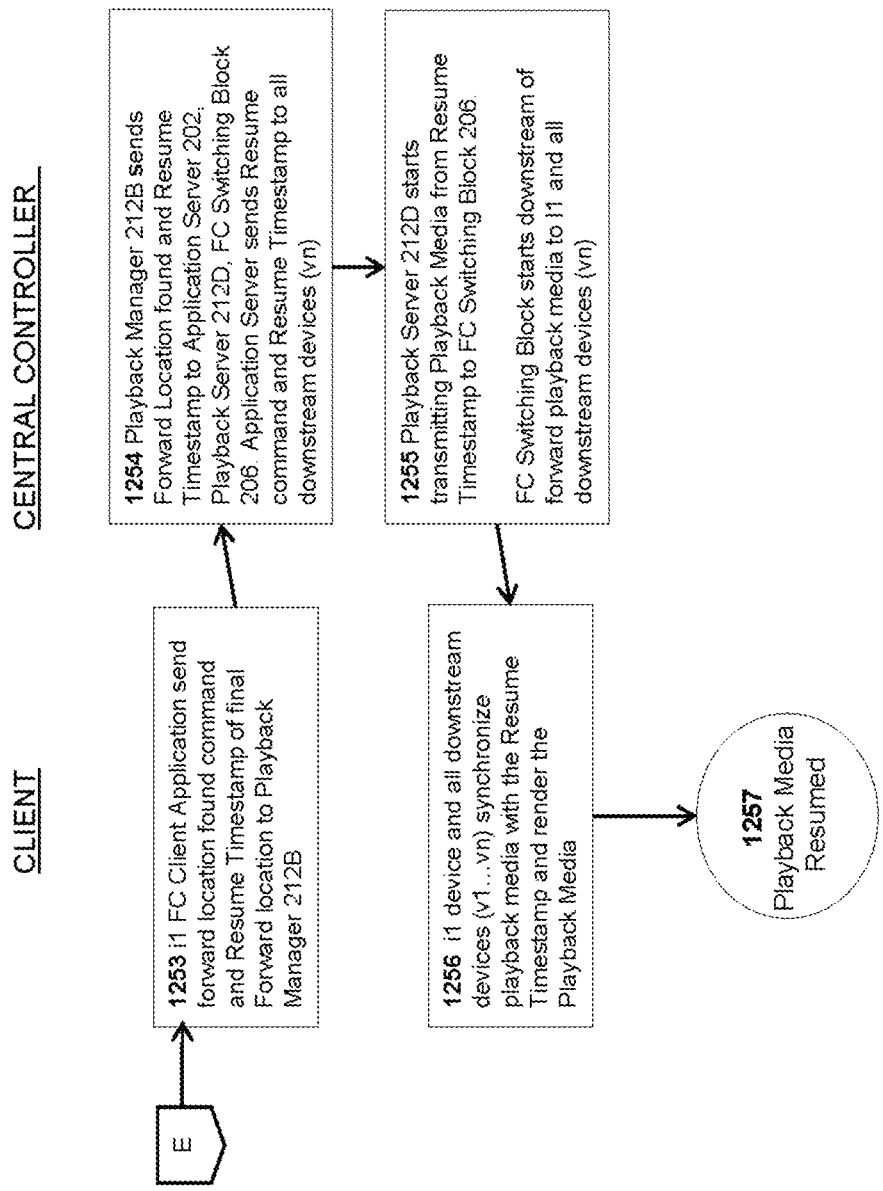
Figures 8, 12:
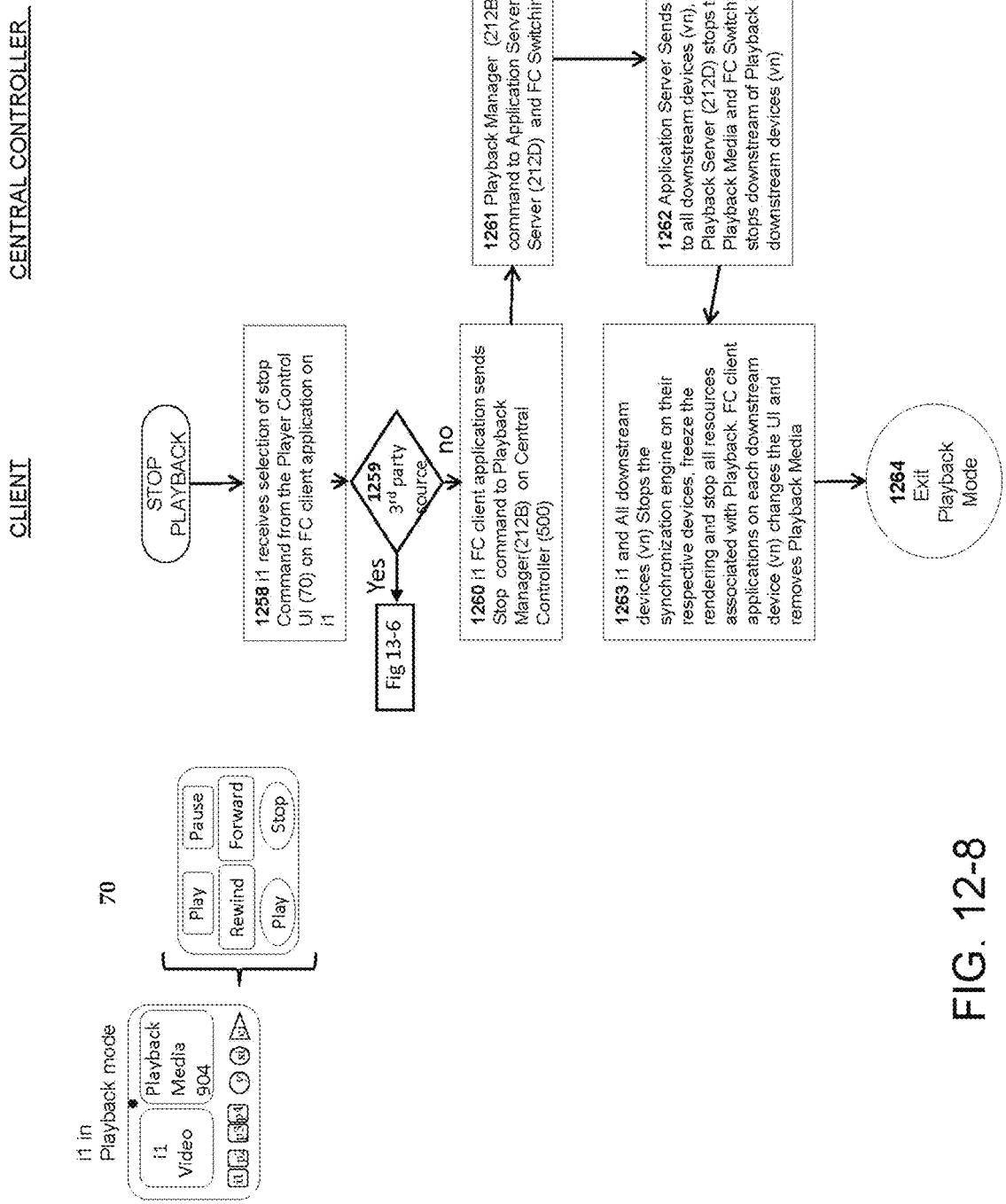

FIGS. 12-1 through 12-8 illustrate an embodiment of a method for flow-control based synchronized playback of recorded media, according to the present invention. Steps 1200-1219 illustrates steps in the synchronized playback of recorded media. Steps 1220-1224 illustrates steps in the synchronized pausing of the playback of recorded media. Steps 1225-1229 illustrate steps in the synchronized resuming of the playback of recorded media. Steps 1230-1243 illustrate steps in the synchronized rewind of the playback of recorded media. Steps 1244-1257 illustrate steps in the synchronized forwarding of the playback of recorded media. Steps 1258-1262 illustrate steps in the synchronized stopping of the playback of recorded media. Each of these steps are described further below.

Referring to FIG. 12-1, after the recording of a media and during a broadcast event, the FC client application on the broadcaster device (i1) receives a selection of a command to open the menu (60). The FC client application on the broadcaster device (i1) opens the menu option and receives from an initiator the Playback selection. (1200). The FC Client Application at the broadcaster device (i1) requests that the initiator select a source of the Playback Media. If the initiator selects a 3$^{rd}$ party playback media source to play within the broadcast event (1201), then the FC client application sets up a 3$^{rd}$ party procedure/routine, as described further with reference to FIG. 13-1. If initiator selects an internal source for the Playback Media, then the FC client application selects an internal source procedure/routine. The FC Application on the broadcaster device (i1) sends a Playback request to Playback Manager 212B on the Central Controller 500 (1202). Playback Manager 212B on the Central Controller 500 receives the Playback command and sends the request to the Application Server 202 and the Playback Server 212D on the Central Controller 500 (1203). The Playback Manager 212B sends a list of the broadcaster device's pre-recorded media to the FC Client Application on the broadcaster device (i1) (1204). The FC Client Application on the broadcaster device (i1) displays the pre-recorded list in the user interface and requests that the initiator select a pre-recorded media from the list to be played back (1205). The broadcaster device (i1) receives the initiator's selection of a Playback Media from the list, and the FC Client Application sends the name of the selected Playback Media to the Playback Manager 212B (1206). The Playback Manager 212B sends the name of the selected Playback Media to the Playback Server 212D and informs the FC Routing/

Switching Media Manager 204 (1207). The FC Routing/Switching Media Manager 204 informs the Playback Server 212D and the FC Switching Block 206 which ports to send the Playback Media (1208). The Playback Manager 212B sends the Playback Started command and a Playback Start Timestamp to FC Client Application at the broadcaster device (i1) (1209). The Playback Start Timestamp corresponds to a location in the Playback Media from which the playback is to begin. The FC Client Application at the broadcaster device (i1) informs the initiator that playback has commenced and changes the user interface (UI) to display the Playback Media 904 at the Playback Start Timestamp and changes the Player Control Console 70 to indicate that playback has started (1210). The Application Server 202 on the Central Controller 500 also sends a Playback Start command and the Playback Start Timestamp to all downstream devices (vn) connected to the broadcast event (1211). All downstream devices (vn) FC Client Applications receive the Playback Start command and the Playback Start Timestamp, and in response, starts the playback resources 908, 909, 910 (See FIG. 9-2) to receive the Playback Media from the FC Switching Block 206 (1212).

Referring to FIG. 12-2, the FC Switching Block 206 starts downstream playback of the Playback Media 904 to the broadcaster device (i1) and all downstream devices (vn) connected to the broadcast event and starts sending the playback media (1213). The Playback Media Synchronization Engine 908 at the broadcaster device (i1) and each downstream device (vn) independently synchronizes the playing of the Playback Media 904 using the Playback Start Timestamp, and the Playback Media Rendering Engine 909 and the Playback Media Display 3 (910) renders and displays the Playback Media 904 at each respective device UI (1214). The FC client application on the broadcaster device (i1) and all downstream devices (vn) update their respective UI 75 to display the Playback Media 904 starting at the Playback Start Timestamp (1215). The downstream devices (vn) informs the Application Server 202 on the Central Controller 500 that playback has started at their respective devices (1216). The Application Server 202 informs the Playback Manager 212B that the broadcaster device (i1) and the downstream devices (vn) have started their respective playbacks (1217). The Playback Manager 212B informs the broadcaster device (i1) that all downstream devices (vn) have started their respective playbacks (1218). The FC Client Application on the broadcaster device (i1) updates the UI to indicate that the playback is in progress and displays the Playback Media 904 (1219).

During the playback of the Playback Media, the FC client application on the broadcaster device (i1) may receive the selection of a Pause command from the UI 70 (1220). If the playback media is from a $3^{rd}$ party source (1221), then the FC Client Application calls a $3^{rd}$ party procedures/routine to pause the playback of the media, as described further with reference to FIG. 13-2. If the playback media is from internal source, then FC Client Application selects an internal source procedure/routine to pause the playback of the media. The broadcast device (i1) sends a Pause command to the Playback Manager 212B on the Central Controller 500 with a Pause Timestamp corresponding to the location in the Playback Media 904 for the pause (1222). The Playback Manager 212B in the Central Controller 500 informs the Application Server 202, Playback Server 212D and FC Switching Block 206 to pause. The FC Switching Block 206 pauses the playback of the media to all downstream devices (vn) at the Pause Timestamp selected by the broadcaster device (i1) (1223).

Referring to FIG. 12-3, the Playback Media Marker/Timestamp block 907 and the Playback Media Synchronization Engine 908 at each downstream device (vn) independently pauses the playback of the Playback Media 904 at the specified Pause Timestamp sent by the Application Server 202. The Playback Media Rendering Engine 909 at each downstream device (vn) renders on the UI the pause frame of the Playback media corresponding to the Pause Timestamp (1224). All downstream devices (vn) are now in Pause mode.

At some point during the pause, the broadcaster device (i1) may receive the selection of a Play command from the Player Control UI 70 on the FC Client Application to resume the playback of the media (1225). If the playback media is from a $3^{rd}$ party source (1226), then the FC Client Application calls a $3^{rd}$ party procedures/routine to resume the playback of the media, as described further with reference to FIG. 13-3. If the playback media is from internal source, then FC Client Application selects an internal source procedure/routine to resume the playback of the media. The FC application on the broadcaster device (i1) sends the Play command to the Playback Manager 212B on the Central Controller 500 (1227). The Playback Manager 212B informs the Application Server 202. Application Server sends Play command to FC Switching Block 206 and to all downstream devices (vn). The FC Switching Block 206 starts the downstream of the Playback Media to the broadcaster device (i1) and to all downstream devices (vn) (1228). The broadcaster device (i1) and each downstream devices (vn) independently start playback from the last Synchronization Marker/Timestamp and render the Playback Media 904 sent by the FC Switching Block 206. Each downstream device (vn) continually and independently synchronize the playback of the Playback Media at their respective device with the Synchronization Marker send by the broadcaster device (i1) (1229). The broadcast device (i1) receives information from the Application Server 202 that all downstream devices (vn) have resumed their playback of the media.

Referring to FIG. 12-4, the broadcaster device (i1) may receive the selection of a Rewind command during the playback of the Playback Media 904 from Player Controller UI 70 on the FC client application (1230). If the playback media is from a $3^{rd}$ party source (1231), then the FC Client Application calls a $3^{rd}$ party procedures/routine to rewind the playback of the media, as described further with reference to FIG. 13-4. If the playback media is from internal source, then FC Client Application selects an internal source procedure/routine to rewind the playback of the media. The FC client application on the broadcaster device (i1) sends a Rewind command to the Playback Manager 212B on the Central Controller 500 (1232). The Playback Manager 212B sends the Rewind command to the Playback Server 212D and the FC Switching Block 206. The Playback Server 212B pauses the playback, and the FC Switching Block 206 pauses the downstream Playback Media to all downstream devices (vn) (1233). Each downstream device (vn) independently pause the Playback Media Synchronization Engine 908 on their respective devices, freezes the rendering of the Playback Media, and displays the current frame of the Playback Media 904 on their respective devices (1234). When the broadcaster device (i1) continues to receive the selection of the Rewind command, i1's FC Client Application continues to request Playback Manager 212B and FC Switching Block 206 to send Rewind media stream from Playback Server 212D (1235). The FC client application on the broadcast device (i1) continues to monitor the video stream to determine if the rewind command is selected, and if so, continually sends the Rewind command to the Playback Manager 212B (1236). As long as the Rewind command is active, the Playback Server 212D and the FC Switching Block 206 will continue to stream the rewinding of the Playback Media to the broadcaster device (i1) (1237). The broadcaster device (i1) Playback Media Synchronization Engine 908 and Playback Media Rendering Engine 909 continues to render and display the rewinding of the Playback Media 904 on the broadcaster device's UI (1238).

Referring to FIG. 12-5, when the broadcaster device (i1) detects the release of the rewind control, the FC Client Application sends a Rewind Location Found command and a Resume Marker/Timestamp to the Playback Manager 212B on Central Controller 500. The Resume Marker/Timestamp here corresponds to a final rewind location in the Playback Media (1239). The Playback Manager 202 sends a Rewind Location Found command and the associated Resume Marker/Timestamp to the Application Server 202, the Playback Server 212D, and the FC Switching Block 206. Application Server 202 sends Rewind location found command and the Resume Timestamp to all downstream devices (vn). The FC Switching Block 206 starts the downstream of the Playback Media from the location corresponding to the Resume Marker/Timestamp to the broadcaster device (i1) and all downstream devices (vn) (1240). The Playback Media Synchronization Engine 908 at the broadcaster device (i1) and each downstream device (vn) independently synchronize the playback of the Playback Media with the Resume Timestamp 907. The Playback Media Rendering Engine 909 and the Playback Media Display 3 (910) render and display the Playback Media. The broadcaster device (i1) and each downstream devices (vn) continually and independently synchronize playback media with the synchronization marker sv1 (1241). Playing of the Playback Media has now resumed (1242). The FC client application on the broadcaster device (i1) continues to monitor for any new commands on the UI (1243). When a new command is received, the steps described above are performed depending on the command received.

Referring to FIG. 12-6, the broadcaster device (i1) may receive a selection of a Forward command from the Player Control UI 70 on FC application on the broadcaster device (i1) (1244). If the playback media is from a $3^{rd}$ party source (1245), then the FC Client Application calls a $3^{rd}$ party procedures/routine to forward the playback of the media, as described further with reference to FIG. 13-5. If the playback media is from internal source, then FC Client Application selects an internal source procedure/routine to forward the playback of the media. The broadcaster device (i1) FC client application sends a Forward command to the Playback Manager 212B on the Central Controller 500 and i1 device pauses the playback media (1246). The Playback Manager 212B sends the Forward command to the Application Server 202, the Playback Server 212D, and the FC Switching Block 206. The Payback Server 212D pauses the Playback Media, and the FC Switching Block 206 pauses the downstream of the Playback Media to all downstream devices (vn). The Application Server 202 also sends the Pause Command to all downstream devices (vn) (1247). All downstream devices (vn) pause the Playback Media at the Synchronization Engine 908 on their respective devices and freeze the rendering and display of the Playback Media on their respective device UI (1248). The broadcaster device (i1), by selecting and holding Forward command on the FC client application, continues to send requests to the Playback Manager 212B on the Central Controller 500 to continue to send forwarding media streams of the Playback Media (1249) to the broadcaster device i1. The FC application on the broadcaster device (i1) continually monitors whether the initiator continues to select the Forward command, and if so, informs the Playback Manager 212B of the status of the Forward control (1250). As long as the Forward command stays selected, thus active, the Playback Manager 212B instructs the playback Server 212D and the FC Switching Block 206 to continue to stream the forwarding of the Playback Media to the broadcaster device (i1) (1251). The Playback Media Rendering Engine 909 and the Playback Media Display 3 (910) on the broadcaster device (i1) renders and displays the forwarding Playback Media on its UI (1252).

Referring to FIG. 12-7, if the FC client application on the broadcaster device (i1) detects that the Forward Command is released/not selected, then it sends the Forward Location found command and a Resume Timestamp to the Playback Manager 212B (1253). The Resume Timestamp corresponds to the final forward location in the Playback Media. The Playback Manager 212B sends a Forward Location found command and the Resume Timestamp to the Application Server 202, the Playback Server 212D, and the FC Switching Block 206. The Application Server 202 sends Resume Timestamp and Resume command to all downstream devices (vn) (1254). The Resume Timestamp is the final forward location of the playback media selected by the broadcaster device (i1). The Playback Server 212D starts transmitting the Playback Media from the Resume Timestamp selected by the broadcaster device (i1). The FC Switching Block 206 starts to downstream the Playback Media from the Resume Timestamp to all downstream devices (vn) and to the broadcaster device (i1) (1255). The Playback Media Synchronization Engine 908 at the broadcaster device (i1) and each downstream device (vn) independently start synchronizing the Playback Media with the Resume Timestamp 907. The Playback Media Rendering Engine 908 and the Playback Media Display 3 (910) render and display the Playback Media on each device UI (1256). The FC client application on the broadcaster device (i1) informs the broadcaster device (i1) that the playback of the playback media has resumed (1257).

Referring to FIG. 12-8, the broadcaster device (i)1 may receive a selection of a Stop command from the Player Control UI 70 on FC application (1258). If the playback media is from a $3^{rd}$ party source (1259), then the FC Client Application calls a $3^{rd}$ party procedures/routine to stop the playback of the media, as described further with reference to FIG. 13-6. If the playback media is from internal source, then FC Client Application selects an internal source procedure/routine to stop the playback of the media. The FC client application on the broadcaster device (i1) sends a Stop command to the Playback Manager 212B on the Central Controller 500 (1260). The Playback Manager 212B sends a Stop Command to the Application Server 202, the Playback Server 212D, and the FC Switching Block 206 (1261). The Application Server 202 sends the Stop command to all downstream devices (vn). Playback Server 212D stops transmitting the playback of the Playback Media, and the FC Switching Block 206 stops the downstream of the Playback Media to all downstream devices (vn) (1262). The broadcaster device (i1) and all downstream devices stop their respective Playback Media Synchronization Engines 908, freezes their respective Playback Media Rendering Engines 909, and returns all playback resources back to their initial resting state. The FC client application on each downstream device (vn) changes their respective UI's and removes the Playback Media (1263). The FC client application on the broadcaster device (i1) exits the playback mode and closes the Player Control (1264).

Figures 1, 13:
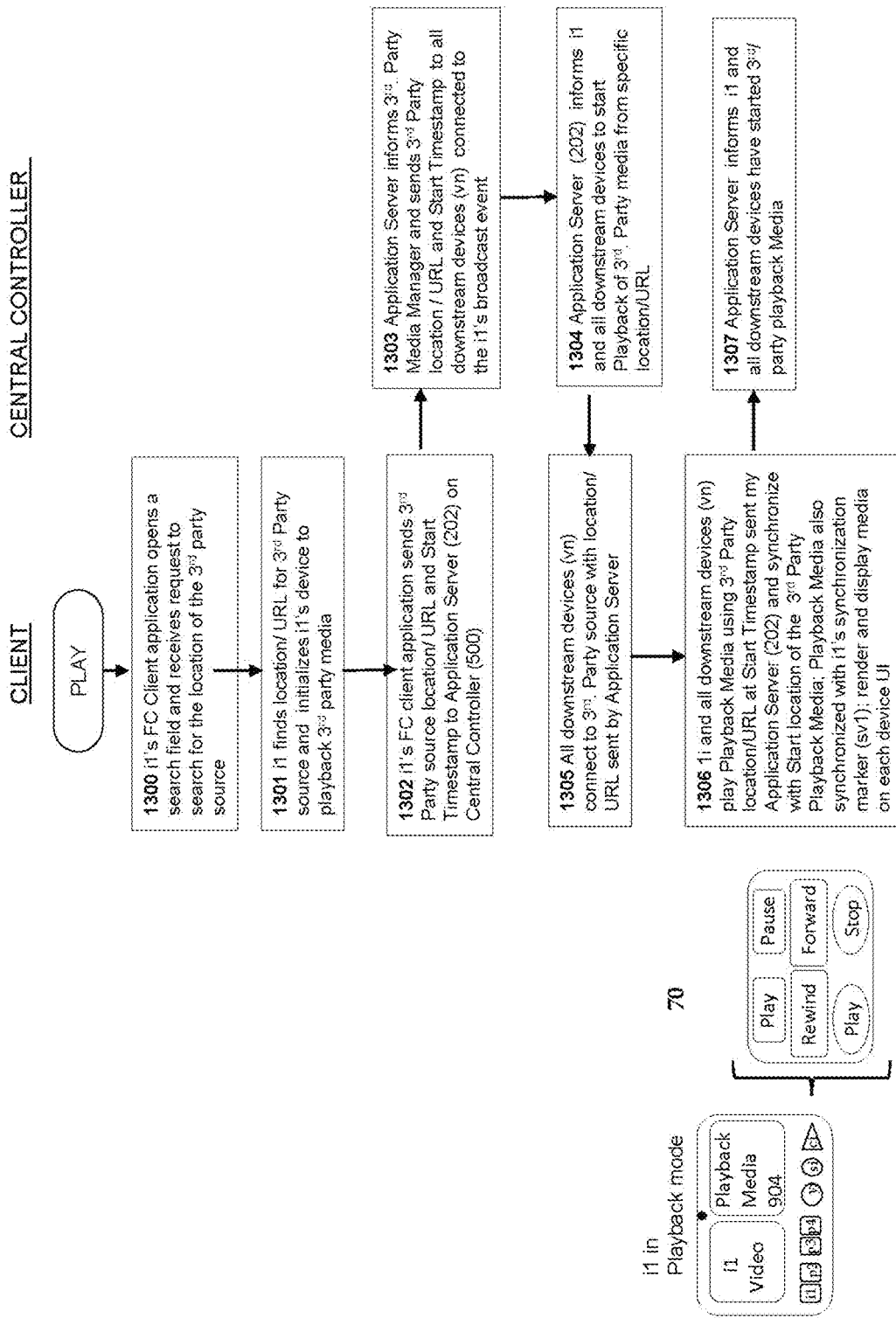
Figures 2, 13:
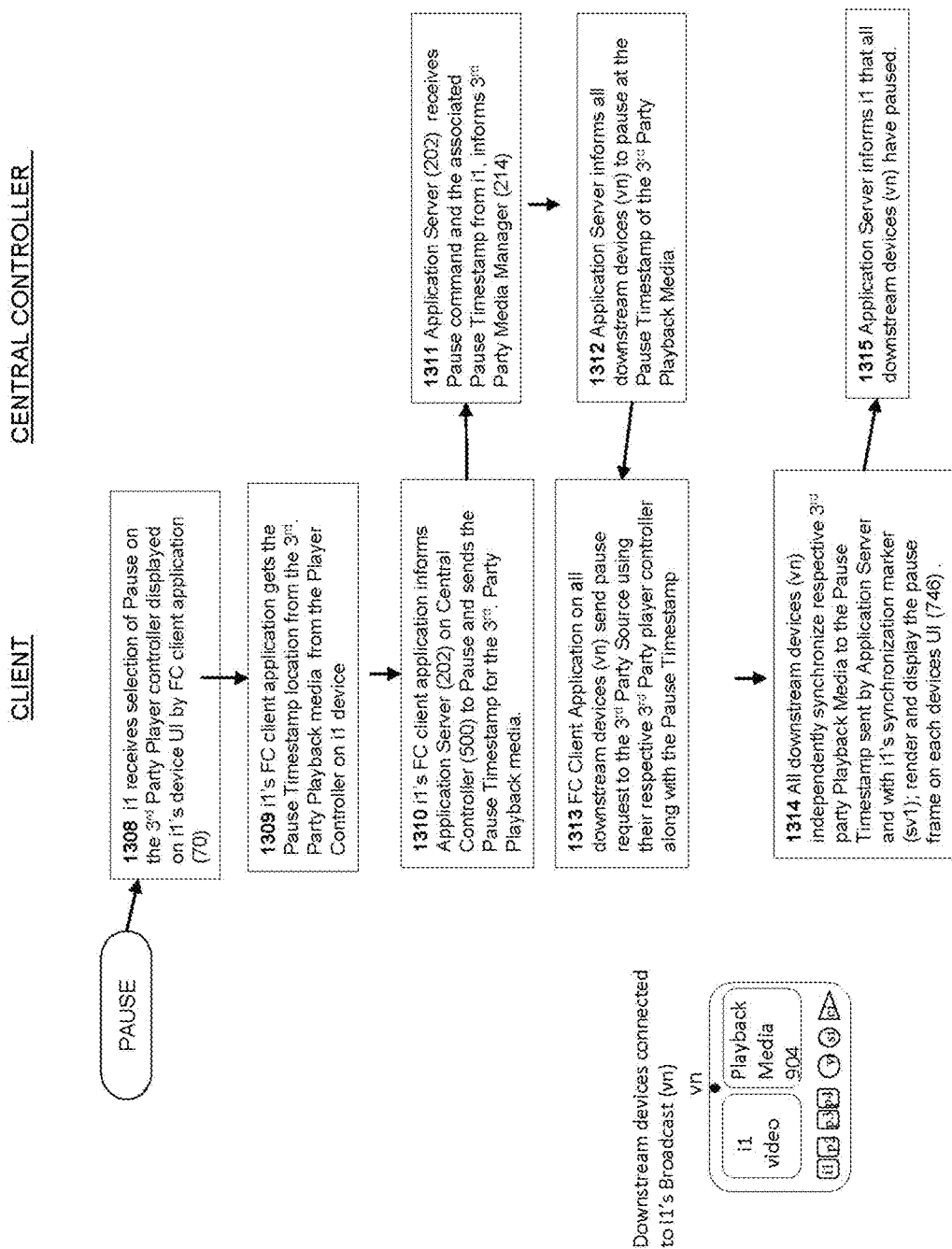
Figures 3, 13:
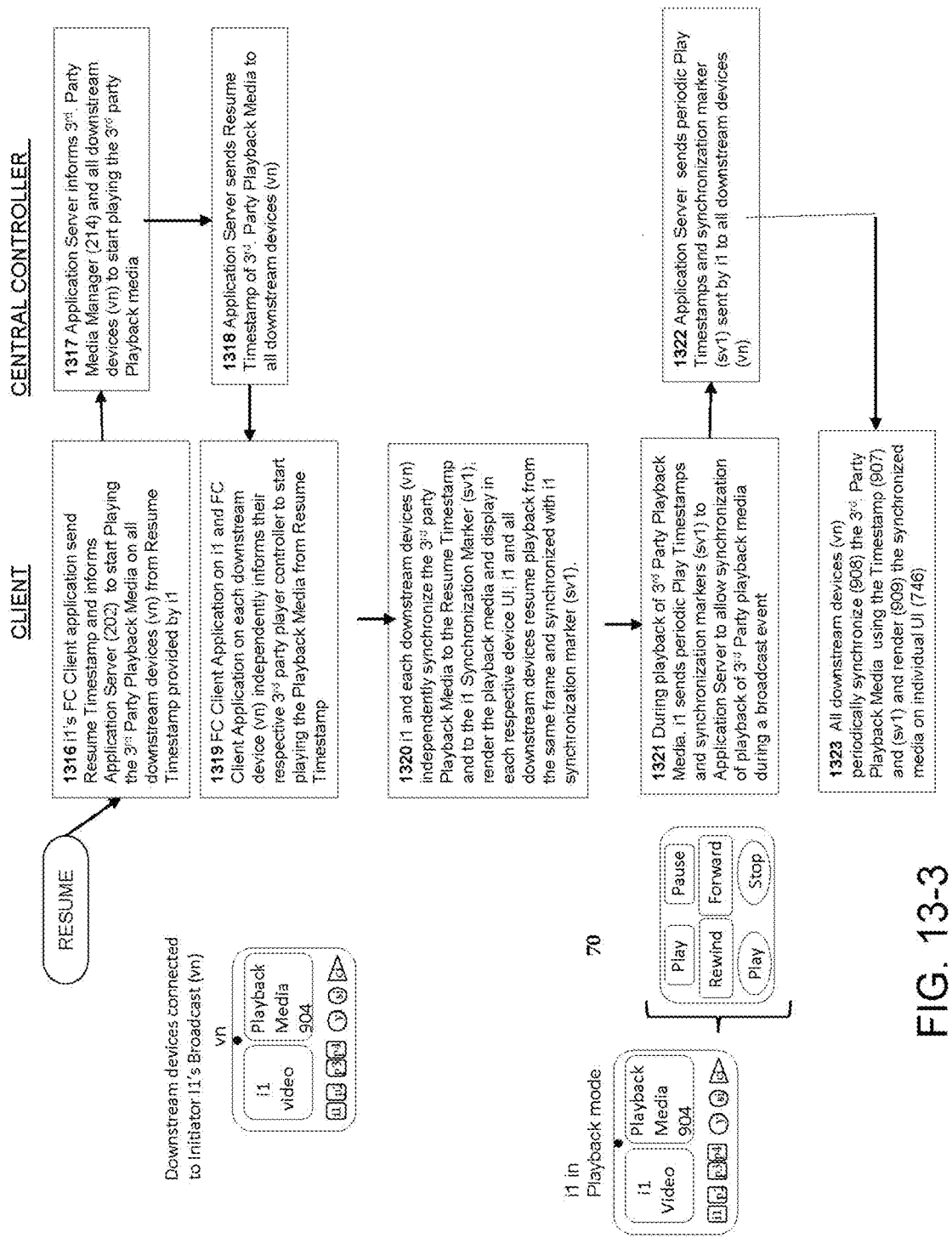
Figures 4, 13:
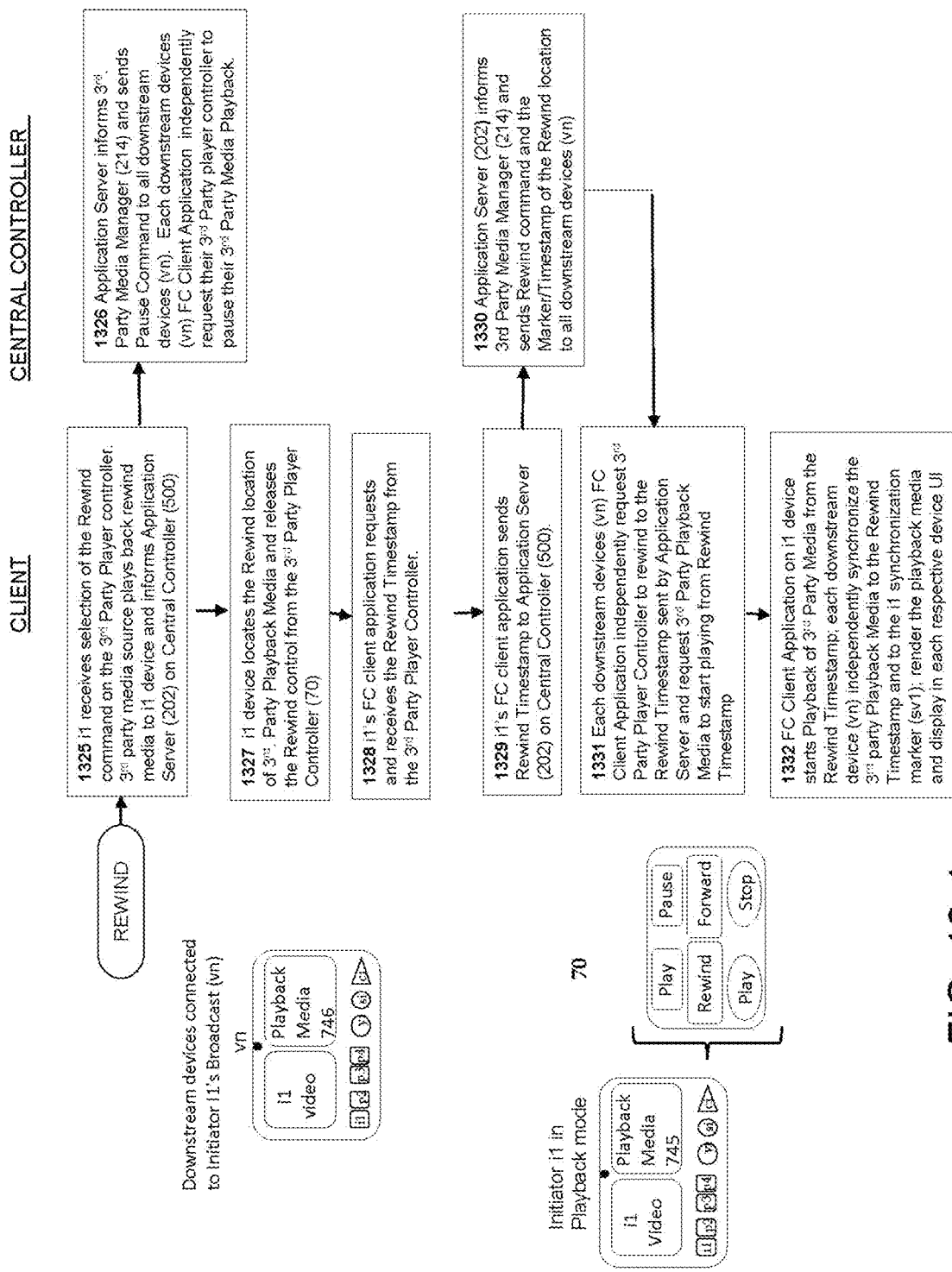
Figures 5, 13:
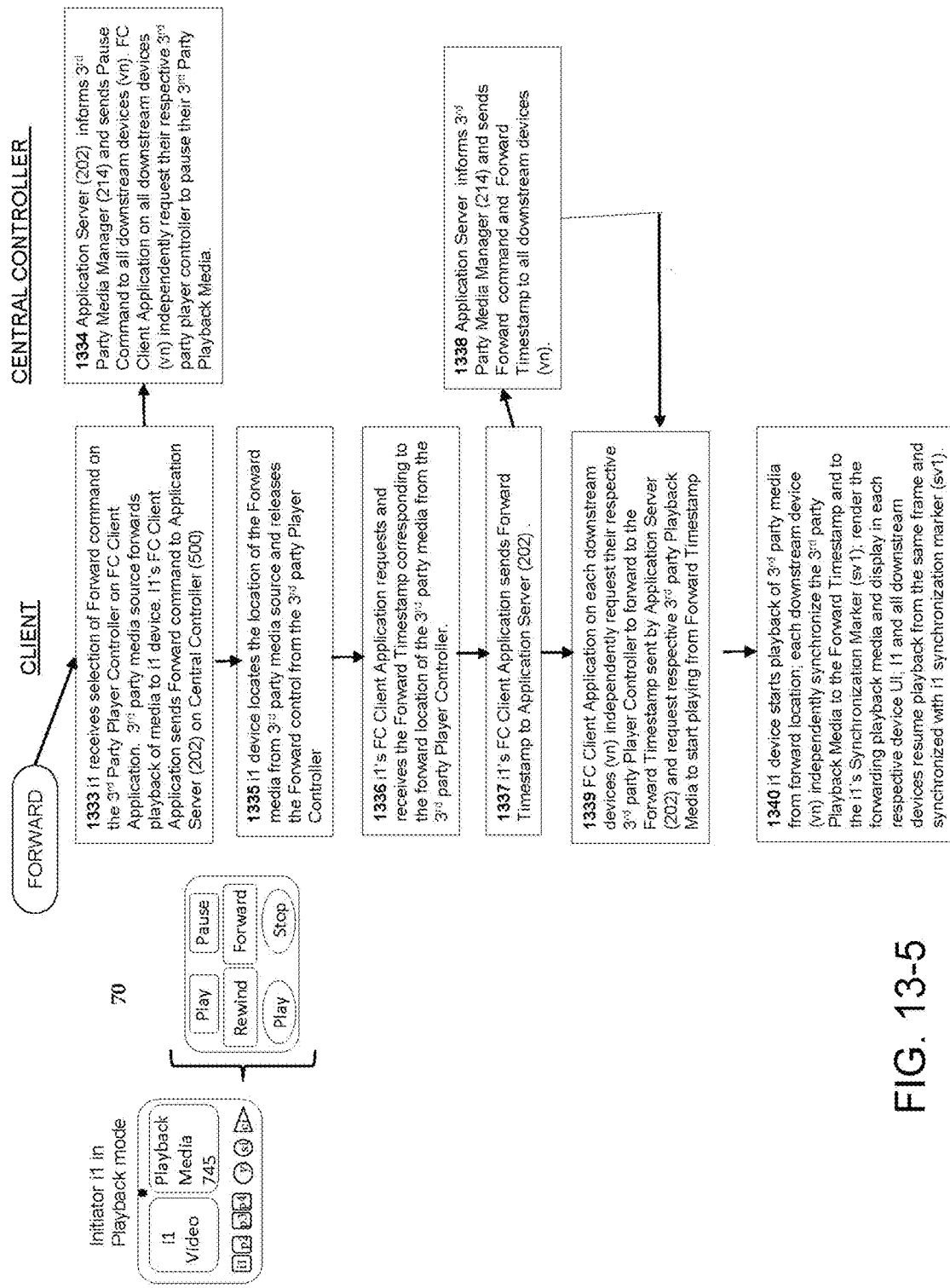
Figures 6, 13:
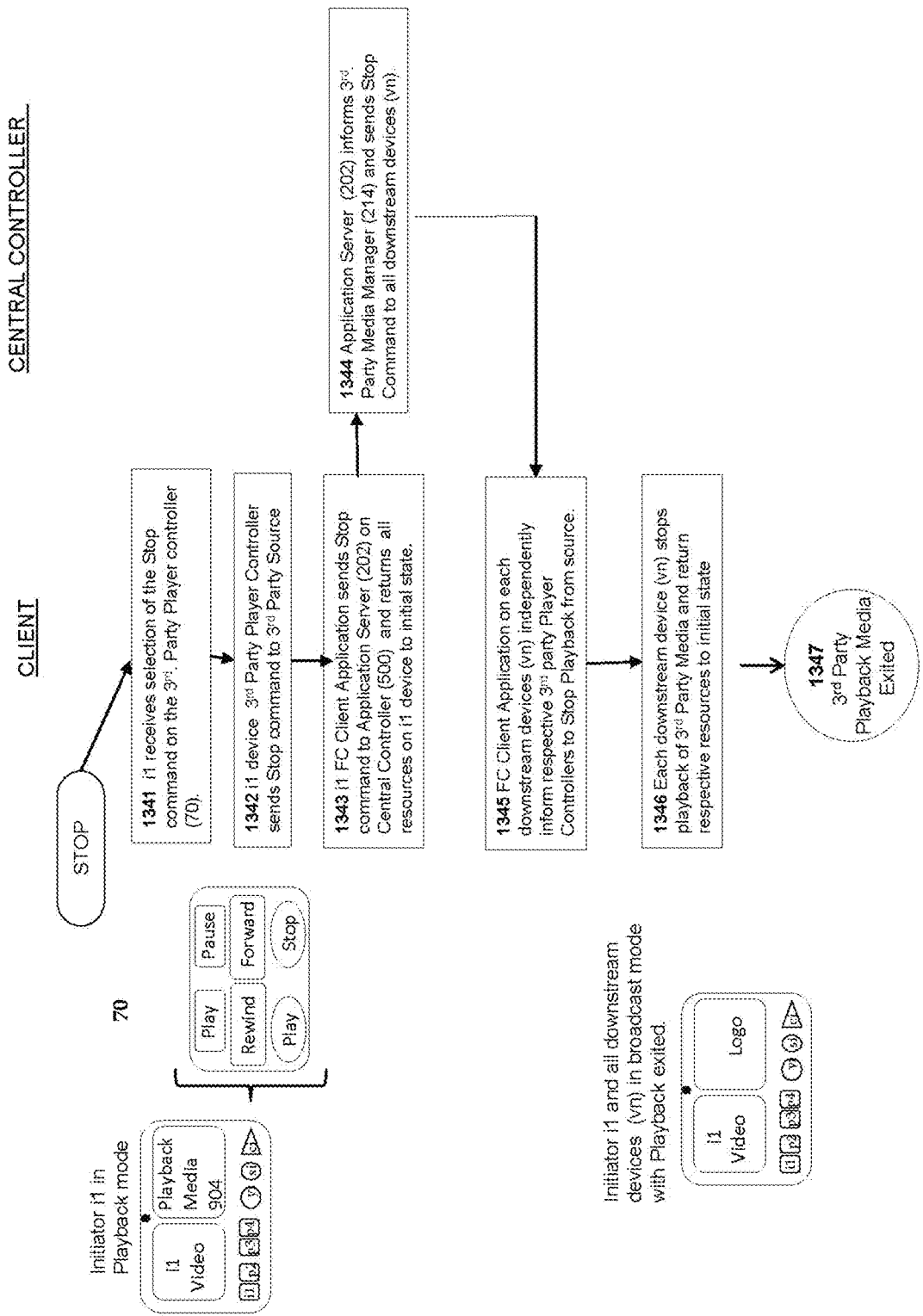

FIGS. 13-1 through 13-6 illustrate an embodiment of a method for flow-control based synchronized playback of third-party recorded media, according to the present invention. Steps 1300-1307 illustrates steps in the synchronized playback of third-party recorded media. Steps 1308-1315 illustrates steps in the synchronized pausing of the playback of third-party recorded media. Steps 1316-1323 illustrate steps in the synchronized resuming of the playback of third-party recorded media. Steps 1325-1332 illustrate steps in the synchronized rewind of the playback of third-party recorded media. Steps 1333-1340 illustrate steps in the synchronized forwarding of the playback of third-party recorded media. Each of these steps are described further below.

Referring to FIG. 13-1, the FC Client Application on the broadcaster device (i1) opens a search field and receives a request to search for the location/URL of the $3^{rd}$ party source for the Playback Media (1300). The broadcaster device (i1) receives a selection of a location/URL for the $3^{rd}$ party source for the Playback Media and initializes the playback from the $3^{rd}$ party Playback Media source on the broadcaster device (i1) using the location/URL (1301). The FC Client Application on the broadcaster device (i1) sends the $3^{rd}$ party source location/URL and the Start Timestamp for the starting location of the playback of the Playback Media to the Application Server 202 on the Central Controller 500 (1302). The Application Server 202 informs the $3^{rd}$ Party Media Manager 214 and sends the $3^{rd}$ Party location/URL and Start Timestamp to all downstream devices (vn) connected to the broadcaster device's (i1) broadcast event (1303). The Application Server 202 informs the broadcaster device (i1) and all downstream devices (vn) to start playback of the $3^{rd}$ party Playback Media from the specific $3^{rd}$ party source location/URL (1304). Each downstream device (vn) independently connects to the $3^{rd}$ party source using the location/URL sent by the Application Server 202 (1305). The broadcaster device (i1) and all downstream devices (vn) start the playing of the $3^{rd}$ party Playback Media at the same Start Timestamp. The Playback Media Synchronization Engine 908 at each downstream device (vn) synchronizes the playback of the $3^{rd}$ party Playback Media with the Start Timestamp and with the broadcast device's synchronization marker (sv1). The Playback Media Rendering Engine 909 and the Playback Media Display 3 (910) at each downstream device (vn) renders and displays the $3^{rd}$ party Playback Media on the respective device's UI (1306). The Application Server 202 informs the broadcaster device (i1) that all downstream devices (vn) have started playing of the Playback Media from the $3^{rd}$ party source (1307).

Referring to FIG. 13-2, the broadcaster device (i1) may receive the selectin of a Pause command on the $3^{rd}$ party Player Controller displayed on the broadcast device's UI (70) by its FC Client Application (1308). The FC Client Application on the broadcaster device (i1) gets the Pause Timestamp location of the Playback media from the $3^{rd}$ party Player Controller (1309). The Pause Timestamp corresponds to a location in the Playback Media at the time of the Pause command. The FC Client Application on the broadcaster device (i1) informs the Application Server 202 on the Central Controller 500 to Pause the playback of the Playback Media and sends the Pause Timestamp for the $3^{rd}$ party Playback Media to the Application Server 202 (1310). The Application Server 202 receives the Pause command and the associate Pause Timestamp from the broadcaster device (i1), and informs the $3^{rd}$ Party Media Manager 214 (1311). The Application Server 202 informs all downstream devices (vn) to pause at the Pause Timestamp of the $3^{rd}$ party Playback Media (1312). FC Client Applications on all downstream devices (vn) send a pause command to their respective $3^{rd}$ party Player Controllers. The $3^{rd}$ Party Player controller on each downstream device (vn) sends the Pause Timestamp to the $3^{rd}$ party source (1313). The Playback Media Synchronization Engine 908 on each downstream device (vn) independently synchronizes the playing of their respective $3^{rd}$ party Playback Media to the Pause Timestamp sent by the Application Server 202 and to the broadcaster device's (i1) synchronization marker (sv1). The Playback Media Rendering Engine 909 and the Playback Media Display 3 (910) of each downstream device (vn) renders and displays the synchronized pause frame on each respective downstream device UI (1314). The Application Server 202 informs the broadcaster device (i1) that all downstream devices (vn) have paused the playback of the Playback Media (1315).

Referring to FIG. 13-3, to resume playback, the FC Client Application on the broadcaster device (i1) sends a Resume Timestamp to the Application Server 202 on Central Controller 500 and informs the Application Server 202 to start playing the $3^{rd}$ party Playback Media on all downstream devices (vn) from the Resume Timestamp provided by the broadcaster device (i1) (1316). The Application Server 202 informs the $3^{rd}$ Party Media Manager 214 and all downstream devices (vn) to start playing the $3^{rd}$ party Playback Media (1317). The Application Server 202 sends the Resume Timestamp to all downstream devices (vn) (1318). The FC Client Application on the broadcaster device (i1) and the FC Client Application on each downstream device (vn) independently informs their respective $3^{rd}$ party player controllers to start playing the Playback Media from the Resume Timestamp (1319). The Playback Media Synchronization Engine 908 at the broadcaster device (i1) and each downstream device (vn) independently synchronize the playing of the $3^{rd}$ party Playback Media to the Resume Timestamp 907 and to the broadcaster device's (i1) synchronization marker (sv1). The Playback Media Rendering Engine 909 and the Playback Media Display 3 (910) at the broadcaster device (i1) and each downstream device (vn) render and display the playback media on each device's respective UI. The broadcaster device (i1) and all downstream devices (vn) resume the playback from the same frame corresponding to the Resume Timestamp and synchronized with the broadcaster device's (i1) synchronization marker (sv1) (1320). During the playback of the $3^{rd}$ party Playback Media, the broadcaster device (i1) sends periodic Play Timestamps and synchronization markers (sv1) to all downstream devices (vn) to allow the synchronization of the playback of the $3^{rd}$ party Playback Media during the broadcast event. (1321). The Application Server 202 sends the periodic Play Timestamps, and the broadcaster device (i1) sends synchronization marker (sv1) to all downstream devices (vn) (1322). Each downstream device (vn) continues to periodically independently synchronize the playing of the $3^{rd}$ party Playback Media using the periodic Play Timestamps and synchronization markers (sv1). The Playback Media Rendering Engine 909 and the Playback Media Display 3 (910) at each downstream devices (vn) render and display the synchronized Playback Media on each respective device UI (1323).

Referring to FIG. 13-4, during the playback of the $3^{rd}$ party Playback Media, the broadcaster device (i1) may receive a selection of the Rewind command on the $3^{rd}$ party Player Controller. In response, the $3^{rd}$ party media source rewinds the playback of the Playback Media on the broadcaster device (i1) UI and informs the Application Server 202 on the Central Controller 500 (1325). The Application Server 202 informs the 3$^{rd}$ Party Media Manager 214 and sends the Pause Command to all downstream devices (vn). Each downstream device FC Client Application independently requests their respective 3$^{rd}$ Party player controller to pause the playing of the 3$^{rd}$ party Playback Media (1326). The broadcaster device (i1) locates the Rewind location of the 3$^{rd}$ party Playback Media and releases/deselects the Rewind control from the 3$^{rd}$ Party Player Controller 70 (1327). The FC Client Application on the broadcaster device (i1) requests and receives the Rewind Timestamp from the 3$^{rd}$ Party Player Controller 70 (1328). The FC Client Application on the broadcaster device (i1) sends the Rewind Timestamp to the Application Server 202 on Central Controller 500 (1329). The Application Server 202 informs the 3$^{rd}$ Party Media Manager 214 and sends the Rewind command and Rewind Timestamp to all downstream devices (vn) (1330). Each downstream devices' (vn) FC Client Application independently requests their respective 3$^{rd}$ Party Player Controller to rewind to the Rewind Timestamp sent by the Application Server 202 and requests the playing of the 3$^{rd}$ Party Playback Media to start from that the Rewind Timestamp (1331). The FAC client application at the broadcaster device (i1) starts the playback of the 3$^{rd}$ party Playback Media from the Rewind Timestamp. The Playback Media Synchronization Engine 908 at each downstream device (vn) independently synchronizes their respective playback of the 3$^{rd}$ party Playback Media to the Rewind Timestamp and to the broadcaster device (i1) synchronization marker (sv1). The Playback Media Rendering Engine 909 and Playback Media Display 3 (910) at each downstream device (vn) render and display the playback media in each respective device UI (1332).

Referring to FIG. 13-5, the broadcaster device (i1) may receive the selection of a Forward command on the 3$^{rd}$ party Player Controller on the FC Client Application. The 3$^{rd}$ party media source forwards the playback of the Playback Media to the broadcaster device (i1). The FC Client Application on the broadcaster device (i1) sends the Forward command to the Application Server 202 on Central Controller 500 (1333). The Application Server 202 informs the 3$^{rd}$ Party Media Manager 214 and sends the Pause Command to all downstream devices (vn). Each downstream device (vn) FC Client Application independently request their respective 3$^{rd}$ party player controller to pause the playing of the 3$^{rd}$ party Playback Media (1334). The broadcaster device (i1) determines the Forward location of the position of the Playback Media at the time of the Forward command, from the 3$^{rd}$ party media source and releases the Forward control from the 3$^{rd}$ party Player Controller 70 (1335). The FC Client Application on the broadcaster device (i1) requests and receives the Forward Timestamp corresponding to the Forward location from the 3$^{rd}$ party Player Controller (1336). The FC Client Application on the broadcaster device (i1) sends the Forward Timestamp to the Application Server 202 (1337). The Application Server 202 informs the 3$^{rd}$ Party Media Manager 214 and sends the Forward command and the Forward Timestamp to all downstream devices (vn) (1338). The FC client application on the broadcaster device (i1) and each downstream device (vn) independently request their respective 3$^{rd}$ party Player Controller to forward to the Forward Timestamp sent by the Application Server 202 and request the playback of the 3$^{rd}$ party Playback Media to start from that the Forward Timestamp (1339). The broadcaster device (1) starts the playing of the 3$^{rd}$ party Playback Media from the Forward Timestamp. A flow control based synchronization of media playback of the same media content is provided on all client devices participating in the same broadcast. Each downstream client device participating in the broadcast will independently display the same location in the media at the same time. The broadcaster device requests each downstream participant device in the broadcast to independently downstream the same recorded media, and the central controller will synchronize the media playback so that all downstream devices playback the media at the same location or frame as specified by the broadcaster. For the 3$^{rd}$ party source, a 3$^{rd}$ Party Media Manager control's the play of a playback media. The playback of the playback media at each of the downstream devices is further synchronized with the stream from the broadcaster device using a synchronization marker integrated into the broadcaster device stream.

downstream device (vn) independently synchronizes their respective playing of the 3rd party Playback Media to the Forward Timestamp and to the broadcaster device's Synchronization Marker (sv1). The Playback Media Rendering Engine 909 and the Playback Media Display 3 (910) at each downstream device (vn) render and display the forwarding of the Playback Media on each respective device UI. The broadcaster device (i1) and all downstream devices (vn) resume the playback from the same frame and synchronized with the broadcaster device's Synchronization Marker (sv1) (1340).

Referring to FIG. 13-6, the broadcaster device (i1) may receive the selection of the Stop command on the 3$^{rd}$ party Player Controller 70 (1341). The 3$^{rd}$ party Player Controller on the broadcaster device (i1) sends the Stop command to the 3$^{rd}$ party playback media source/URL (1342). The FC Client Application on the broadcaster device (i1) sends the Stop command to the Application Server 202 on the Central Controller 500 and returns all resources on the broadcaster device i1 to the initial state (1343). The Application Server 202 informs the 3$^{rd}$ Party Media Manager 214 and sends the Stop Command to all downstream devices (vn) (1344). The FC Client Application on each downstream device (vn) independently informs their respective 3$^{rd}$ party Player Controllers to stop the playback from the 3$^{rd}$ party source (1345). The downstream devices (vn) stop the playback of 3$^{rd}$ party Playback Media and return all resources on their respective devices to the initial state (1346). The playback of the 3$^{rd}$ party Playback Media is now exited (1347).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing synchronized playback of a pre-recorded playback media from a source by a plurality of client devices during a broadcast session, comprising:
   (a) configuring, by a central controller, one or more upstream ports for a broadcaster device;
   (b) configuring, by the central controller, one or more downstream ports for each of the plurality of client devices in the broadcast session;
   (c) receiving, by the central controller, a stream from the broadcaster device via the one or more upstream ports, the stream from the broadcaster device comprising a synchronization marker integrated therein;

(d) receiving, by the central controller from the broadcaster device, a source location for the pre-recorded playback media and a playback start timestamp;

(e) sending, by the central controller to the broadcaster device and each of the plurality of client devices, the playback start timestamp, the source location, and a playback command to start playback of the pre-recorded playback media from the source location; and (f) sending, by the central controller to each of the plurality of client devices, the stream from the broadcaster device via the one or more downstream ports for each of the plurality of client devices, wherein in response to receiving the playback command, the broadcaster device and each of the plurality of client devices each independently connects to the source location and starts the playback of the pre-recorded playback media at a location corresponding to the playback start timestamp, wherein each of the plurality of client devices continually and independently synchronizes the playback of the pre-recorded playback media with the synchronization marker in the stream from the broadcaster device.

2. The method of claim 1, further comprising:

(g) receiving, by the central controller from the broadcaster device, a pause command and a pause timestamp obtained from the source location, wherein the pause timestamp corresponds to a location in the pre-recoded playback media at which the broadcaster device requested a pause of the playback of the pre-recorded playback media at the source location; and (h) sending, by the central controller, the pause command and the pause timestamp to each of the plurality of client devices, wherein each of the plurality of client devices independently sends a request to the source location to pause the playback of the pre-recorded playback media at a location corresponding to the pause timestamp.

3. The method of claim 2, further comprising:

(i) receiving, by the central controller, a second playback command and a resume timestamp from the broadcaster device, wherein the resume timestamp corresponds to a location in the pre-recorded playback media at which the broadcaster device requested a resuming of the playback of the pre-recorded playback media at the source location; and (j) sending, by the central controller, the second playback command and the resume timestamp to each of the plurality of client devices, wherein each of the plurality of client devices independently sends a request to the source location to resume the playback of the pre-recorded playback media at a location corresponding to the resume timestamp and synchronizes the playback of the pre-recorded playback media with the synchronization marker from the broadcaster device.

4. The method of claim 1, further comprising:

(g) receiving, by the central controller, a rewind command from the broadcaster device;

(h) sending, by the central controller, a pause command to each of the plurality of client devices, wherein in response to the pause command, each of the plurality of client devices sends a request to the source location to pause the playback the pre-recorded playback media;

(i) receiving, by the central controller from the broadcaster device, a rewind timestamp obtained from the source location, wherein the rewind timestamp corresponds to a location in the pre-recorded playback media at which the broadcaster device requested a stopping of a rewinding of the playback of the pre-recorded playback media at the source location; and (j) sending, by the central controller, the rewind command and the rewind timestamp to each of the plurality of client devices, wherein each of the plurality of client devices independently sends a request to the source location to start the playback of the pre-recorded playback media at a location corresponding to the rewind timestamp and synchronizes the playback of the pre-recorded playback media with the synchronization marker from the broadcaster device.

5. The method of claim 1, further comprising:

(g) receiving, by the central controller, a forward command from the broadcaster device;

(h) in response to the forward command, sending, by the central controller, a pause command to each of the plurality of client devices, wherein in response to the pause command, each of the plurality of client devices sends a request to the source location to pause the playback the pre-recorded playback media;

(i) receiving, by the central controller from the broadcaster device, a forward timestamp obtained from the source location, wherein the forward timestamp corresponds to a location in the pre-recorded playback media at which the broadcaster device requested a stopping of a forwarding of the playback of the pre-recorded playback media at the source location; and (j) sending, by the central controller, the forward command and the forward timestamp to each of the plurality of client devices, wherein each of the plurality of client devices independently sends a request to the source location to start the playback of the pre-recorded playback media at a location corresponding to the forward timestamp and synchronizes the playback of the pre-recorded playback media with the synchronization marker from the broadcaster device.

6. The method of claim 1, further comprising:

(g) receiving, by the central controller, a stop command from the broadcaster device; and (h) in response to the stop command, sending the stop command to each of the plurality of client devices by the central controller, wherein each of the plurality of client devices independently sends a request to the source location to stop the playback of the pre-recorded playback media.

7. A non-transitory computer readable medium comprising computer readable program code embodied therewith for synchronized playback of a pre-recorded playback media by a plurality of client devices during a broadcast session, the computer readable program code configured to:

(a) configure, by a central controller, one or more upstream ports for a broadcaster device;

(b) configure, by the central controller, one or more downstream ports for each of the plurality of client devices in the broadcast session;

(c) receive, by the central controller, a stream from the broadcaster device via the one or more upstream ports, the stream from the broadcaster device comprising a synchronization marker integrated therein;

(d) receive, by the central controller from the broadcaster device, a source location for the pre-recorded playback media and a playback start timestamp;

(e) send, by the central controller to the broadcaster device and each of the plurality of client devices, the playback start timestamp, the source location, and a playback command to start playback of the pre-recorded playback media from the source location; and (f) send, by the central controller to each of the plurality of client devices, the stream from the broadcaster device via the one or more downstream ports for each of the plurality of client devices, wherein in response to receiving the playback command, the broadcaster device and each of the plurality of client devices each independently connects to the source location and starts the playback of the pre-recorded playback media at a location corresponding to the playback start timestamp, wherein each of the plurality of client devices continually and independently synchronizes the playback of the pre-recorded playback media with the synchronization marker in the stream from the broadcaster device.

8. The medium of claim 7, the computer readable program code further configured to:

(g) receive, by the central controller from the broadcaster device, a pause command and a pause timestamp obtained from the source location, wherein the pause timestamp corresponds to a location in the pre-recoded playback media at which the broadcaster device requested a pause of the playback of the pre-recorded playback media at the source location; and (h) send, by the central controller, the pause command and the pause timestamp to each of the plurality of client devices, wherein each of the plurality of client devices independently sends a request to the source location to pause the playback of the pre-recorded playback media at a location corresponding to the pause timestamp.

9. The medium of claim 8, the computer readable program code further configured to:

(i) receive, by the central controller, a second playback command and a resume timestamp from the broadcaster device, wherein the resume timestamp corresponds to a location in the pre-recorded playback media at which the broadcaster device requested a resuming of the playback of the pre-recorded playback media at the source location; and (j) send, by the central controller, the second playback command and the resume timestamp to each of the plurality of client devices, wherein each of the plurality of client devices independently sends a request to the source location to resume the playback of the pre-recorded playback media at a location corresponding to the resume timestamp and synchronizes the playback of the pre-recorded playback media with the synchronization marker from the broadcaster device.

10. The medium of claim 7, the computer readable program code further configured to:

(g) receive, by the central controller, a rewind command from the broadcaster device;

(h) send, by the central controller, a pause command to each of the plurality of client devices, wherein in response to the pause command, each of the plurality of client devices sends a request to the source location to pause the playback the pre-recorded playback media;

(i) receive, by the central controller from the broadcaster device, a rewind timestamp obtained from the source location, wherein the rewind timestamp corresponds to a location in the pre-recorded playback media at which the broadcaster device requested a stopping of a rewinding of the playback of the pre-recorded playback media at the source location; and (j) send, by the central controller, the rewind command and the rewind timestamp to each of the plurality of client devices, wherein each of the plurality of client devices independently sends a request to the source location to start the playback of the pre-recorded playback media at a location corresponding to the rewind timestamp and synchronizes the playback of the pre-recorded playback media with the synchronization marker from the broadcaster device.

11. The medium of claim 7, the computer readable program code further configured to:

(g) receive, by the central controller, a forward command from the broadcaster device;

(h) in response to the forward command, send, by the central controller, a pause command to each of the plurality of client devices, wherein in response to the pause command, each of the plurality of client devices sends a request to the source location to pause the playback the pre-recorded playback media;

(i) receive, by the central controller from the broadcaster device, a forward timestamp obtained from the source location, wherein the forward timestamp corresponds to a location in the pre-recorded playback media at which the broadcaster device requested a stopping of a forwarding of the playback of the pre-recorded playback media at the source location; and (j) send, by the central controller, the forward command and the forward timestamp to each of the plurality of client devices, wherein each of the plurality of client devices independently sends a request to the source location to start the playback of the pre-recorded playback media at a location corresponding to the forward timestamp and synchronizes the playback of the pre-recorded playback media with the synchronization marker from the broadcaster device.

12. The medium of claim 7, the computer readable program code further configured to:

(g) receive, by the central controller, a stop command from the broadcaster device; and (h) in response to the stop command, sending the stop command to each of the plurality of client devices by the central controller, wherein each of the plurality of client devices independently sends a request to the source location to stop the playback of the pre-recorded playback media.

13. A system, comprising:

a central controller, and a non-transitory computer readable medium having computer readable program code embodied therewith for synchronized playback of a pre-recorded playback media by a plurality of client devices during a broadcast session, the computer readable program code configured to:

(a) configure, by a central controller, one or more upstream ports for a broadcaster device;

(b) configure, by the central controller, one or more downstream ports for each of the plurality of client devices in the broadcast session;

(c) receive, by the central controller, a stream from the broadcaster device via the one or more upstream ports, the stream from the broadcaster device comprising a synchronization marker integrated therein;

(d) receive, by the central controller from the broadcaster device, a source location for the pre-recorded playback media and a playback start timestamp;

(e) send, by the central controller to the broadcaster device and each of the plurality of client devices, the playback start timestamp, the source location, and a playback command to start playback of the pre-recorded playback media from the source location; and (f) send, by the central controller to each of the plurality of client devices, the stream from the broadcaster device via the one or more downstream ports for each of the plurality of client devices, wherein in response to receiving the playback command, the broadcaster device and each of the plurality of client devices each independently connects to the source location and starts the playback of the pre-recorded playback media at a location corresponding to the playback start timestamp, wherein each of the plurality of client devices continually and independently synchronizes the playback of the pre-recorded playback media with the synchronization marker in the stream from the broadcaster device.

14. The system of claim 13, the computer readable program code further configured to:

(g) receive, by the central controller from the broadcaster device, a pause command and a pause timestamp obtained from the source location, wherein the pause timestamp corresponds to a location in the pre-recoded playback media at which the broadcaster device requested a pause of the playback of the pre-recorded playback media at the source location; and (h) send, by the central controller, the pause command and the pause timestamp to each of the plurality of client devices, wherein each of the plurality of client devices independently sends a request to the source location to pause the playback of the pre-recorded playback media at a location corresponding to the pause timestamp.

15. The system of claim 14, the computer readable program code further configured to:

(i) receive, by the central controller, a second playback command and a resume timestamp from the broadcaster device, wherein the resume timestamp corresponds to a location in the pre-recorded playback media at which the broadcaster device requested a resuming of the playback of the pre-recorded playback media at the source location; and (j) send, by the central controller, the second playback command and the resume timestamp to each of the plurality of client devices, wherein each of the plurality of client devices independently sends a request to the source location to resume the playback of the pre-recorded playback media at a location corresponding to the resume timestamp and synchronizes the playback of the pre-recorded playback media with the synchronization marker from the broadcaster device.

16. The system of claim 13, the computer readable program code further configured to:

(g) receive, by the central controller, a rewind command from the broadcaster device;

(h) send, by the central controller, a pause command to each of the plurality of client devices, wherein in response to the pause command, each of the plurality of client devices sends a request to the source location to pause the playback the pre-recorded playback media;

(i) receive, by the central controller from the broadcaster device, a rewind timestamp obtained from the source location, wherein the rewind timestamp corresponds to a location in the pre-recorded playback media at which the broadcaster device requested a stopping of a rewinding of the playback of the pre-recorded playback media at the source location; and (j) send, by the central controller, the rewind command and the rewind timestamp to each of the plurality of client devices, wherein each of the plurality of client devices independently sends a request to the source location to start the playback of the pre-recorded playback media at a location corresponding to the rewind timestamp and synchronizes the playback of the pre-recorded playback media with the synchronization marker from the broadcaster device.

17. The system of claim 13, the computer readable program code further configured to:

(g) receive, by the central controller, a forward command from the broadcaster device;

(h) in response to the forward command, send, by the central controller, a pause command to each of the plurality of client devices, wherein in response to the pause command, each of the plurality of client devices sends a request to the source location to pause the playback the pre-recorded playback media;

(i) receive, by the central controller from the broadcaster device, a forward timestamp obtained from the source location, wherein the forward timestamp corresponds to a location in the pre-recorded playback media at which the broadcaster device requested a stopping of a forwarding of the playback of the pre-recorded playback media at the source location; and (j) send, by the central controller, the forward command and the forward timestamp to each of the plurality of client devices, wherein each of the plurality of client devices independently sends a request to the source location to start the playback of the pre-recorded playback media at a location corresponding to the forward timestamp and synchronizes the playback of the pre-recorded playback media with the synchronization marker from the broadcaster device.

18. The system of claim 13, the computer readable program code further configured to:

(g) receive, by the central controller, a stop command from the broadcaster device; and (h) in response to the stop command, sending the stop command to each of the plurality of client devices by the central controller, wherein each of the plurality of client devices independently sends a request to the source location to stop the playback of the pre-recorded playback media.

* * * * *